United States Patent
Odish et al.

(10) Patent No.: US 12,080,175 B2
(45) Date of Patent: Sep. 3, 2024

(54) CPDLC REPORT THREADING AND AUTO ARM

(71) Applicant: Honeywell International Inc., Charlotte, NC (US)

(72) Inventors: Randy Odish, Tempe, AZ (US); Steven Smith, Surprise, AZ (US); Christopher Heine, Mesa, AZ (US)

(73) Assignee: Honeywell International Inc., Charlotte, NC (US)

( * ) Notice: Subject to any disclaimer, the term of this patent is extended or adjusted under 35 U.S.C. 154(b) by 63 days.

(21) Appl. No.: 18/055,662

(22) Filed: Nov. 15, 2022

(65) Prior Publication Data

US 2024/0161629 A1 May 16, 2024

(51) Int. Cl.
*G08G 5/00* (2006.01)
*G01C 23/00* (2006.01)

(52) U.S. Cl.
CPC ........... *G08G 5/0021* (2013.01); *G01C 23/00* (2013.01); *G08G 5/0013* (2013.01); *G08G 5/0039* (2013.01)

(58) Field of Classification Search
CPC .... G01C 23/00; G08G 5/0013; G08G 5/0021; G08G 5/0039
See application file for complete search history.

(56) References Cited

U.S. PATENT DOCUMENTS

| | | | |
|---|---|---|---|
| 6,313,759 B1 | 11/2001 | Musland-Sipper | |
| 6,946,976 B1 | 9/2005 | Langner et al. | |
| 7,937,659 B2 | 5/2011 | Lensky | |
| 8,428,793 B2 * | 4/2013 | Mettes | G08G 5/00 244/175 |
| 8,570,192 B2 | 10/2013 | McLoughlin et al. | |
| 8,712,605 B1 | 4/2014 | Schulte et al. | |
| 8,755,952 B2 | 6/2014 | McGuffin et al. | |
| 9,330,573 B2 * | 5/2016 | Brandao | G08G 5/0021 |
| 9,459,120 B2 * | 10/2016 | Wischmeyer | H04L 67/12 |
| 9,558,668 B2 * | 1/2017 | Letsu-Dake | G08G 5/0039 |
| 9,592,921 B2 | 3/2017 | Paul Dominic et al. | |
| 9,614,800 B1 | 4/2017 | Pulczinski et al. | |

(Continued)

OTHER PUBLICATIONS

Garmin, "Data Comm: Easy and Efficient Cockpit Communication", downloaded from https://www.garmin.com/en-US/blog/aviation/data-comm-easy-and-efficient-cockpit-communication/, Apr. 27, 2020, pp. 1 through 4.

(Continued)

*Primary Examiner* — John A Tweel, Jr.
(74) *Attorney, Agent, or Firm* — Fogg & Powers LLC

(57) ABSTRACT

To facilitate improved Controller-Pilot Data Link Communication (CPDLC) interfacing, report messages can be automatically armed and displayed in a threaded message format in the same message panel with other CPDLC messages between a vehicle and a ground system. Upon determining that a report is needed based on an uplink CPDLC message from the ground system, a report message label is displayed on the CPDLC message panel. Once the report is ready, it is automatically armed and the report message label indicates to the operator that the report message is ready to be sent. The operator can also select the report message label in the message panel to display the report message.

20 Claims, 33 Drawing Sheets

(56) References Cited

U.S. PATENT DOCUMENTS

| | | |
|---|---|---|
| 9,626,872 B2 | 4/2017 | Judd et al. |
| 9,745,077 B1 | 8/2017 | Lentz et al. |
| 9,911,337 B1 | 3/2018 | Shapiro |
| 10,055,977 B2 | 8/2018 | Wang et al. |
| 10,204,430 B2 | 2/2019 | Gowda |
| 10,229,603 B2 | 3/2019 | Srinivasan et al. |
| 10,672,279 B2 | 6/2020 | Shamasundar et al. |
| 10,771,558 B2 * | 9/2020 | Shamasundar ........ G01C 23/00 |
| 10,887,255 B2 | 1/2021 | Thompson |
| 2003/0025682 A1 | 2/2003 | Dame |
| 2008/0163093 A1 | 7/2008 | Lorido |
| 2011/0137998 A1 | 6/2011 | Judd et al. |
| 2012/0066617 A1 | 3/2012 | Gupta et al. |
| 2012/0078494 A1 | 3/2012 | Judd et al. |
| 2013/0033387 A1 | 2/2013 | Trope |
| 2013/0141254 A1 | 6/2013 | McGuffin et al. |
| 2014/0229093 A1 | 8/2014 | Judy et al. |
| 2015/0212671 A1 | 7/2015 | Judy et al. |
| 2015/0339932 A1 | 11/2015 | Ramanna et al. |
| 2016/0035227 A1 | 2/2016 | Kumar et al. |
| 2016/0155337 A1 | 6/2016 | Krishna et al. |
| 2018/0300077 A1 | 10/2018 | Srinivasan et al. |
| 2019/0096267 A1 | 3/2019 | Shamasundar et al. |
| 2020/0116492 A1 | 4/2020 | Scott |
| 2020/0322290 A1 | 10/2020 | Thompson |
| 2020/0369405 A1 | 11/2020 | Ouellette et al. |
| 2020/0402412 A1 | 12/2020 | Shamasundar et al. |
| 2021/0118309 A1 | 4/2021 | Bushong et al. |
| 2023/0385323 A1* | 11/2023 | Agarwal ............... G06F 40/166 |

OTHER PUBLICATIONS

Garmin, "How do I log on to FAA Data Comm?", downloaded Aug. 9, 2022 from https://support.garmin.com/en-US/?faq=5vwfPwZboi5f33gRdLeYb7, pp. 1 through 10.
Rocketroute, "RocketRoute Supports CPDLC in Europe", Flying with RocketRoute, downloaded from https://www.rocketroute.com/blog/rocketroute-supports-cpdlc-in-europe, May 12, 2016, pp. 1 through 7.

* cited by examiner

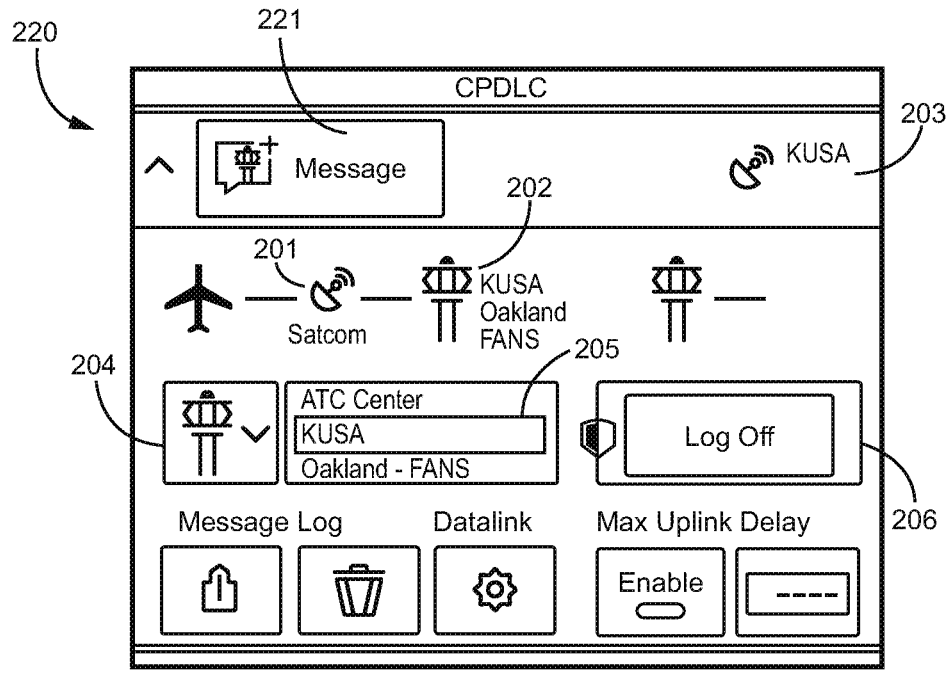
FIG. 2C
AMENDED

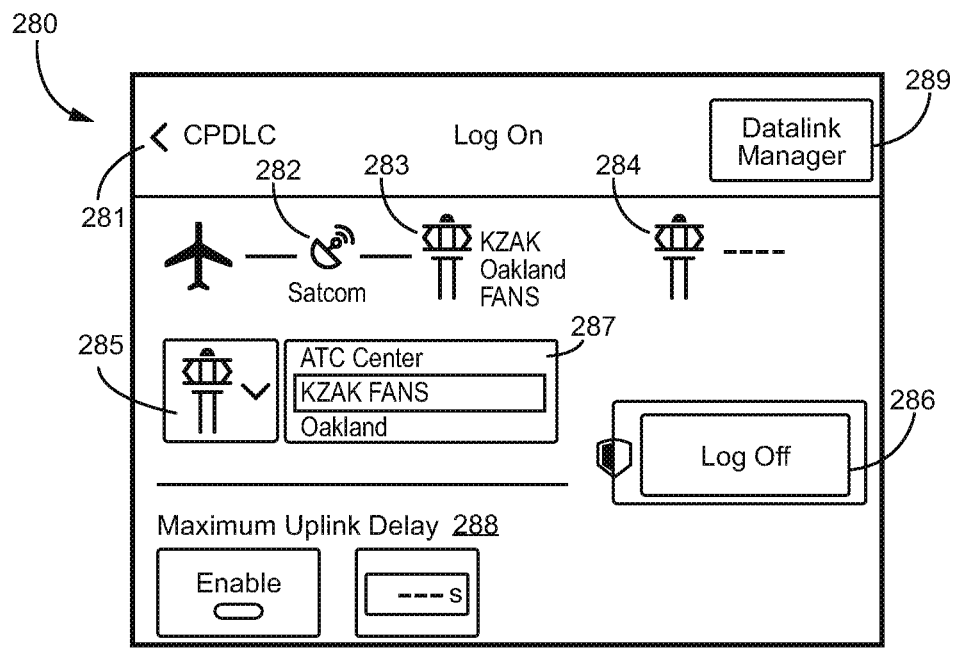
FIG. 2I
AMENDED

944

| Send Position Report | | ✕ |
|---|---|---|
| Last Waypoint<br>N34°11.35 W136°23.44 | | ATA<br>12:00z |
| To Waypoint<br>N35°22.35 W133°41.02 | | ETA<br>12:44z |
| Next Waypoint<br>FOOTS | | Destination ETA<br>02:56z |
| Speed<br>0.84 M | Current Altitude<br>38010 ft | Wind<br>130T 30M |
| Flight ID<br>HON889H | Temperature<br>-52 °C | |

Add Message

FIG. 35B

CPDLC REPORT THREADING AND AUTO ARM

CROSS-REFERENCE TO RELATED APPLICATIONS

This application is related to: U.S. patent application Ser. No. 18/055,620 entitled "DISPLAYING CONTROLLER-PILOT DATA LINK COMMUNICATION (CPDLC) MESSAGES IN A THREADED FORMAT," filed on even date herewith; U.S. patent application Ser. No. 18/055,631 entitled "CONTROLLER-PILOT DATA LINK COMMUNICATION LOGON PAGE," filed on even date herewith; U.S. patent application Ser. No. 18/055,646 entitled "CREATING CONTROLLER-PILOT DATA LINK COMMUNICATION (CPDLC) MESSAGES," filed on even date herewith; U.S. patent application Ser. No. 18/055,675 entitled "CPDLC LOGON TASK LIST," filed on even date herewith; all of which are incorporated herein by reference in their entirety.

BACKGROUND

The coordination of many commercial and private aircraft is controlled by the Air Traffic Control (ATC) system. The ATC system includes many ground systems or ground stations that send uplink messages to, and receive downlink messages from, aircraft. Many of these messages are sent as digital messages over a datalink referred to as the Controller-Pilot Data Link Communication (CPDLC). In the future, most of the ATC communication will be carried out through digital media such as CPDLC messages. Many messages are exchanged between the flight crew personnel and the ATC system during a flight. Messages exchanged between the aircraft and the ATC ground station include, but are not limited to, route clearances, lateral diversions, vertical diversions, speed changes, route modifications, and the like.

CPDLC functions can be processed and displayed to flight crew personnel in a variety of different formats. Currently, flight crew personnel must switch between displays and interfaces of multiple avionics devices, or between multiple panels within a display of an avionics device, to coordinate the many CPDLC functions needed to operate and navigate the aircraft. While performing many of these functions, the flight crew personnel may look at other instruments, gauges, switches, checklists, or other information or equipment to aid in operation of the aircraft. In doing so, the gaze of the flight crew is not focused on the scene in front of the aircraft. Moreover, some CPDLC functions, such as generating and sending a CPDLC message to the ground station, can be time intensive to gather and input the appropriate information, during which time the pilot must focus their attention on navigating through the displays and panels of multiple devices before the CPDLC message is finally approved and transmitted. The longer it takes the flight crew personnel to process CPDLC functions, the greater the likelihood of delays or more problematic, the risk of injury to the aircraft and the personnel onboard.

Thus, there is currently a need for improvements to expedite the various CPDLC functions used by personnel onboard the vehicle.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, an avionics device is disclosed. The avionics device is configured to be coupled to a vehicle. The avionics device comprises at least one processor configured to receive a first Controller-Pilot DataLink Communications (CPDLC) message from a ground system. The avionics device comprises a memory coupled to the at least one processor and configured to store a CPDLC interface application. When executed by the at least one processor, the CPDLC interface application causes the at least one processor to identify an indicator in the first CPDLC message that indicates a request for a report on at least one navigation parameter of the vehicle. The CPDLC interface application causes the at least one processor to generate a report message label in response to identifying the indicator in the first CPDLC message. The avionics device comprises a human-machine interface comprising a display screen coupled to the at least one processor. The human-machine interface is configured to display, on a first column of the display screen, the first CPDLC message received from the at least one processor in a threaded format. The human-machine interface is configured to display, on a second column correlated with the first column of the display screen, the report message label generated from the at least one processor in a threaded format.

In another embodiment, a method for responding to a Controller-Pilot Data Link Communications (CPDLC) message requesting a report is disclosed. The method comprises receiving a first CPDLC message from a ground system. The method comprises identifying an indicator in the first CPDLC message that indicates a request for a report on at least one navigation parameter of the vehicle. The method comprises generating a report message label in response to identifying the indicator in the first CPDLC message. The method comprises displaying, on a first column of a display screen in a panel body, the first CPDLC message in a threaded format. The method comprises displaying, on a second column correlated with the first column of the panel body, the generated report message label in a threaded format.

In yet another embodiment, a program product is disclosed. The program product comprises a non-transitory processor-readable medium on which program instructions configured to be executed by at least one processor are embodied. When executed by the at least one processor, the program instructions cause the at least one processor to receive a first Controller-Pilot DataLink Communications (CPDLC) message from a ground system. The program instructions cause the at least one processor to identify an indicator in the first CPDLC message that indicates a request for a report on at least one navigation parameter of the vehicle. The program instructions cause the at least one processor to generate a report message label in response to identify the indicator in the first CPDLC message. The program instructions cause the at least one processor to display, on a first column of a display screen in a panel body, the first CPDLC message in a threaded format. The program instructions cause the at least one processor to display, on a second column correlated with the first column of the panel body, the generated report message label in a threaded format.

Additional embodiments are also disclosed, as will be subsequently described.

DRAWINGS

Understanding that the drawings depict only exemplary embodiments and are not therefore to be considered limiting in scope, the exemplary embodiments will be described with additional specificity and detail through the use of the accompanying drawings, as briefly described below and as described further in the following detailed description.

FIGS. 2A to 2J depict example screen shots of CPDLC panels used for one or more CPDLC functions related to CPDLC logon and the CPDLC connection.

Figure 35:
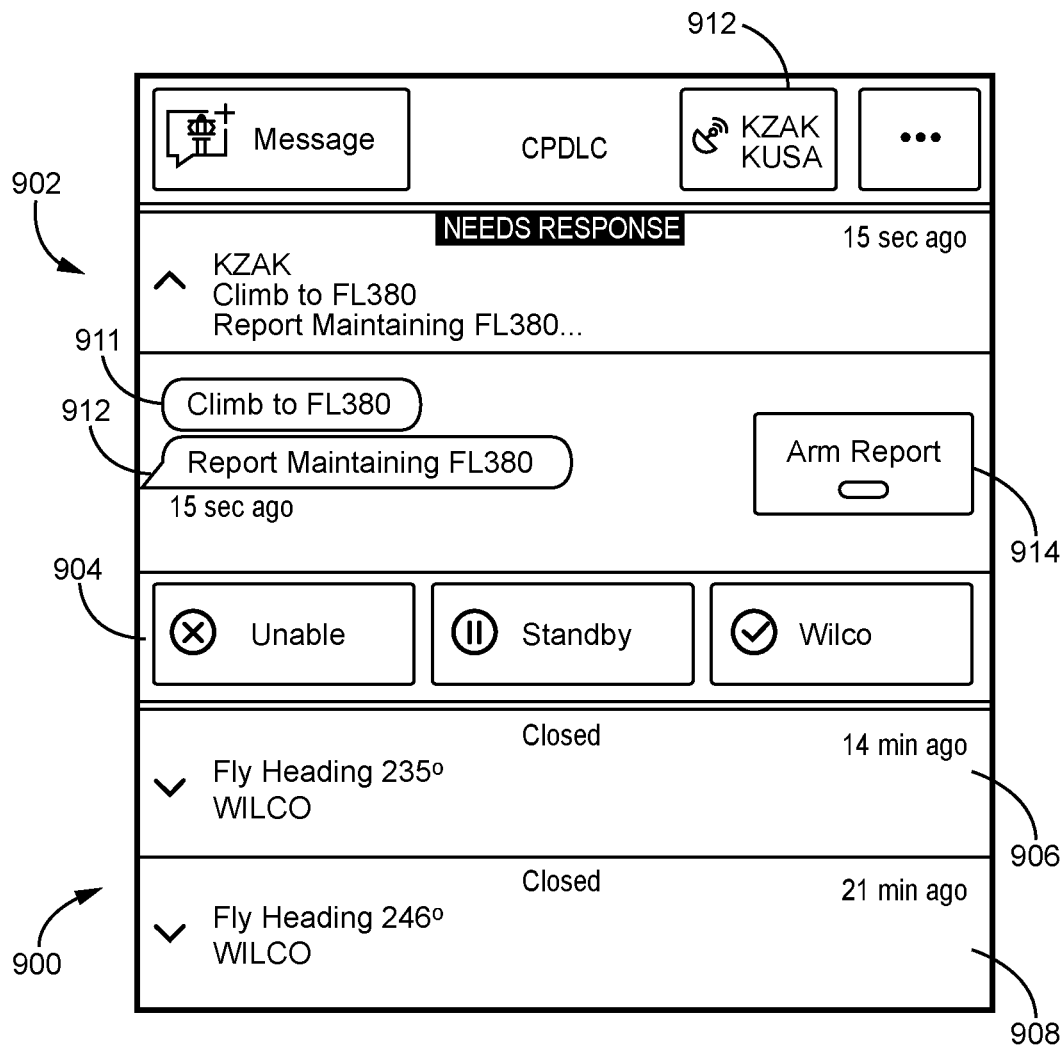
Figure 35A:
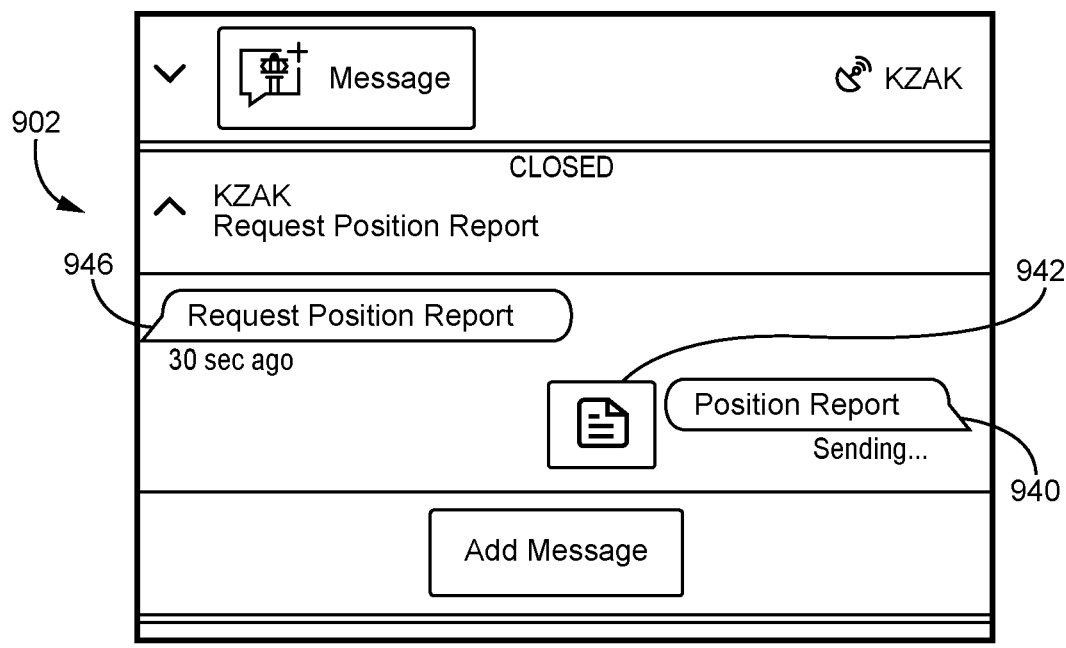

FIGS. 35, 35A, and 35B depict screenshots of one embodiment of a user interface on a display illustrating an exemplary panel body for responding to a request for a report from a ground system.

Figure 36:
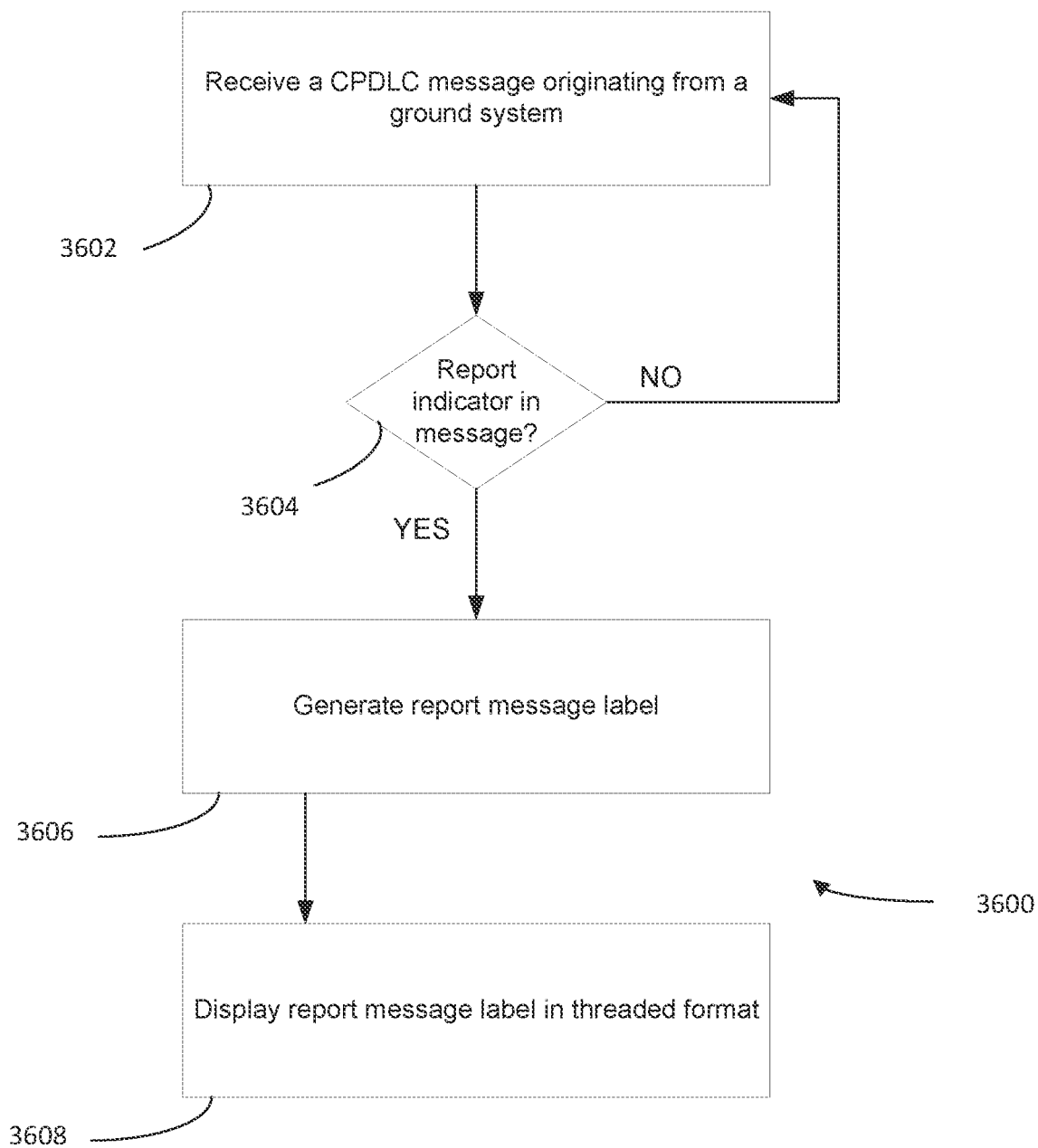

FIG. 36 depicts a flow diagram illustrating an exemplary method for responding to a CPDLC message requesting a report.

Figure 37:
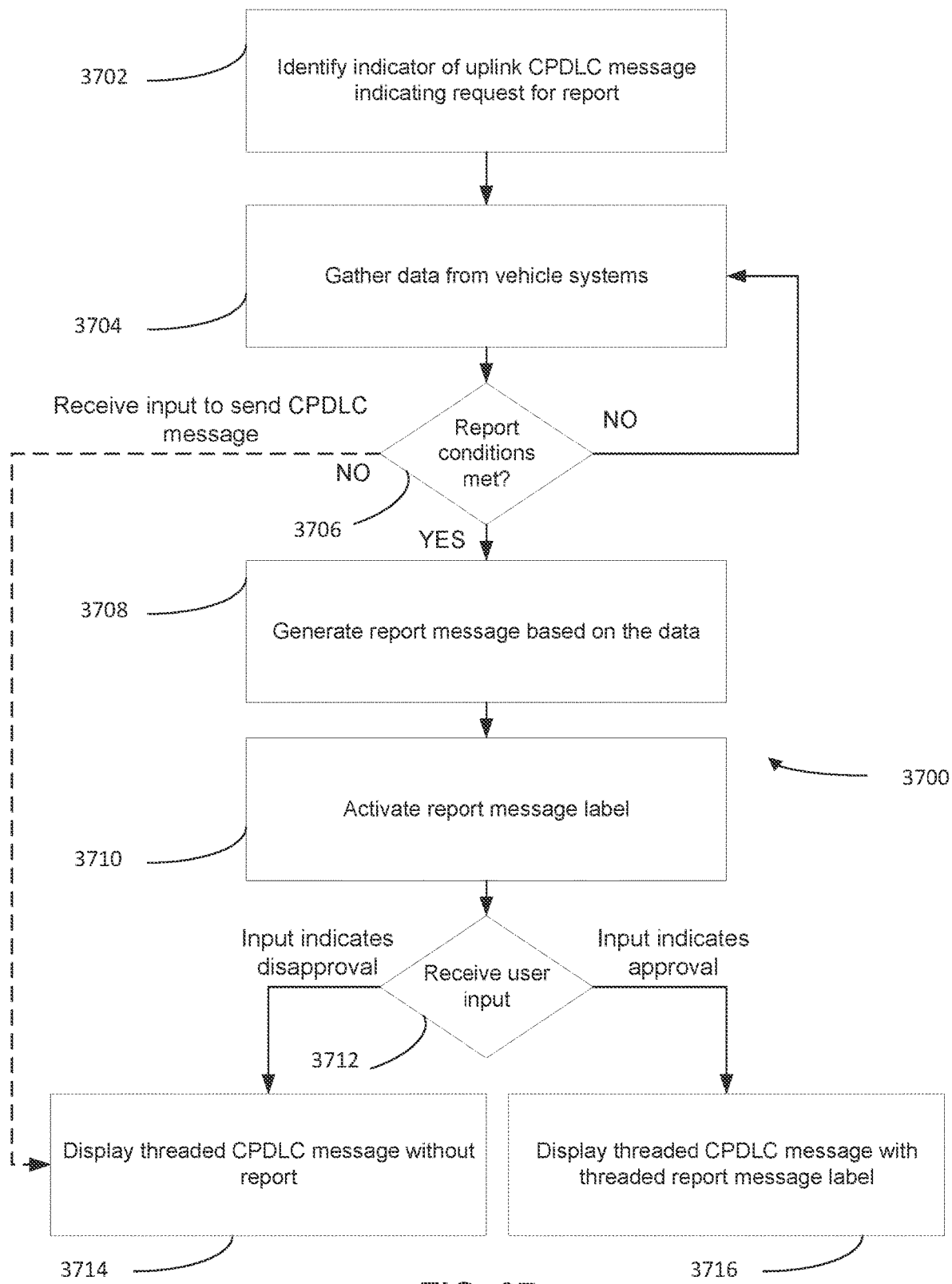

FIG. 37 depicts a flow diagram illustrating an exemplary method for responding to a CPDLC message requesting a report.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

I. Avionics System with Improved Interface for CPDLC Messages: Overview

Figure 1:
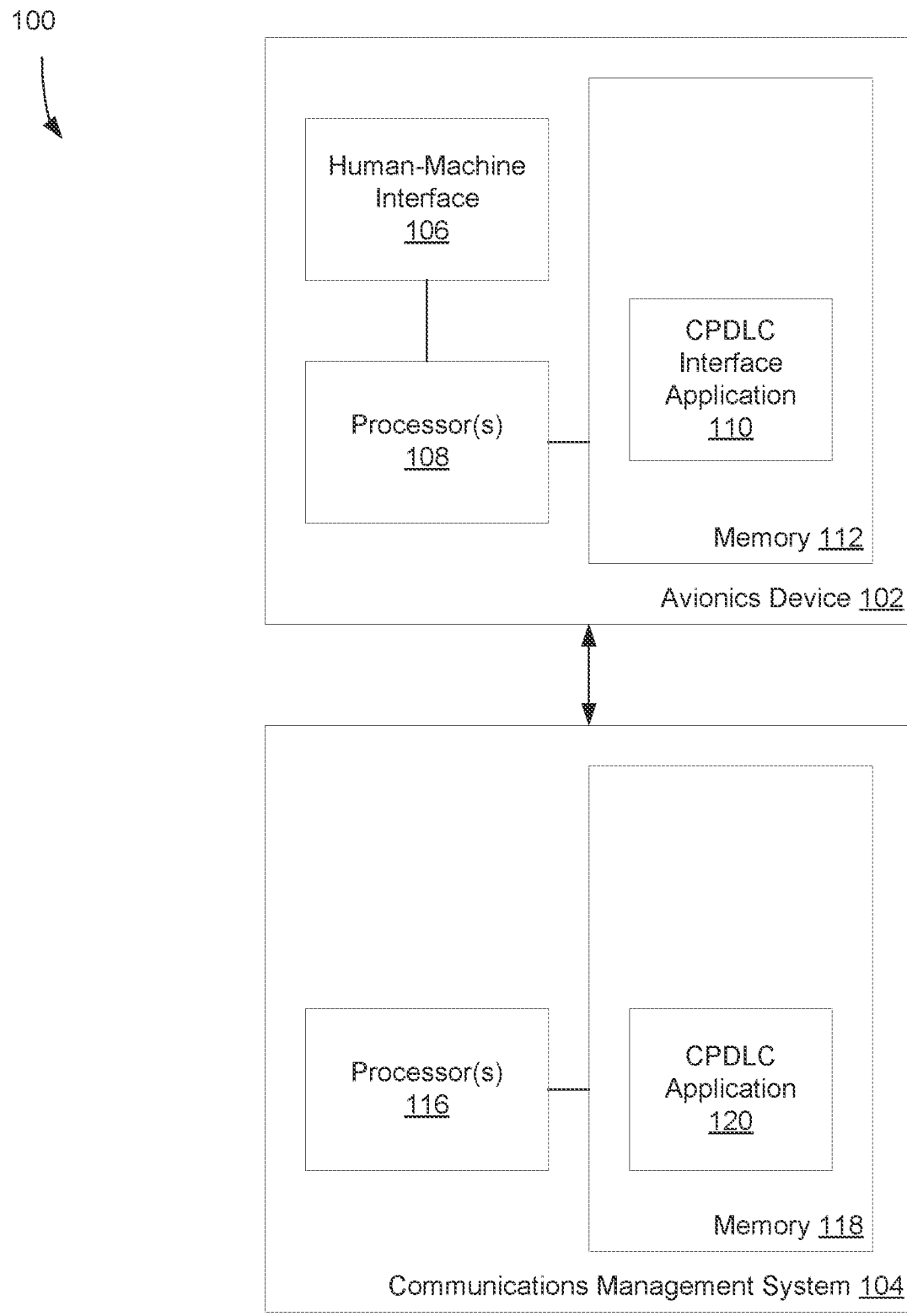
FIG. 1 depicts a block diagram of an exemplary system configured for processing one or more CPDLC functions.

FIG. 1 depicts a block diagram of a system, indicated generally at 100, configured to provide a user interface for creating and displaying CPDLC messages in an aerial vehicle for vehicle personnel. Use of the term "aerial vehicle" is not intended to be limiting and includes all classes of vehicles falling within the ordinary meaning of the term. This includes but is not limited to, commercial, non-commercial, or recreational aircraft, urban air mobility vehicles, and other vehicles. Throughout the disclosure, the aerial vehicle may be further illustrated as an aircraft with the understanding that the principles described herein apply to other aerial vehicles where applicable.

The system 100 includes at least one avionics device 102 coupled to a communications management system 104. Avionics device 102 can be an onboard avionics device that is affixed to (for example, mounted on) the interior of the vehicle, such as the cockpit. Alternatively, avionics device 102 is an offboard avionics device that is portable and can be taken off the vehicle. Examples of onboard and offboard avionics devices include a navigational display device, a primary flight display, a Maintenance Terminal, a Cabin terminal, an electronic flight bag (EFB), or a tablet, smartphone or other portable electronic device (PED) that is configured for running one or more avionics applications with a display or interface. The avionics device 102 includes at least one human-machine interface (HMI) 106 that is configured to display and visualize data to the vehicle personnel (for example, operator and flight crew), and also enables the personnel to input or select data. For example, HMI 106 includes or is coupled to any kind of input device (computer mouse, buttons, switches, and the like). In some examples, HMI 106 includes a screen with touchscreen functionality or cursor selection capability so that the vehicle personnel can input data directly on the screen.

In addition to a HMI 106, the avionics device 102 includes at least one processor 108 and a memory 112. Memory 112 stores a CPDLC application described further below. Processor 108 receives signals from HMI 106 with input data from the vehicle personnel and processes the signals to perform one or more functions for the avionics device 102. For example, to utilize the CPDLC functionality of the avionics device 102, processor 108 accesses the instructions of CPDLC interface application 110 and processes input data from the vehicle personnel based on the instructions of CPDLC interface application 110.

Avionics device 102 is coupled to a communications management system (CMS) 104, e.g., either through a wired connection or wireless connection. The CMS 104 is configured to send downlink messages and receive uplink messages. Optionally, each avionics device 102 registers with the CMS 104 before the avionics device 102 receives or transmits data to the CMS 104. In the uplink direction, CMS 104 receives an uplink message from a ground station (not shown in FIG. 1) via a communication link (e.g., via high frequency (HF), very-high frequency (VHF), satellite communications (SATCOM), ACARS over internet protocol (AoIP)), processes the uplink message, and routes the uplink message to one or more avionics devices 102. In the downlink direction, one or more avionics devices 102 transmit a downlink message to CMS 104 where the CMS 104 processes the downlink message and transmits a downlink datalink message to a ground station. In some examples, the CMS 104 is or includes a communications management unit (CMU) or a communications management function (CMF) executed by one or more processors (e.g., processor 116). CMS 104 can also include or be coupled to a flight management system (FMS).

Processor 116 is configured to access the instructions of CPDLC application 120 stored in memory 118 to process and route CPDLC messages to avionics device 102 in the uplink path and to a ground station from avionics device 102 in the downlink path. For example, when CMS 104 receives a CPDLC message, processor 116 implements the instructions of CPDLC application 120 to determine information such as the type of message (e.g., downlink or uplink), the intended recipient, and date embodied in the message. CMS 104 then routes the CPDLC message to its intended recipient based on the determined data in the CPDLC message, and may also store data in the received CPDLC message in memory 118.

In the downlink path, processor 108 is configured to generate a CPDLC message based on the instructions of CPDLC interface application 110. In one example, CPDLC interface application 110 instructs processor 108 to send a call to CMS 104 based on the input data received from HMI 106. In response, CPDLC application 120 instructs processor 116 to generate a draft message with the data provided by avionics device 102 and sends the draft message to processor 108. Processor 108 provides the draft message to HMI 106, where it is displayed to the operator or flight crew for review. The operator or flight crew can then approve or revise the draft message by interfacing with HMI 106. Upon review, the draft message is transmitted from avionics device 102 to CMS 104. CPDLC application 120 then instructs processor 116 to finalize the CPDLC message and to transmit the message to the intended recipient. Alternatively, CPDLC interface application 110 of avionics device 102 generates and finalizes the CPDLC message directly on avionics device 102 without interaction with the CMS 104. In such examples, the finalized CPDLC message is sent from avionics device 102 to the CMS 104 for routing and transmission to the intended recipient.

In the uplink path, processor 116 receives a CPDLC message and processes the message as previously described. CMS 104 then transmits the CPDLC message to the intended avionics device 102. In response to receiving the CPDLC message, CPDLC interface application 110 instructs processor 108 to display the CPDLC message via HMI 106. The CPDLC message may require response input from the operator or flight crew. Accordingly, in some examples processor 108 undergoes further processing of the CPDLC message and optionally stores data in memory 112.

Processor 108, processor 116, or any of the processing systems described herein may include any one or combination of processors, microprocessors, digital signal processors, application specific integrated circuits, field programmable gate arrays, and/or other similar variants thereof. Any processing systems may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

Memory 112, memory 118, or any of the storage systems described herein can include any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as a program product comprising instructions stored in non-transitory computer readable media, such as random access memory (RAM), read-only memory (ROM), non-volatile RAM, electrically-erasable programmable ROM, flash memory, or other storage media. The memory may also include one or more databases to store acquired data. Each storage system can be implemented by appropriate circuitry.

As previously described, CPDLC supports display interfacing via HMI 106. When an operator or flight crew desires to implement CPDLC functionality on avionics device 102, the operator or flight crew will input appropriate data to initialize a CPDLC session (for example, by using an input device to select an indicator on the screen that corresponds to stored CPDLC interface application 110). When selected, CPDLC interface application 110 instructs processor 108 to display one or more panels on the HMI 106. Each panel includes data corresponding to one or more CPDLC functions. For example, if the operator or flight crew desires to log on to a CPDLC program supported by CPDLC interface application 110, create a CPDLC message, or complete one or more tasks supported by CPDLC application 110, the operator or flight crew can select the appropriate panel displayed on HMI 106 and input or view data in the respective panel. Various examples of improved CPDLC interfacing are described with respect to FIGS. 2-37 below.

II. CPDLC Logon Page

Typically, a CPDLC logon page includes tabs and data that is presented to pilots primarily using text on a display. In many situations, the data presented is confusing for pilots because information typically presented on the CPDLC logon page (such as, for example, origin, destination, flight ID, or registration) cannot be modified by the pilot, let alone modified using the CPDLC logon page. Other issues arise because the CPDLC logon information (for example, Current Data Authority (CDA), Next Data Authority (NDA), Subnetwork, etc.) is typically stored or embedded in the CPDLC logon page, so the CPDLC logon page is the only place where the CPDLC logon information can be found. This has led to pilots either not having the CPDLC logon information readily available or having to keep the CPDLC logon page open rather than focusing on CPDLC messages.

FIGS. 2A-2J depict example screen shots of a CPDLC panel (for example, a CPDLC graphical user interface) generated on the HMI 106 by the processor 108 executing the CPDLC interface application 110. The CPDLC panel can be used for one or more CPDLC functions related to CPDLC logon and the CPDLC connection.

FIGS. 2A-2G depict example screen shots of a first embodiment of a CPDLC panel generated on the HMI 106 by the processor 108 executing the CPDLC interface application 110 and used for CPDLC logon and display of the CPDLC connection. The same reference numbers are used for the same features shown in different screen shots in FIGS. 2A-2G. Also, after FIG. 2A, the only reference numbers listed are for those features that have changed since the previous screen shot in the sequence.

Figure 2A:
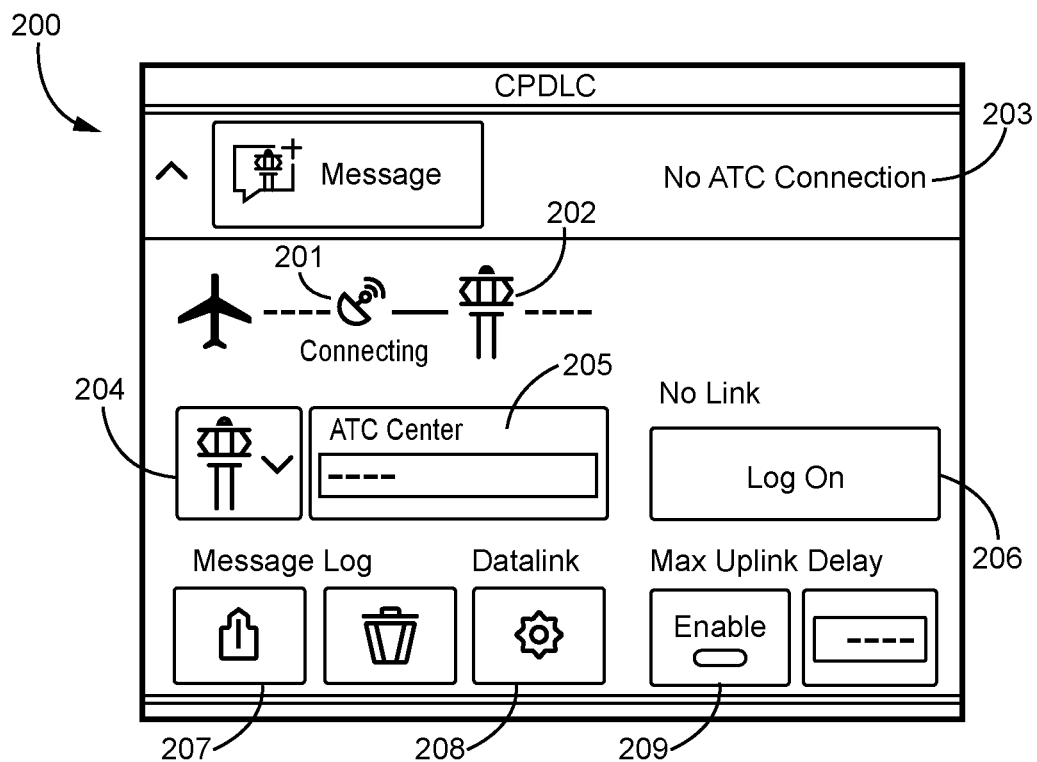

FIG. 2A depicts an initial screen shot 200 of a CPDLC panel prior to a CPDLC session being established. The CPDLC panel includes a number of icons that indicate the status of various portions of the CPDLC connection. The CPDLC panel includes a subnetwork icon 201 that indicates a type of subnetwork connection used for the CPDLC connection and the status of the subnetwork connection. In the example shown in FIG. 2A, the subnetwork icon 201 indicates that the aircraft is in the process of forming a connection via Satcom. The CPDLC panel also includes a CDA icon 202 that indicates the identity of the CDA, if any, and a status of the connection to the CDA. In the example shown in FIG. 2A, the CDA icon 202 indicates that there is currently no CDA. In some examples, the CDA icon 202 includes a graphical image, text, or a combination. The CPDLC panel also includes a CPDLC connection indicator 203 in the header. In the example shown in FIG. 2A, the CPDLC connection indicator 203 shows that there is currently no ATC Connection for the aircraft in question.

In the example shown in FIG. 2A, the CPDLC panel includes an ATC center icon 204 that can be used for selecting an ATC center as the CDA. In some examples, by selecting (for example, by clicking or touching the ATC center icon 204), the pilot is shown a dropdown list of potential ATC centers that can be selected. In some such examples, the dropdown list of potential ATC centers is populated using a local database stored on the avionics device 102 (for example, in memory 112) or on the CMS 104 (for example, in memory 118). In the example shown in FIG. 2A, the CPDLC panel includes an ATC indicator 205 that shows the selected ATC center, if applicable.

In the example shown in FIG. 2A, the CPDLC panel also includes a log on/off button 206 that can be used by the pilot to log on/off to/from a CPDLC session. In some examples, the log on/off button 206 is only activated for selection if all of the criteria necessary for establishing a CPDLC session is met. In some examples, the criteria that is missing and preventing activation of the log on/off button 206 is listed near the log on/off button 206. In the example shown in FIG. 2A, the log on/off button is not activated since there is no link established (for example, no subnetwork connection or connection to an ATC center).

In the example shown in FIG. 2A, the CPDLC panel further includes other icons that enable a pilot to execute functionality related to CPDLC messages (for example, using the message log/trash icons shown collectively at 207), to open another page, panel, etc. (for example, using the datalink settings icon 208), or to enable and modify parameters related to the CPDLC session (for example, using the max uplink delay icons shown collectively at 209).

Figure 2B:
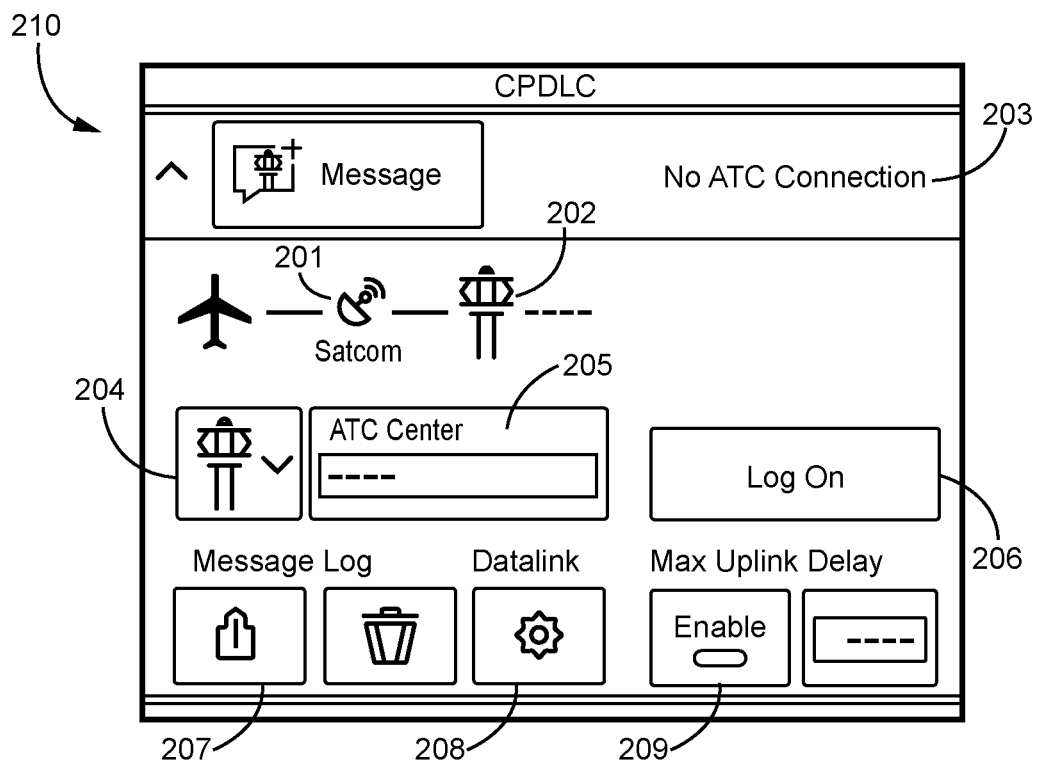

FIG. 2B depicts an example screen shot 210 of a CPDLC panel prior to a CPDLC session being established. In the example shown in FIG. 2B, the subnetwork icon 201 that indicates a type of subnetwork connection used for CPDLC and the status of the connection has changed compared to FIG. 2A. In particular, in the example shown in FIG. 2B, the subnetwork icon 201 can be modified to indicate that the aircraft has successfully formed a subnetwork connection via Satcom by turning green. In some examples, the link between an aircraft icon and the subnetwork icon 201 is also changed to green when the aircraft has successfully formed a subnetwork connection.

In the example shown in FIG. 2B, the log on/off button 206 that can be used by the pilot to log on to a CPDLC session is still inactivated. However, in the example shown in FIG. 2B, the "No Link" message indicating the reason for non-activation of the log on/off button 206 is gone since the subnetwork link via Satcom is available. In the example shown in FIG. 2A, the log on/off button is not activated since there is no ATC center selected or indicated as being used for the CDA.

FIG. 2C depicts an example screen shot 220 of a CPDLC panel. The CDA icon 202 that indicates the identity of the CDA and a status of the connection to the CDA has changed compared to FIGS. 2A-2B. In particular, in the example shown in FIG. 2C, the CDA icon 202 indicates that a successful connection with the CDA (KUSA Oakland FANS) is established. In some examples, such as the example shown in FIG. 2C, in addition to populating the information regarding the CDA in the CDA icon 202, the color of the CDA icon 202 can also be updated (for example, to green) to indicate a successful connection to the CDA. In some examples, the link between the subnetwork icon 201 and the CDA icon 202 is changed to green when the aircraft has successfully formed a subnetwork connection.

In the example shown in FIG. 2C, the CPDLC connection indicator 203 in the header has also changed compared to FIGS. 2A-2B. In particular, in the example shown in FIG. 2C, the CPDLC connection indicator 203 shows that there is currently an activate Satcom connection and that KUSA is the CDA. In some examples, the CPDLC connection indicator 203 is updated to include icons and/or text to display information regarding the active subnetwork and the CDA. In some examples, such as the example shown in FIG. 2C, the color of the icons and/or text of the CPDLC connection indicator 203 can be changed to green to indicate a successful connection.

In the example shown in FIG. 2C, the ATC indicator 205 has also changed compared to FIGS. 2A-2B. In particular, in the example shown in FIG. 2C, the ATC center indicator 205 shows that KUSA Oakland FANS is currently selected as the ATC center.

In the example shown in FIG. 2C, since a connection has been established with the CDA, the log on/off button 206 is active and locked (for example, to prevent a single click from logging off from the CPDLC session). When the locked log on/off button 206 is selected, an additional prompt is shown to the pilot to confirm that the CPDLC session should be closed.

In the example shown in FIG. 2C, an active new message button 221 is included in the CPDLC header. The new message button 221 is activated once a CPDLC connection has been established between the aircraft and the CDA.

Figure 2D:
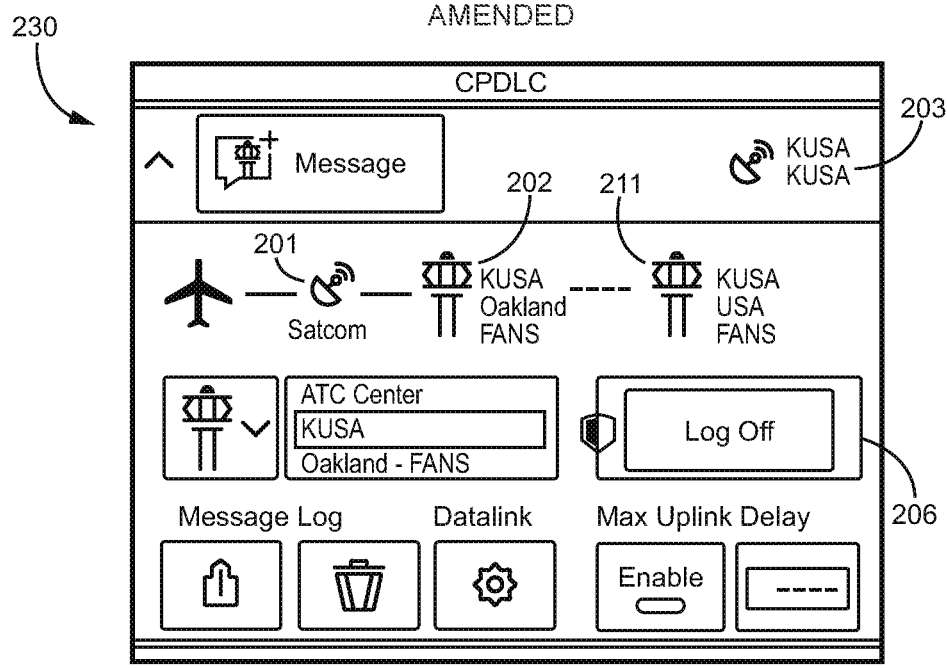

FIG. 2D depicts an example screen shot 230 of a CPDLC panel. In the example shown in FIG. 2D, the CPDLC panel further includes an NDA icon 211 that indicates the identity of the NDA. In the example shown in FIG. 2D, the NDA icon 211 indicates that the NDA is KUSA USA FANS. In some examples, the NDA icon 211 includes a graphical image, text, or a combination. In some examples, such as the example shown in FIG. 2D, in addition to populating the information regarding the NDA in the NDA icon 211, the color of the NDA icon 211 can be set to be different than the CDA icon 202 (for example, blue).

In the example shown in FIG. 2D, the CPDLC connection indicator 203 in the header has also changed compared to FIGS. 2A-2C. In particular, in the example shown in FIG. 2D, the CPDLC connection indicator 203 has been updated to show that there is currently an NDA (KUSA). In the example shown in FIG. 2D, the color of the text showing the NDA in the CPDLC connection indicator 203 can be set to blue (or another color) to correspond to the NDA icon 211.

Figure 2E:
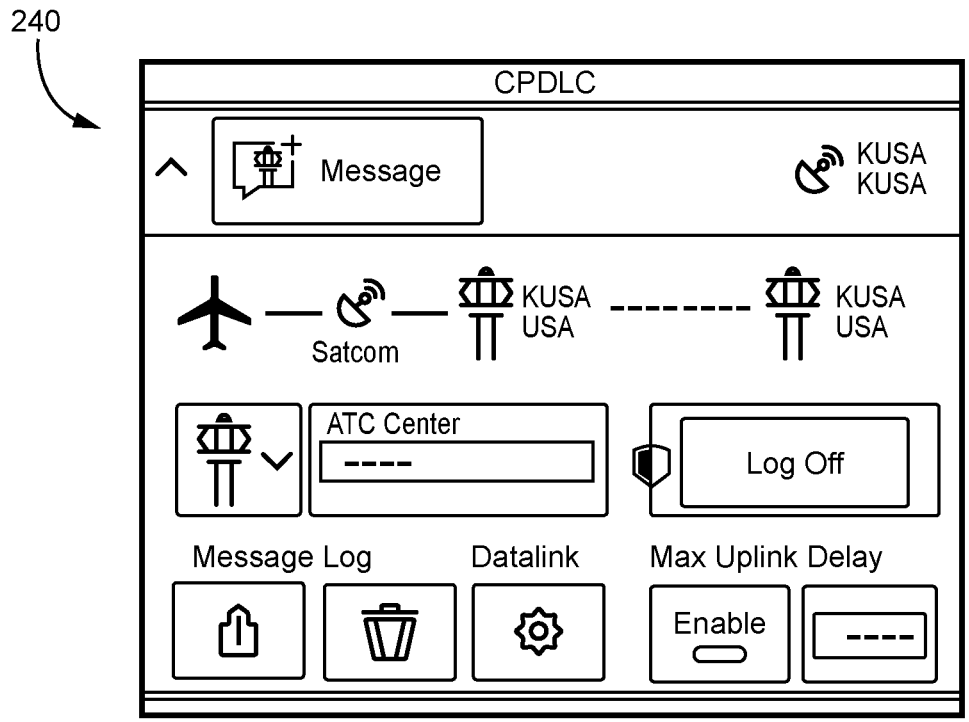

FIG. 2E depicts an example screen shot 240 of a CPDLC panel. FIG. 2E is an alternative configuration of the CPDLC panel to that in the screen shot 230 shown in FIG. 2D. In the example shown in FIG. 2E, the subnetwork icon 201, CDA icon 202, and the NDA icon 211 are not filled in with color. In some examples, the activate status of the subnetwork and connection to the CDA can be indicated with green lines only rather than with green icons.

Figure 2F:
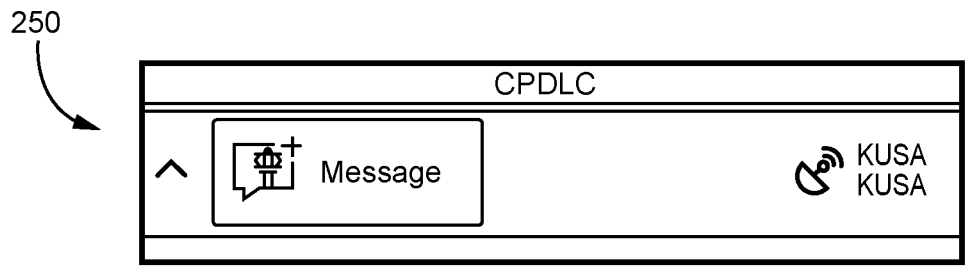

FIG. 2F depicts an example screen shot 250 of a CPDLC panel. In the example shown in FIG. 2F, the CPDLC logon portion of the CPDLC panel is minimized and only the header of the CPDLC panel remains. The header of the CPDLC panel still includes the CPDLC connection indicator 203 even after the logon portion of the panel is minimized.

Figure 2G:
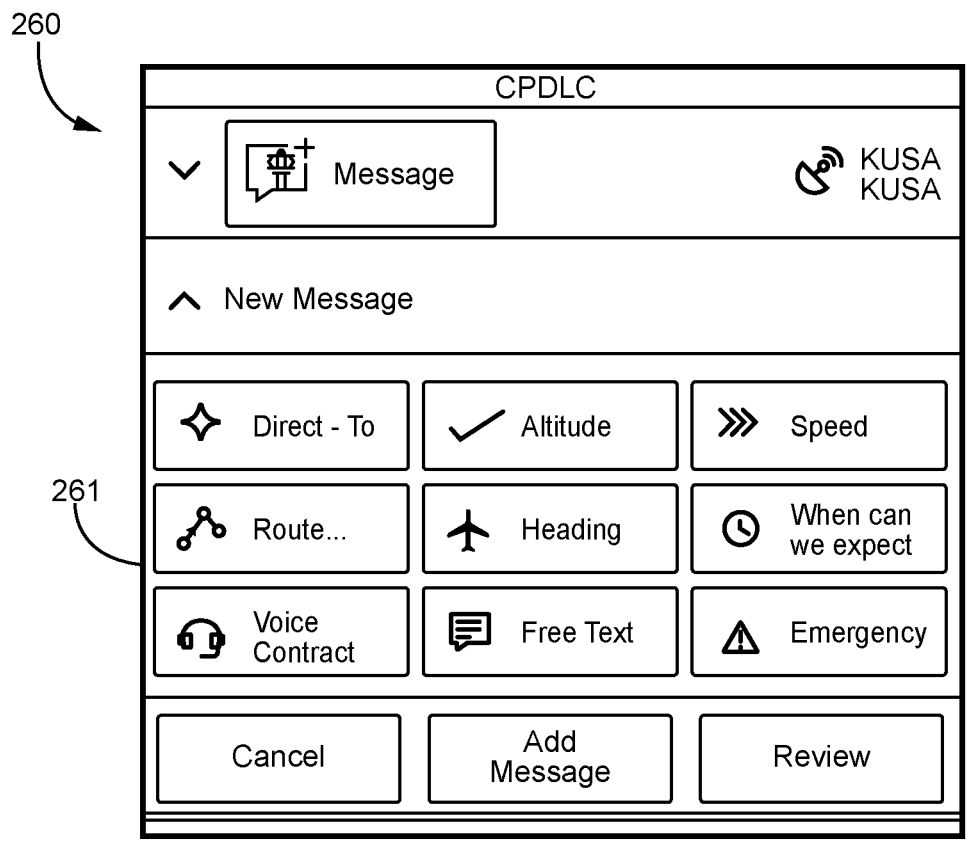

FIG. 2G depicts an example screen shot 260 of a CPDLC panel. In the example shown in FIG. 2G, the CPDLC panel includes a number of buttons that provide various functionality to the pilot in a new message portion 261. The particular buttons and functions provided in the new message portion 261 can be adapted depending on the desired functionality of the system.

Figure 2H:
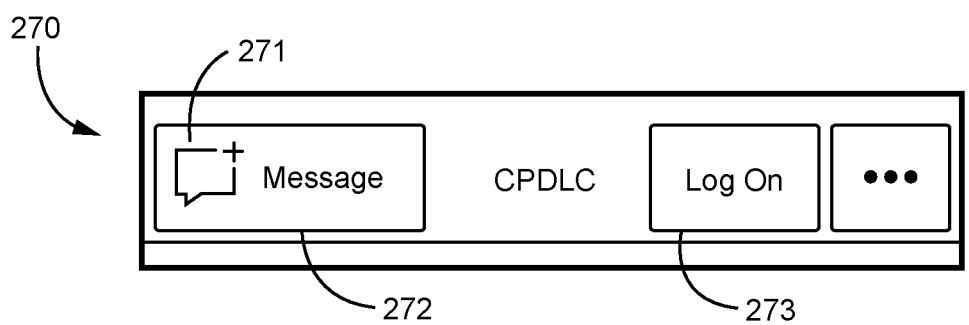
Figure 2J:
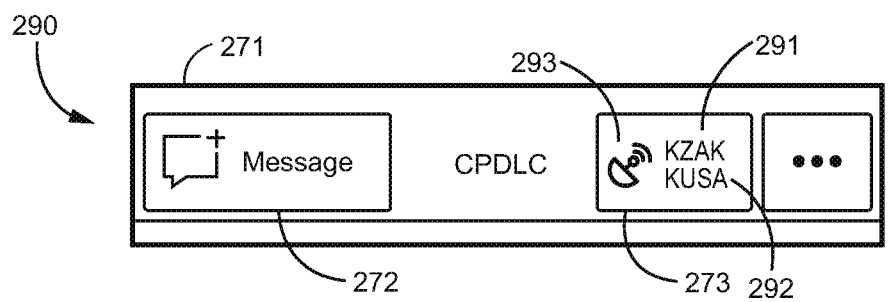

FIGS. 2H-2J depict example screen shots of a panel used for a second embodiment related to CPDLC logon and display of the CPDLC connection. FIGS. 2H-2J depict example screen shots of a second embodiment of a CPDLC panel generated on the HMI 106 by the processor 108 executing the CPDLC interface application 110 and used for CPDLC logon and display of the CPDLC connection. The same reference numbers are used for the same features shown in different screen shots in FIGS. 2H-2J. Also, after FIG. 2H, the only reference numbers listed are for those features that have changed since the previous screen shot in the sequence.

FIG. 2H depicts an example screen shot 270 of a CPDLC panel prior to a CPDLC session being established. In the example shown in FIG. 2H, the CPDLC panel includes a header 271 that includes a new message button 272 and a CPDLC connection button 273. In some examples, the new message button 272 in the header 271 is not activated until a CPDLC connection has been established between the aircraft and the CDA. In the example shown in FIG. 2H, the CPDLC connection button 273 indicates that a current connection is not established and logon is required. In some examples, additional functionality can be linked to the header 271, for example, using one or more additional buttons 274.

FIG. 2I depicts an example screen shot 280 of a logon screen of the CPDLC panel. In the example shown in FIG. 2H, the logon screen of the CPDLC panel includes a logon header 281. The logon screen of the CPDLC panel includes a number of icons that indicate the status of various components of the CPDLC connection. The logon page of the CPDLC panel includes a subnetwork icon 282 that indicates a type of subnetwork connection used for CPDLC and the status of the connection. In the example shown in FIG. 2I, the subnetwork icon 282 indicates that the aircraft has successfully formed a subnetwork connection via Satcom. The logon page of the CPDLC panel also includes a CDA icon 283 that indicates the identity of the CDA, if any, and a status of the connection to the CDA. In the example shown in FIG. 2I, the CDA icon 283 indicates that a successful connection with the CDA (KZAK Oakland FANS) is established. In some examples, the CDA icon 283 includes a graphical image, text, or a combination. In some examples, such as the example shown in FIG. 2I, in addition to populating the information regarding the CDA in the CDA icon 283, the color of the CDA icon 283 can also be updated (for example, to green) to indicate a successful connection to the CDA.

In the example shown in FIG. 2I, the logon page of the CPDLC panel also includes an NDA icon 284 that indicates the identity of the NDA, if any. In the example shown in FIG. 2I, the NDA icon 284 indicates that there is currently no NDA. In some examples, the NDA icon 284 includes a graphical image, text, or a combination. Similar to FIG. 2D above, in some examples, in addition to populating the information regarding the NDA in the NDA icon 284, the color of the NDA icon 284 can be set to be different than the CDA icon 283 (for example, blue).

In the example shown in FIG. 2I, the CPDLC panel includes an ATC center icon 285 that can be used for selecting an ATC center as CDA. In some examples, by selecting (for example, by clicking or touching the ATC center icon 285), the pilot is shown a dropdown list of potential ATC centers that can be selected. In some such examples, the dropdown list of potential ATC centers is populated using a local database stored on the avionics device 102 (for example, in memory 112) or on the CMS 104 (for example, in memory 118). In the example shown in FIG. 2I, the CPDLC panel includes an ATC indicator 287 that shows the selected ATC center as being KZAK Oakland FANS.

In the example shown in FIG. 2I, the logon page of the CPDLC panel also includes a log on/off button 286 that can be used by the pilot to log on/off to/from a CPDLC session. In some examples, the log on/off button 286 is only activated for selection if all of the criteria necessary for establishing a CPDLC session is met. In some examples, the criteria that is missing and preventing activation of the log on/off button 286 is listed near the log on/off button 286. In the example shown in FIG. 2I, since a connection has been established with the CDA, the log on/off button 286 is active and locked (for example, to prevent a single click from logging off from the CPDLC session). When the locked log on/off button 286 is selected, an additional prompt is shown to the pilot to confirm that the CPDLC session should be closed.

In the example shown in FIG. 2I, the logon page of the CPDLC panel further includes other buttons that enable a pilot to enable and modify parameters related to the CPDLC session (for example, using the max uplink delay icons shown collectively at 288) or to opening another panel (for example, using the datalink button 289).

FIG. 2J depicts an example screen shot 290 of a CPDLC panel. In the example shown in FIG. 2J, the new message button 272 is activated since a CPDLC connection has been established with the CDA (KZAK). In the example shown in FIG. 2J, the CPDLC connection button 273 has changed compared to FIG. 2H. In particular, the CPDLC connection button 273 includes a CDA indicator 291 that identifies the CDA, an NDA indicator 292 that identifies the NDA, and a subnetwork icon 293 that identifies the type of subnetwork utilized for the CPDLC connection. By retaining the CPDLC connection button 273 in the header 271, which includes the CDA indicator 291, NDA indicator 292, and subnetwork icon 293, the pilot will always have the CPDLC connection information readily available when using the CPDLC panel.

In both the embodiments described with respect to FIGS. 2A-2J, the CPDLC connection information can also be provided via one or more panels in addition to the CPDLC panel on a flight deck. For example, the CPDLC connection information can be included via a CPDLC connection icon or CPDLC connection button on the home page of the flight deck or in a header of additional panels used by the pilot.

By retaining the CPDLC connection indicator 203 or the CPDLC connection button 273 in the header of the CPDLC panel and/or additional panels, the pilot will always have the CPDLC connection information (for example, the current subnetwork, CDA, and NDA for the CPDLC connection) readily available without needing to have a separate CPDLC logon page open at all times. This enables the pilot to keep focus on the CPDLC messages rather than the CPDLC logon page and/or reduce the number of panels opened at a time, which increases efficiency.

III. CPDLC Logon Task List

For many devices that enable CPDLC functionality, an operator must complete a logon process to log into a particular CPDLC session with a ground system. Such a logon process involves completing one or more tasks related to the navigation of the aircraft. In some situations, completing these tasks may involve switching and browsing between multiple screens of multiple avionics devices. Additionally, a conventional logon page does not include a list of what tasks need to be completed to establish a CPDLC session with the ground system. Accordingly, an operator must rely on experience, trial and error, or a combination thereof, to remember which tasks need to be completed for a CPDLC session with a particular ground system, which may lead to delays during the logon process.

Embodiments of the present invention provide a task list displayed on a logon page for logging on to a CPDLC session. The task list includes one or more tasks that need to be completed by the operator to establish a CPDLC session with a ground system. In some examples, the logon task list generates an indicator next to a task once it is completed. In other examples, the logon task list displays only tasks that have not yet been completed and removes any tasks from the task list once they have been completed. In doing so, the operator can easily determine which tasks need to be completed to establish a CPDLC session and complete the logon process using the same display screen.

Figure 3:
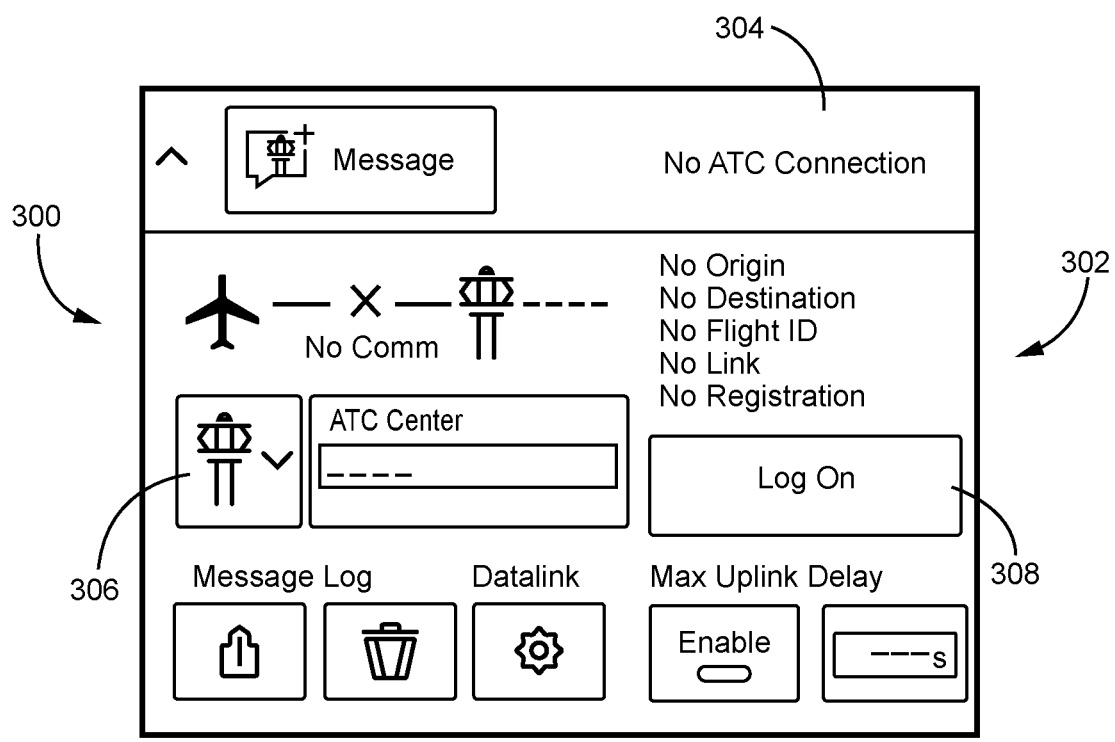
FIG. 3 depicts a screenshot of an exemplary panel including a logon task list.

FIG. 3 depicts a screenshot of an exemplary panel including a logon task list. The panel is one of many panels which can be displayed on a screen by HMI 106 of avionics device 102 implementing the functionality of CPDLC interface application 110. Panel 300 includes a plurality of labels and/or buttons that, when selected by the operator, may enable one or more functions supported by CPDLC interface application 110. In the interest of clarity and brevity, these panels and buttons are not described specifically in the context of FIG. 3 but may be included in the same panel that displays the logon task list 302.

Panel 300 displays, on the right side for pedagogical explanation, a task list 302 that must be completed to log on to a CPDLC session with a ground system. The task list 302 includes one or more task labels that correspond to one or more tasks that must be completed by the operator before the operator can log onto the CPDLC session.

As shown in FIG. 3, the task list 302 includes the task labels "No Origin", "No Destination", "No Flight ID", "No Link", and "No Registration," each of which corresponds to a particular task that needs to be completed. The "No Origin" label corresponds to a task in which the operator must input an appropriate origin location for the aircraft. The "No Destination" label corresponds to a task in which the operator must input an appropriate destination for the aircraft. The "No Flight ID" label corresponds to a task in which the operator must input the identification information of the aircraft. The "No Link" label indicates that no CPDLC-enabled link has been established with an appropriate ground system. Lastly, the "No Registration" label indicates that the operator cannot input a registration. Other tasks may be required, depending on the specific implementation of CPDLC.

The current communication status is also displayed (optionally) at panel portion 304, which, consistent with the "No Link" label displayed in task list 302, shows no connection established between the aircraft icon and the ground system icon. A ground system can be selected by interfacing with button 306 (which can also support a dropdown menu) and selecting a ground system from a list of stored ground systems. In some examples, the tasks required for establishing a CPDLC session (and the corresponding labels displayed in task list 302) depend on the selected ground system.

In some examples, the log on button 308 is disabled when at least one task in the task list has not yet been completed. When at least one task is still pending, the log on button 308 may have a distinct appearance indicating to the operator that the log on button 308 cannot be selected. For example, as shown in FIG. 3, the log on button 308 is faded or "grayed out." If the operator were to try to establish a CPDLC session by selecting the log on button 308 while at least one task label is present in the task list 302, the log on button 308 would not respond to the selection at least until each of the tasks has been completed. When every task has been completed, the log on button 308 can be activated to enable a CPDLC session when selected.

Figure 4:
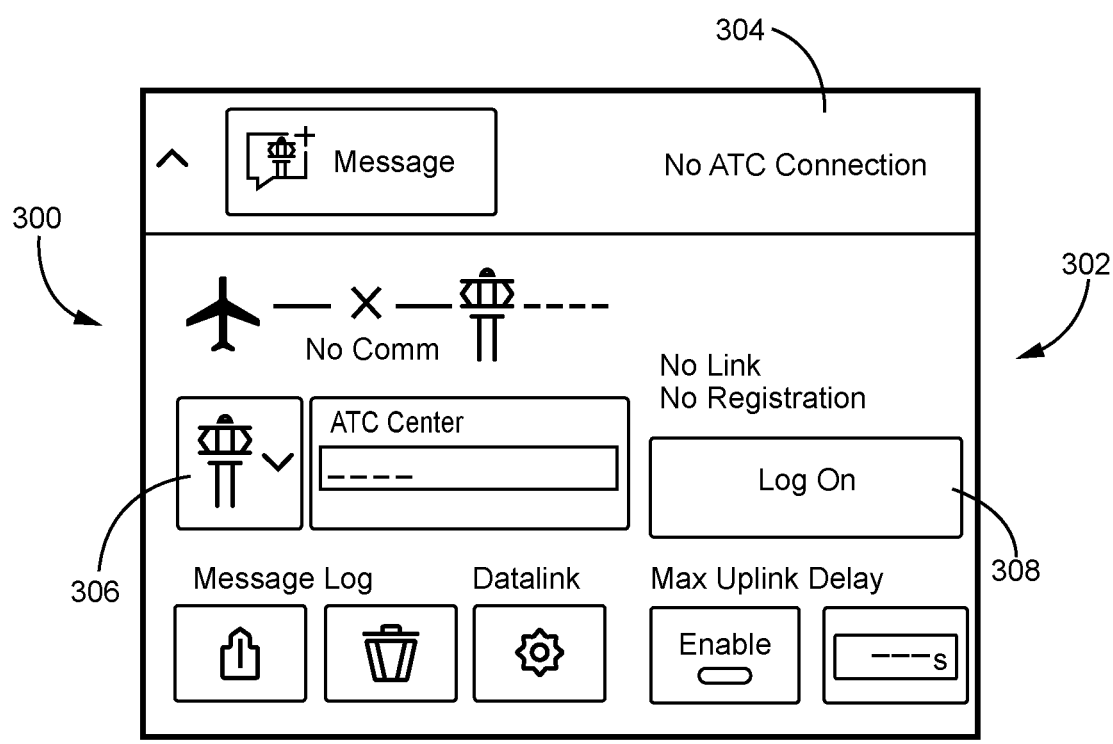
FIG. 4 depicts a screenshot of an exemplary panel including the logon task list of FIG. 3, with completed tasks removed from the logon task list.

Referring now to FIG. 4, in some examples, when a task is completed by the operator or one or more systems on the aircraft, the task label that corresponds to that text in the task list is removed from the task list. For example, comparing the task list 302 between FIGS. 3 and 4 indicates that the tasks for the "No Origin", "No Destination", and "No Flight ID" labels have since been completed. As each task is completed, the task label for that task in the task list 302 is then removed. In some examples, the size of the task list 302 may decrease as a task is subsequently completed, and its corresponding task label removed, so that the task list 302 occupies less space in the panel 300 and the display more generally. In this way the task list can be continuously updated with only the remaining tasks needed to be completed to establish a CPLDC session, and the task list 302 can occupy less space in the panel 300 to make room for other information.

In some examples, the task list 302 can direct the operator to the interface(s) needed to complete the tasks. For example, when the operator selects one of the task labels in the task list 302 (that is, HMI 106 receives a selection of one of the task labels via an input device), a panel displays on the screen with the location where the information of the task corresponding to the selected task label can be input to complete the task. The panel that is subsequently displayed for the selected task can be a separate subpanel on the screen displayed by HMI 106 or can be a panel that overlaps panel 300 on the screen. Upon entering the information needed for the task, the HMI 106 can receive a selection to close out the panel and the panel 300 becomes fully displayed on the screen of HMI 306. Task list 302 is then modified by removing the text associated with the task in which the operator entered the requisite information. In this way, the task list 302 can enable the operator to complete one or more pending tasks on the same screen of the same avionics device 102 instead of having to browse between multiple screens and interfaces to enter the appropriate information for each task.

Figure 5:
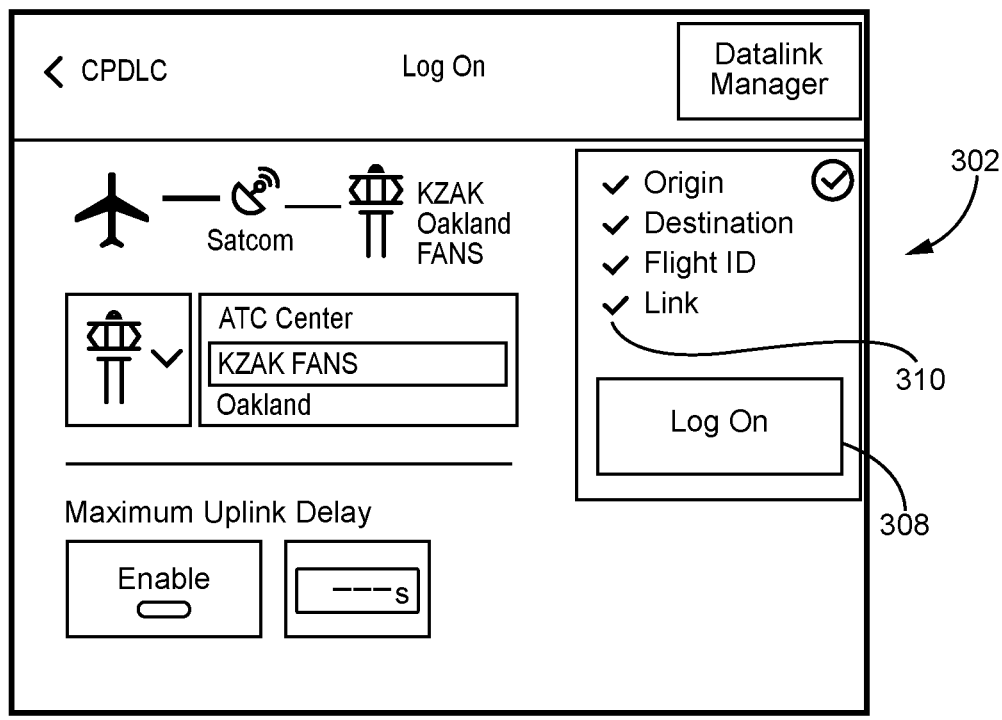
FIG. 5 depicts a screenshot of an exemplary display including a logon task list with an indicator next to completed tasks in the logon task list.

FIG. 5 depicts a screenshot of an exemplary display including a logon task list with an indicator next to completed tasks in the logon task list. In contrast to the task list 302 of FIGS. 3 and 4, task list 302 is configured to display an indicator 310 next to each task when it is completed. In the example shown in FIG. 5, the indicator 310 is a checkmark displayed next to the text in which the corresponding task has been completed. In some examples, the indicator 310 is of a distinctive color, like green, blue, red, or other color that contrasts with the background color of the task list 302 or the display on HMI 106 more generally. Other indicators, or a change in image characteristic of the text more generally, can be used to indicate that the task has been completed to the operator.

Referring to FIGS. 3, 4 and 5, when all of the tasks have been completed, an image characteristic of the log on button 308 can be changed to indicate to the operator that the operator can log on to a CPDLC session. For example, the log on button 308 may change color, brightness, and the like in response to completing all of the required tasks. When HMI 106 receives a selection of the log on button 308, processor 108 can establish a CPDLC session with a ground system and display additional CPDLC functions supported by CPDLC interface application 110 on one or more panels.

Figure 6:
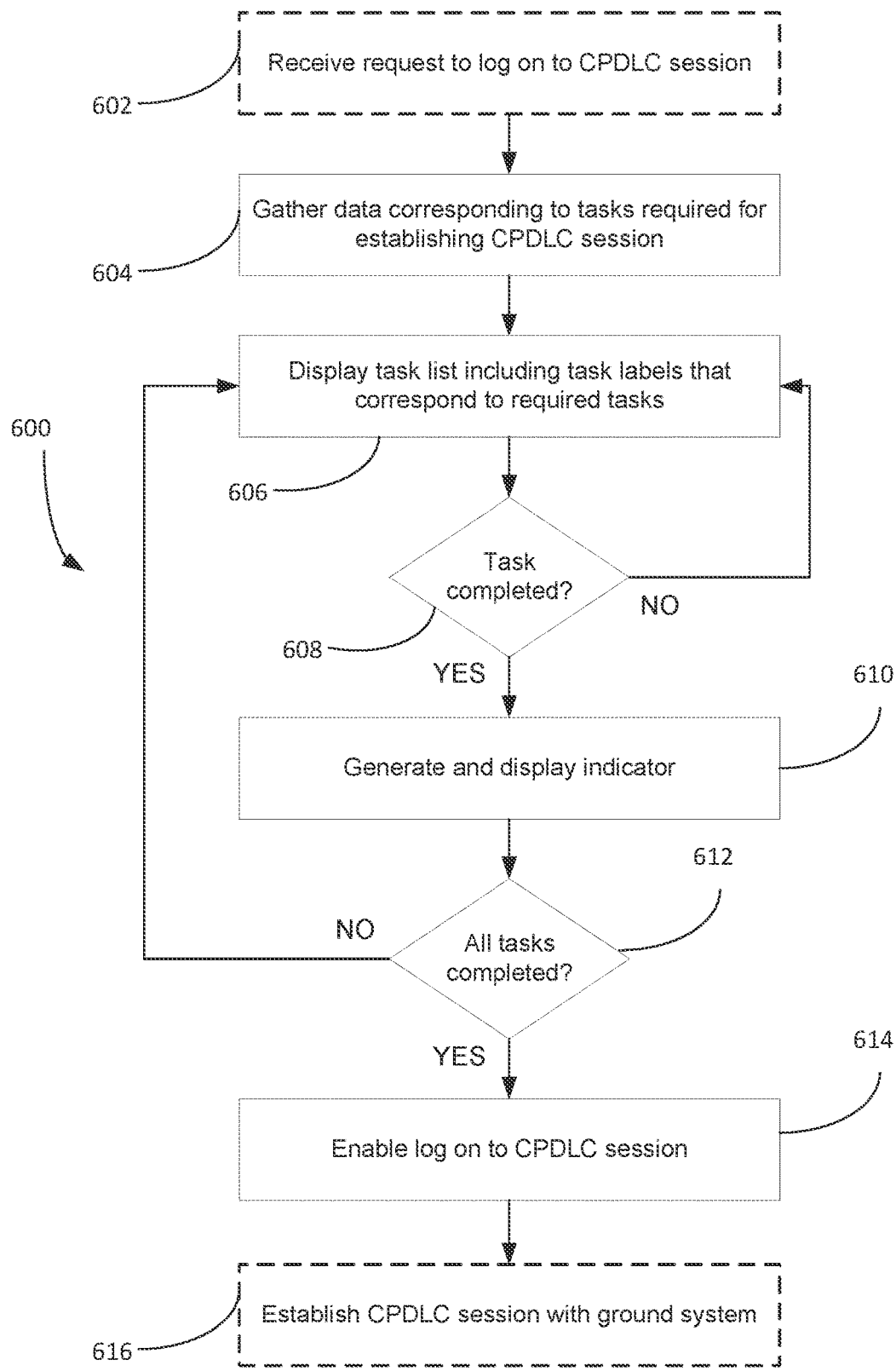
FIG. 6 depicts a flow diagram illustrating an exemplary method for enabling log on to a CPDLC session with a ground system.

FIG. 6 depicts a flow diagram illustrating an exemplary method for enabling log on to a CPDLC session with a ground system. Method 600 may be implemented via the techniques described with respect to FIGS. 3 through 5, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner). Method 600 can be performed by processor 108.

Method 600 optionally includes receiving a request to log on to a CPDLC session at block 602, e.g., by receiving a selection from HMI 106 to display a CPDLC logon page. Method 600 includes gathering data from one or more systems on the vehicle corresponding to tasks required for establishing a CPDLC session with the ground system at block 604. For example, the data gathered would include what tasks would be needed to complete the logon process, such as tasks related to entering an origin and destination location, flight identification information, establishing a communication link, registering one or more devices, and the like.

Method 600 includes displaying a task list at block 606 on a panel of a display of an avionics device. The task list includes one or more task labels that correspond to one or more tasks that are required to establish a CPDLC session with a ground system. Method 600 includes determining whether one of the tasks has been completed at block 608. For example, data can be received about flight identification information entered by the operator and determine from the data that a task for entering flight identification information has been completed. If no tasks have yet been completed, then, reverting back to block 606, method 600 includes displaying the task list on the panel. If a task has been completed, then method 600 includes generating and displaying an indicator next to the task label that corresponds to the completed task at block 610. For example, the indicator can be a checkmark of a distinctive color positioned in a way that indicates to the operator that the task corresponding to the task label has been completed.

Method 600 includes determining whether all of the required tasks in the task list have been completed at block 612. If there are still tasks remaining, then, reverting back to block 606, method 600 includes displaying the task list and required tasks. When a subsequent task has been completed, an indicator can be generated and displayed next to each task until there are no tasks that have not yet been completed. If each has been completed, then method 600 includes enabling the operator to log on to a CPLDC session with the ground system at block 614. In some examples, an image characteristic of the log on button is changed when each task has been completed, thereby signaling to the operator that the log on button can be selected. Once a selection of the log on button is received, a CPDLC session between the ground system can be established at block 616.

Figure 7:
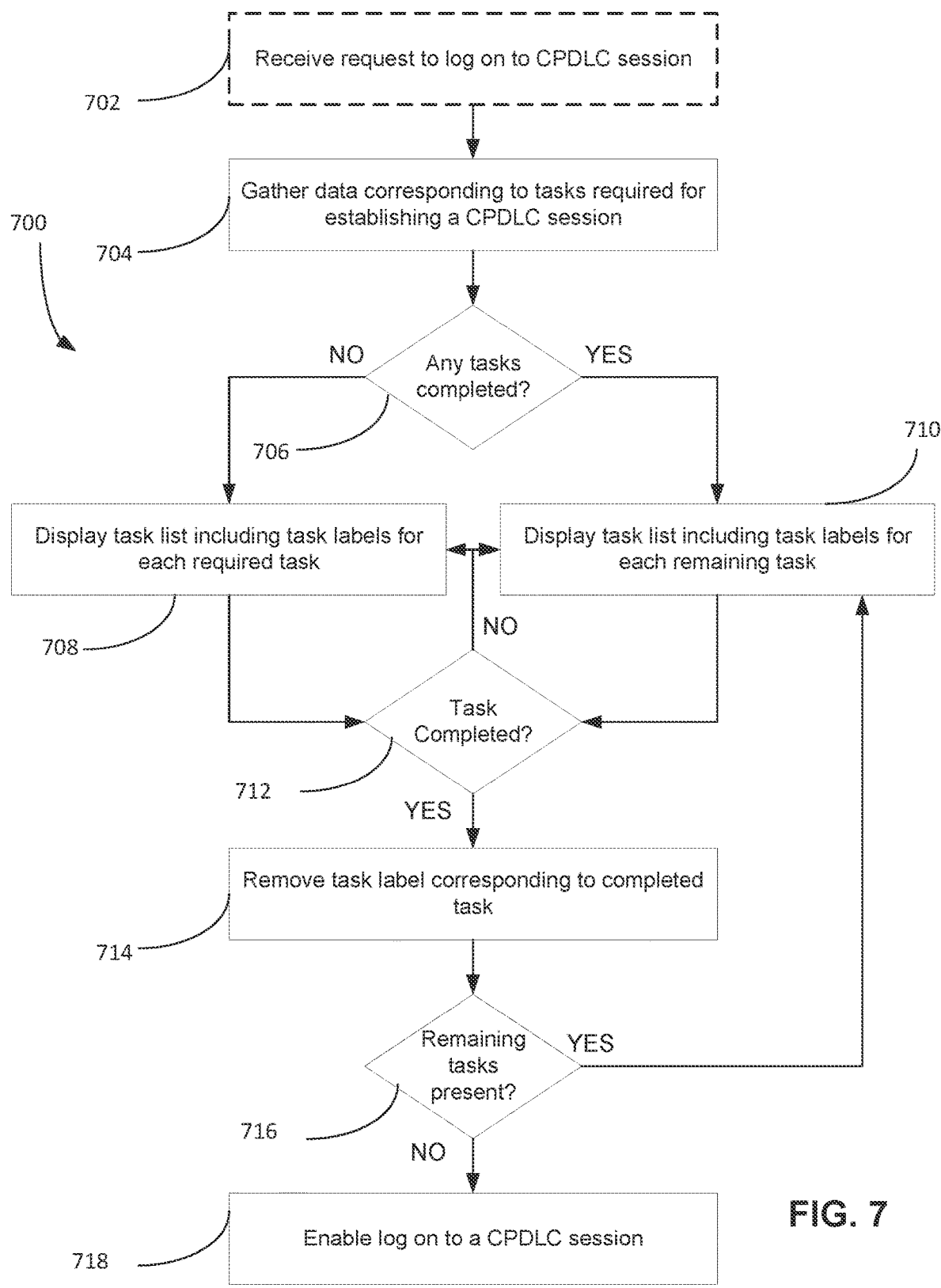
FIG. 7 depicts a flow diagram illustrating an exemplary method for enabling log on to a CPDLC session with a ground system.

FIG. 7 depicts a flow diagram illustrating an exemplary method for enabling log on to a CPDLC session with a ground system. Method 700 optionally includes receiving a request to log on to a CPDLC session at block 702, as previously described. Method 700 includes gathering data corresponding to tasks required for establishing a CPDLC session with a ground system at block 704. Method 700 includes determining at block 706 whether any of the tasks have been completed. If no tasks have yet been completed, then method 700 includes displaying a task list that includes task labels for each required task at block 708. If instead there are some tasks that have been initially completed, then method includes displaying a task list at block 710 including one or more task labels for each remaining task that has yet to be completed.

Method 700 includes, at block 712 (which can be proceeded from either block 708 or block 710), determining whether a task has been completed. If block 712 was proceeded to from block 708 and no task has yet been completed, then method 700 includes reverting back to block 708 and displaying each required task label in the task list. If block 712 was proceeded to from block 710 and no task has yet been completed since displaying the task list, then method 700 includes reverting back to block 710 and displaying each remaining task label in the task list.

If a task has been completed since displaying the task list, then method 700 includes removing the task label that corresponds to the completed task at block 714. Method 700 includes determining at block 716 whether there are any remaining tasks needed to log on to a CPDLC session. If there are remaining tasks that have yet to be completed, then method 700 includes reverting to block 710 and displaying the task list including the task labels for each remaining task (but for the task(s) that were since completed at block 712 with their task labels since removed at block 714). This process can be repeated for each of the remaining tasks that then becomes completed so that their corresponding task labels can be removed from the task list. Once all remaining tasks have been completed, method 700 includes enabling log on to a CPDLC session at block 718. In some examples, the task list from the display panel is removed from the panel after all the tasks are completed. Once an indication is received to log on to a CPDLC session, for example, by receiving a selection of a log on button, a CPDLC session can be established with the ground system.

IV. Creating CPDLC Messages

In conventional avionics equipment, creation of Controller-Pilot Data Link Communication (CPDLC) messages has been a complex endeavor. In many systems, the pilot or flight crew navigates through multiple screens or pop-up windows to gather the information necessary to build the CPDLC message. Unfortunately, this process can be both unintuitive and time consuming.

To address these problems, embodiments of the present invention provide a user interface for an avionics device that uses a holistic, interactive approach to create CPDLC messages that is built on a dynamically resizable panel (the so-called "panel body") within which the entirety of the message is composed, edited, approved and sent. For purposes of this specification, the term "panel body" means an area of a display that is defined by a graphical element, such as a rectangle. In one embodiment, the panel body is configured to display the content of messages, menus for creating and editing new messages, fields for gathering data for messages, previewing and approving messages to be sent, menus for responding to messages, headers that delineate separate conversations, and any other appropriate aspects of displaying, grouping, previewing, presenting, sending, deleting, composing and editing messages. The panel body is "dynamic" in that the area used by the panel body changes over time based on the current operation being performed and the data to be displayed within the panel body.

Further, the panel body shows the composed and transmitted message in context with related messages in a "threaded" message format discussed in more detail below.

A. Creating a CPDLC Message in a Panel Body

Figure 8:
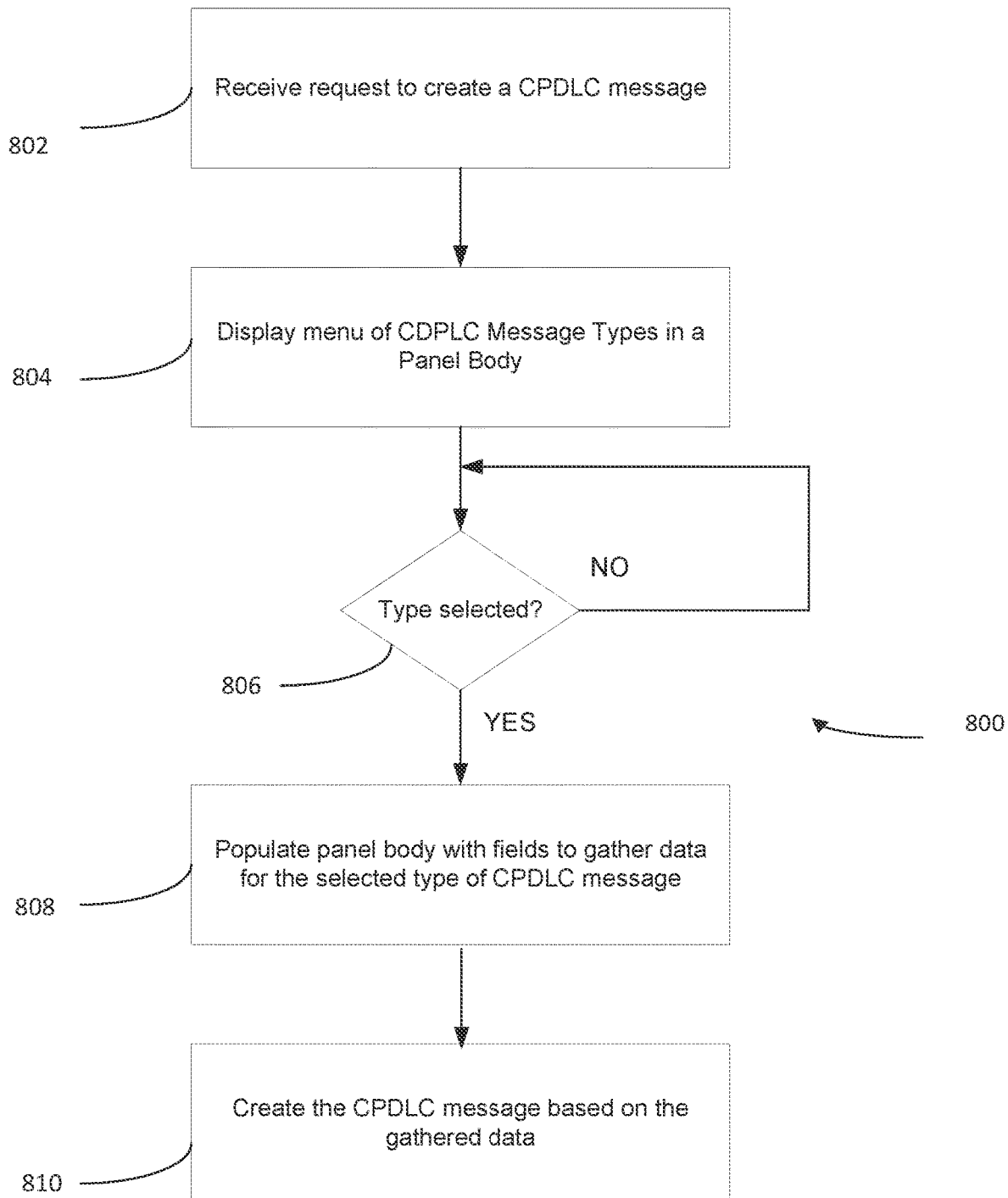
FIG. 8 is a flow chart of one embodiment of a process for creating a CPDLC message.

FIG. 8 is a flow chart of one embodiment of a process, indicated generally at 800, for creating a CPDLC message on a user interface within a panel body. In one embodiment, process 800 forms part of the CPDLC interface application 110 of FIG. 1 and includes the program code stored in memory 112 for execution by processor 108 to implement the functions described below with respect to process 800. For pedagogical purposes, process 800 is described in conjunction with screen shots of a user interface illustrated in FIGS. 9 to 12. It is understood that the screen shots of the user interface in FIGS. 9 to 12 are provided by way of example, and that process 800 may be implemented in a user interface with other graphical elements, menu structures, and designs.

Figure 9:
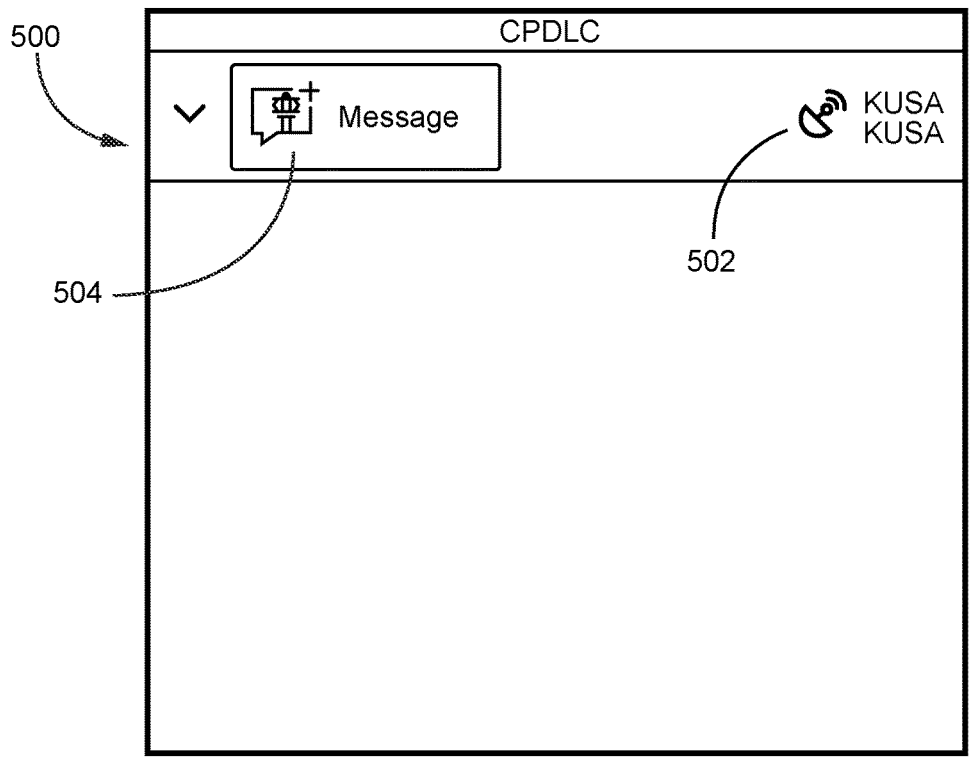
FIGS. 9 to 12 are screen shots of one embodiment of a user interface with a panel body that illustrate creating a CPDLC message according to the process of FIG. 8.

Process 800 begins at block 802 when a request to create a CPDLC message is received. For example, as shown in FIG. 9, user interface 500 includes a header 502 that contains a "message" button 504 that is displayed on a human-machine interface such as HMI 106 of FIG. 1. In one embodiment, HMI 106 includes a touchscreen for providing a visual representation of the user interface and for receiving input from the user. Interface 500 receives a request to create a CPDLC message when message button 504 is selected by a user (e.g., by touching the area of the touchscreen displaying button 504). In other embodiments, button 504 is selected by use of a cursor control such as a mouse or other conventional or later developed technique for selecting a icon on a graphical user interface. For sake of simplicity, this specification describes the user interface in terms of a touchscreen and menus or buttons presented on the touchscreen for the user to select by touching the appropriate button. However, embodiments of the present invention are not intended to be limited to use with menus and buttons presented on a touchscreen. Rather, embodiments of the present invention envision use of any appropriate technique for selecting options on the user interface. In one embodiment, selection is indicated on user interface 500 by changing the color of message button 504 when touched.

Figure 10:
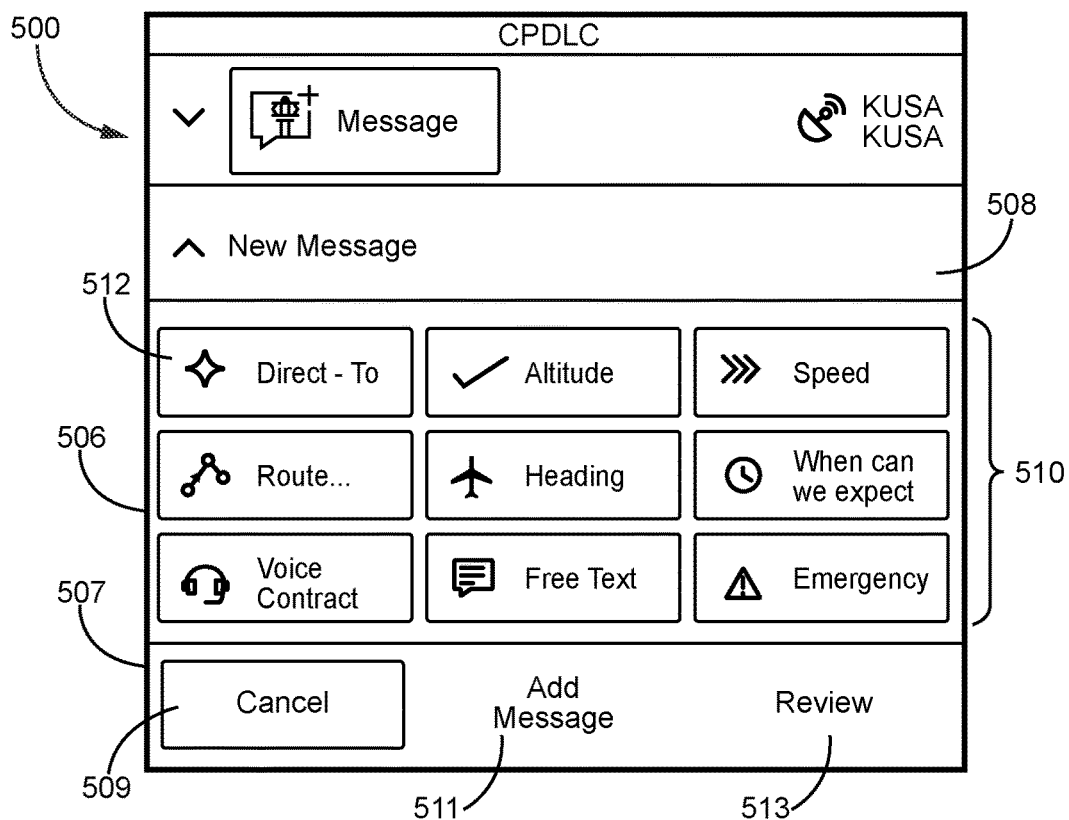

At block 804, process 800 displays a menu 510 of CPDLC message types in panel body 506 as shown in FIG. 10. In this embodiment, menu 510 includes a matrix of buttons 512, with each button 512 corresponding to a type of CPDLC message. Panel body 506 also includes a header 508 and a second menu 507 with options related to the creation of the CPDLC message. For example, second menu 507 includes three buttons: "cancel" button 509 that allows the user to cancel the current CPDLC message, "add message" button 511 that enables the user to add another CPDLC message to be sent with the current CPDLC message that is being created, and a "review" button 513 that enables the user to review the current CPDLC message before sending the CPDLC message. At this point in the process, the add message button 511 and the review button 513 are deactivated (as indicated graphically by greying out or removing the border from the buttons) because the current CPDLC message has not been created.

Figure 11:
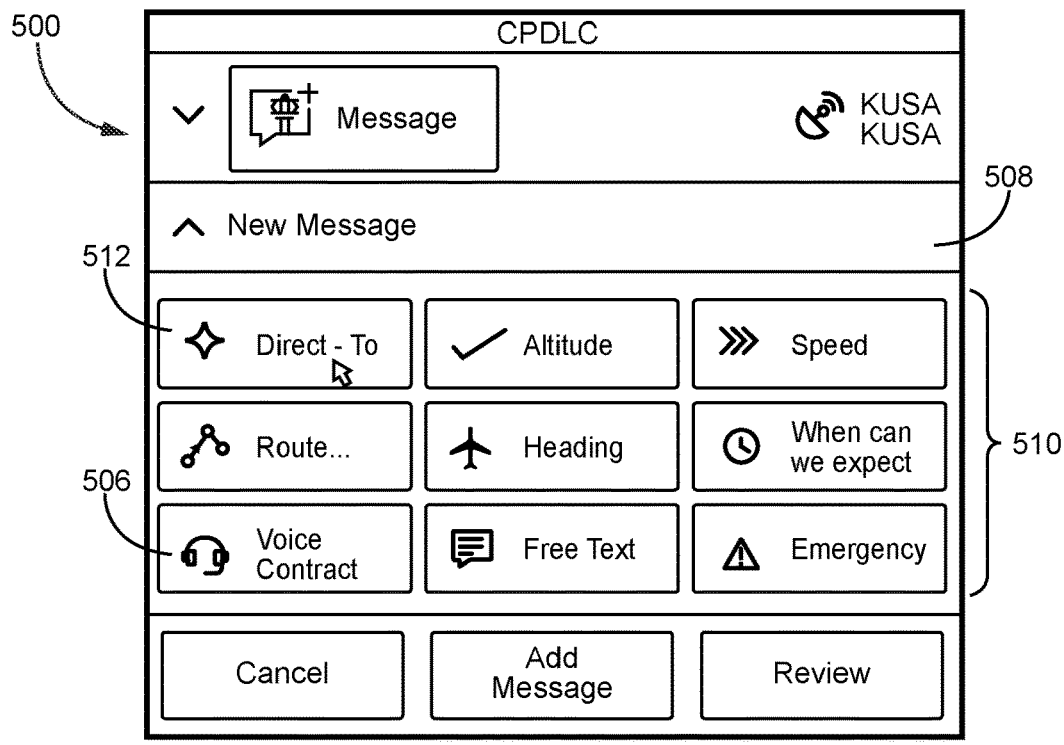
Figure 12:
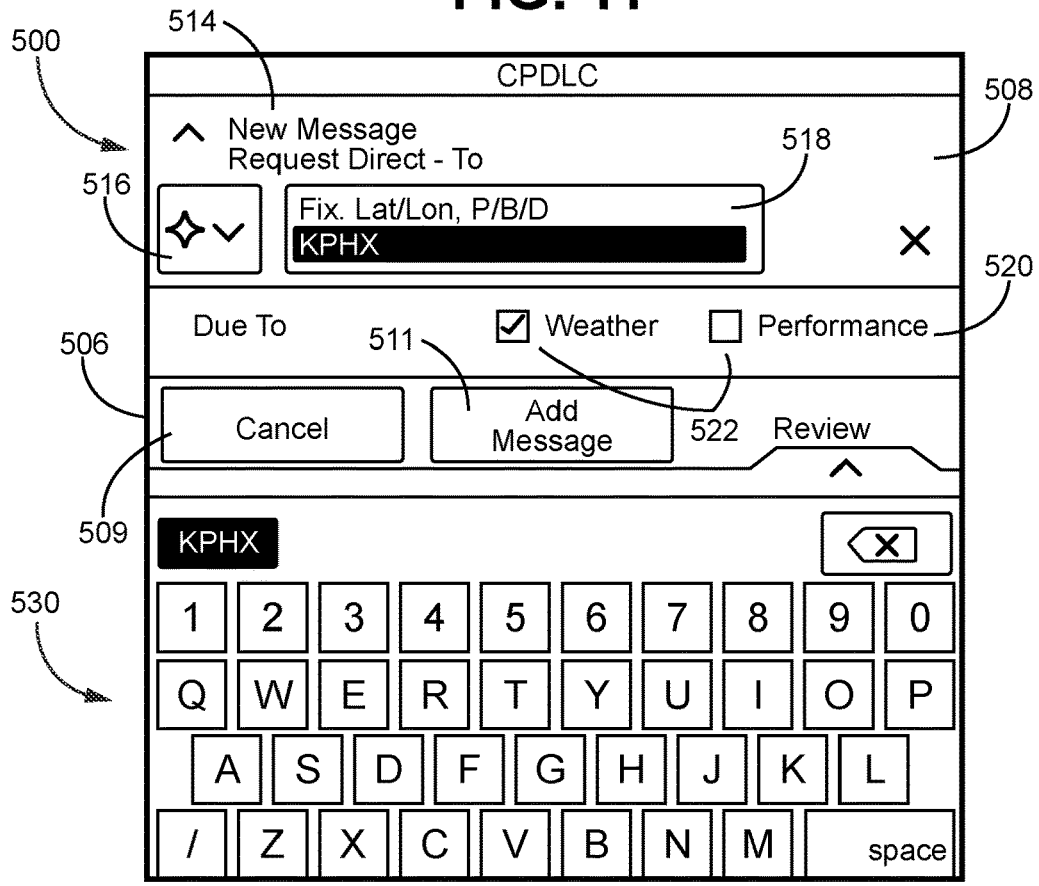

At block 806, process 800 monitors for the selection of a type of CPDLC message to be created. If no button in menu 510 is touched or otherwise selected, process 800 returns to block 806 until one of the buttons in menu 510 is touched or selected. When a button in menu 510 is touched or selected, as illustrated in FIG. 11, process 800 changes the color of the selected button, which in this example is the "direct-to" button. Further, as shown in FIG. 12, the header 508 also is updated to show that the panel body 506 is now being used to create a new "request direct-to" message as shown at 514.

At block 808, process 800 populates the panel body 506 with a number of fields to gather data for the selected type of CPDLC message. As shown in FIG. 12, for a "direct-to" message, panel body 506 includes two fields for gathering the data for the location that the pilot is requesting to fly to. First, icon 516 is used to provide a drop-down menu for selecting the destination. Additionally, text field 518 is also provided. Data is entered into text field 518 using softkeyboard 530. Further, the data for the destination can be entered, for example, as a fixed location, latitude/longitude, and Place/Bearing/Distance. Finally, panel body 506 also includes a row 520 that displays check-boxes for two additional fields that provide the rationale for the request in this CPDLC message. In this instance, the user may select that the change in destination is due to either weather or the performance of the aircraft.

At block 810, the process creates the CPDLC message based on the information collected in the fields through the panel body 506.

It is noted that other CPDLC messages can be produced by selecting the appropriate item (button 512) in menu 510 of panel body 506 at block 806 and filling the data in the fields at block 808. A non-limiting list of potential CPDLC messages includes:

Altitude: Request to fly at a specified altitude.
Speed: Request to fly at a specified speed.
Route: Request to fly to a destination via specific waypoints.

Heading: Request to fly at a specified heading.

Expectations: Request to know when a specific request can be expected to be granted (e.g., "when can we expect higher altitude").

Voice contact: Request voice contact with ATC.

Free text: Send text message with content provided by the user.

Emergency: Send alert regarding emergency.

Each of these and other CPDLC message types will include appropriate fields to gather data for use in formulating the CPDLC message, e.g., the requested altitude, speed, heading, etc. In some embodiments, the fields presented to the user are based on industry standard documents relating to CPDLC.

It is noted that the specific CPDLC messages supported in menu 510 is configurable such that the number and types of messages may be changed to meet the needs of a particular instantiation. The number of buttons 512 and their relative placement within the matrix of buttons in menu 510 will be adjusted based on the messages used in a particular instantiation to provide a similar look as menu 510 in the Figures of the present application.

B. Reviewing and Sending a CPDLC Message in the Panel Body

Figure 13:
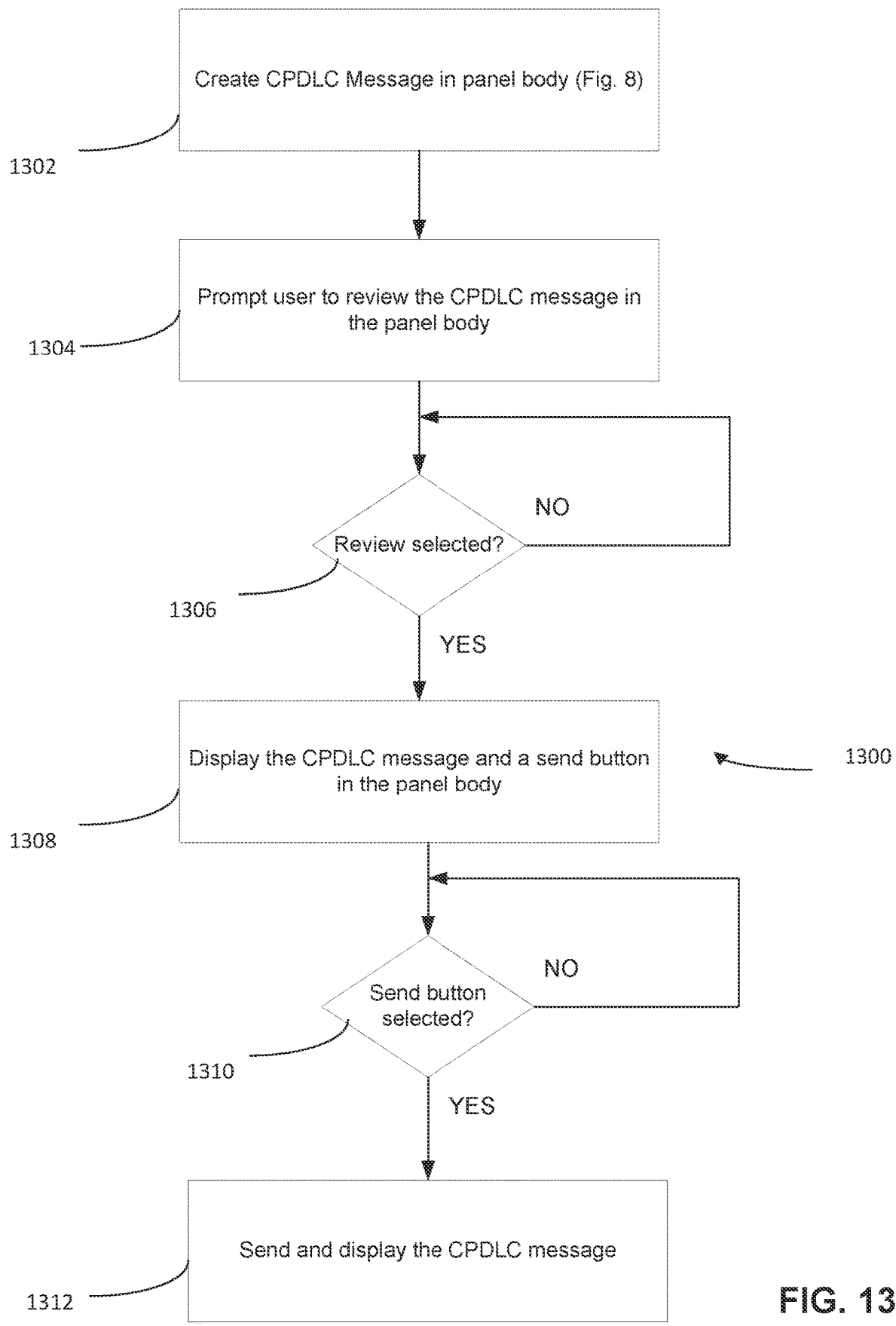
FIG. 13 is a flow chart of one embodiment of a process for creating a CPDLC message in a panel body and reviewing the CPDLC message in the same panel body before sending the CPDLC message.
Figure 14:
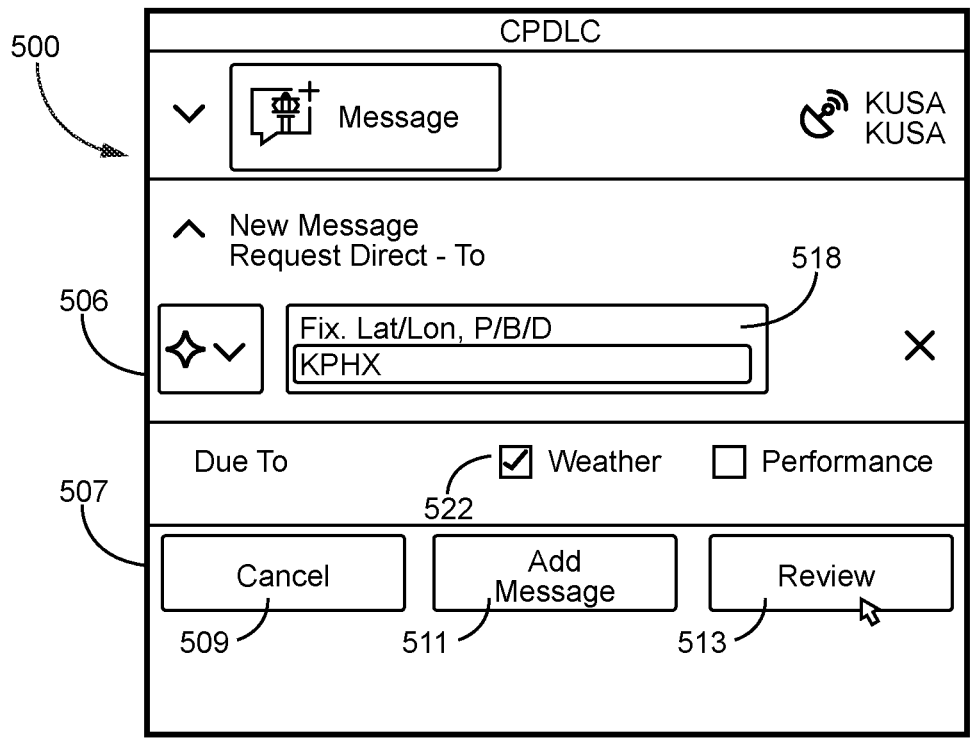
FIGS. 14 and 15 are screen shots of one embodiment of a user interface with a panel body that illustrates reviewing a CPDLC message according to the process of FIG. 13.
Figure 15:
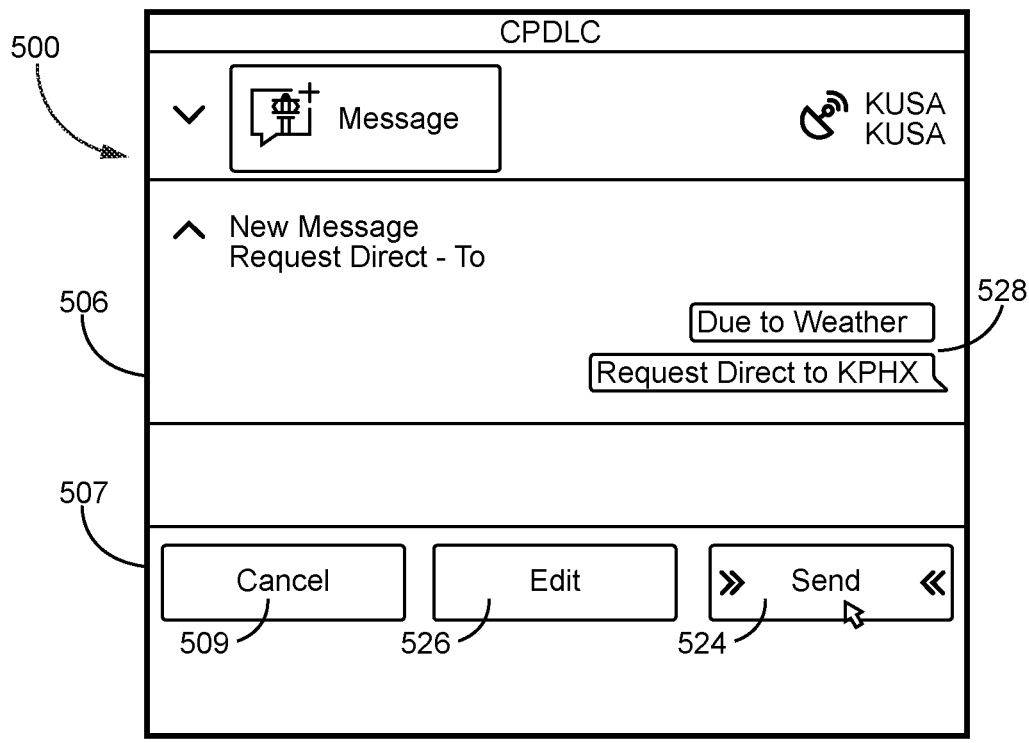

FIG. 13 is a flow chart of one embodiment of a process indicated generally at 1300 for creating a CPDLC message in a panel body 506 and reviewing the CPDLC message in the same panel body 506 before sending the CPDLC message. In one embodiment, process 1300 forms part of the CPDLC interface application 110 of FIG. 1 and includes program code stored in memory 112 for execution by processor 108 to implement the functions described below with respect to process 1300. For pedagogical purposes, process 1300 is described in conjunction with screen shots of a user interface illustrated in FIGS. 14 and 15. It is understood that the screen shots of the user interface in FIGS. 14 and 15 are provided by way of example, and that process 1300 may be implemented in a user interface with other graphical elements, menu structures, and designs.

Process 1300 begins at 1302 with the creation of the CPDLC message using, for example, the process of FIG. 8. Process 1300 then moves on to prompt the user to review the CPDLC message in the panel body 506 at block 1304. As shown in FIG. 14, "review" button 513 in menu 507 is no longer deactivated (greyed out) once the data fields have been filled in. In this case, the location for the "direct-to" message has been identified in text field 518 and the reason for the request has been indicated with check box 522. Thus, the CPDLC message is ready for review by the user.

At block 1306, process 1300 monitors to determine when the user touches or selects "review" button 513 of menu 507 in panel body 506. If the "review" button is not selected, process 1300 returns to block 1306 to monitor for the "review" button to be selected. When selected, process 1300 proceeds to display the CPDLC message and to display a send button in the panel body 506 at block 1308. This is shown, for example, in FIG. 15. In this embodiment, CPDLC message 528 is displayed in panel body 506. By way of example, and not by way of limitation, the text of CPDLC message 528 is placed within the outline of a bubble to indicate that the message is in review mode and has not been sent. Other methods for distinguishing the messages status as pending that are known in the art or later developed could also be used. Additionally, the "add message" button 511 and the "review" button 513 of menu 507 have been replaced by "edit" button 526 and "send" button 524. By selecting the "edit" button 526, the user is able to return to the create message mode shown in FIG. 14 and make any corrections necessary to the CPDLC message. If, however, the user selects the "send" button, process 1300 detects this at block 1310 and proceeds to block 1312 to send the message. The presentation of the text of CPDLC message 528 is modified, for example, to be in a bubble with solid background to indicate that the message has been sent. Any other appropriate color scheme, symbol, text or adjustment to the message can be used to indicate that the message has been sent. It is noted that the CPDLC message is a downlink message and is presented in the right-hand column of the panel body 506 to be displayed in a threaded message format along with other messages from the same conversation as discussed in more detail below.

C. Combining CPDLC Messages for Transmission

Figure 16:
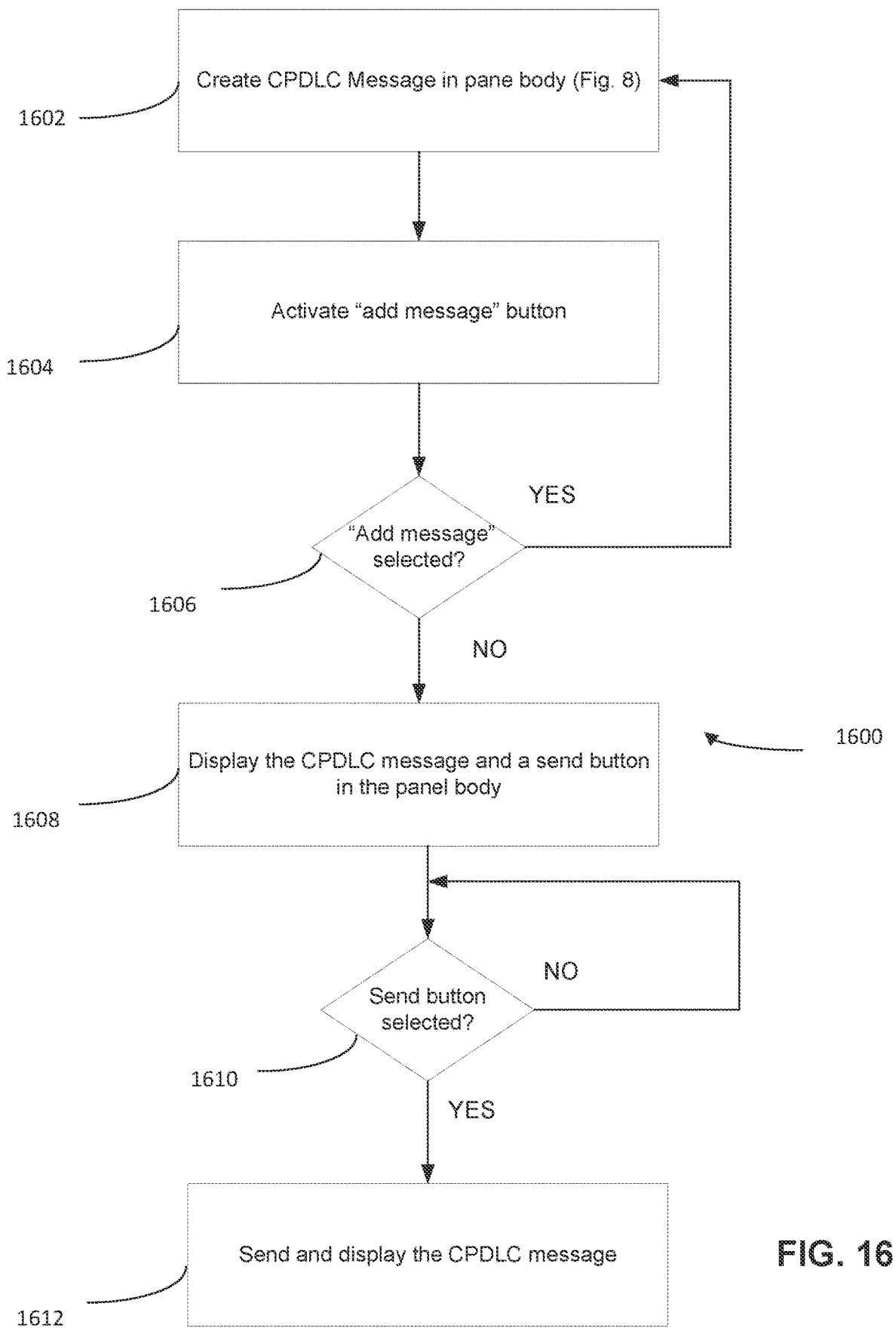
FIG. 16 is a flow chart of one embodiment of a process for creating and sending a CPDLC message having a plurality of related CPDLC messages.

FIG. 16 is a flow chart of one embodiment of a process indicated generally at 1600 for creating and sending a CPDLC message having a plurality of related CPDLC messages that are sent together as a multi-part message. In one embodiment, process 1600 forms part of the CPDLC interface application 110 of FIG. 1 and includes program code stored in memory 112 for execution by processor 108 to implement the functions described below with respect to process 1600. For pedagogical purposes, process 1600 is described in conjunction with screen shots of a user interface illustrated in FIGS. 17-22. It is understood that the screen shots of the user interface in FIGS. 17-22 are provided by way of example, and that process 1600 may be implemented in a user interface with other graphical elements, menu structures, and designs.

Figure 17:
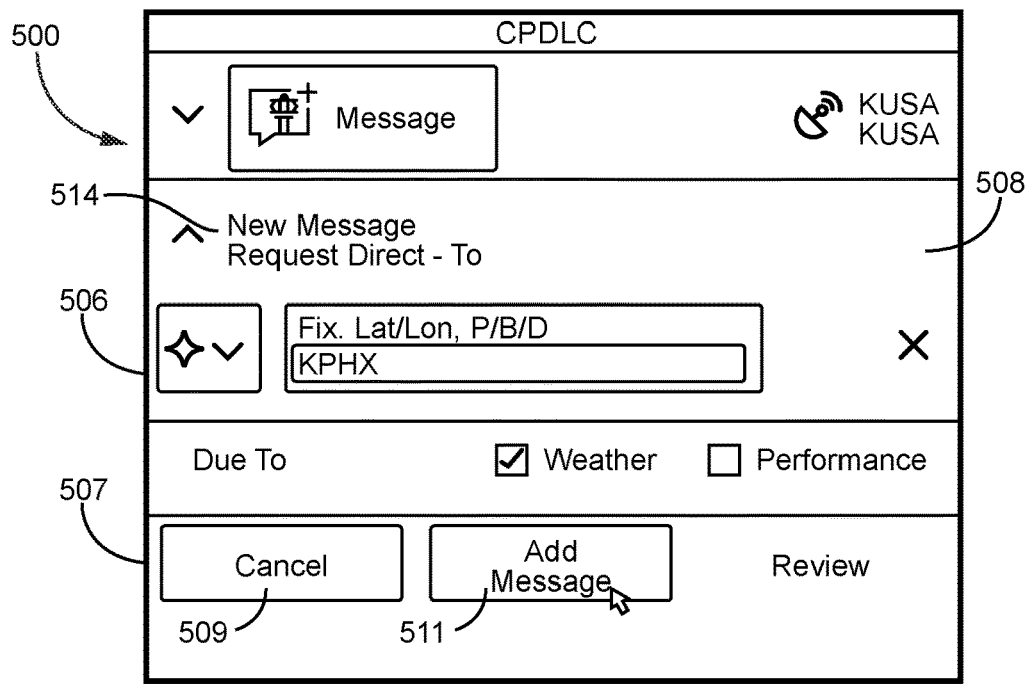
FIGS. 17 to 22 are screen shots of one embodiment of a user interface with a panel body that illustrate creating a CPDLC message having a plurality of related CPDLC messages according to the process of FIG. 16.
Figure 18:
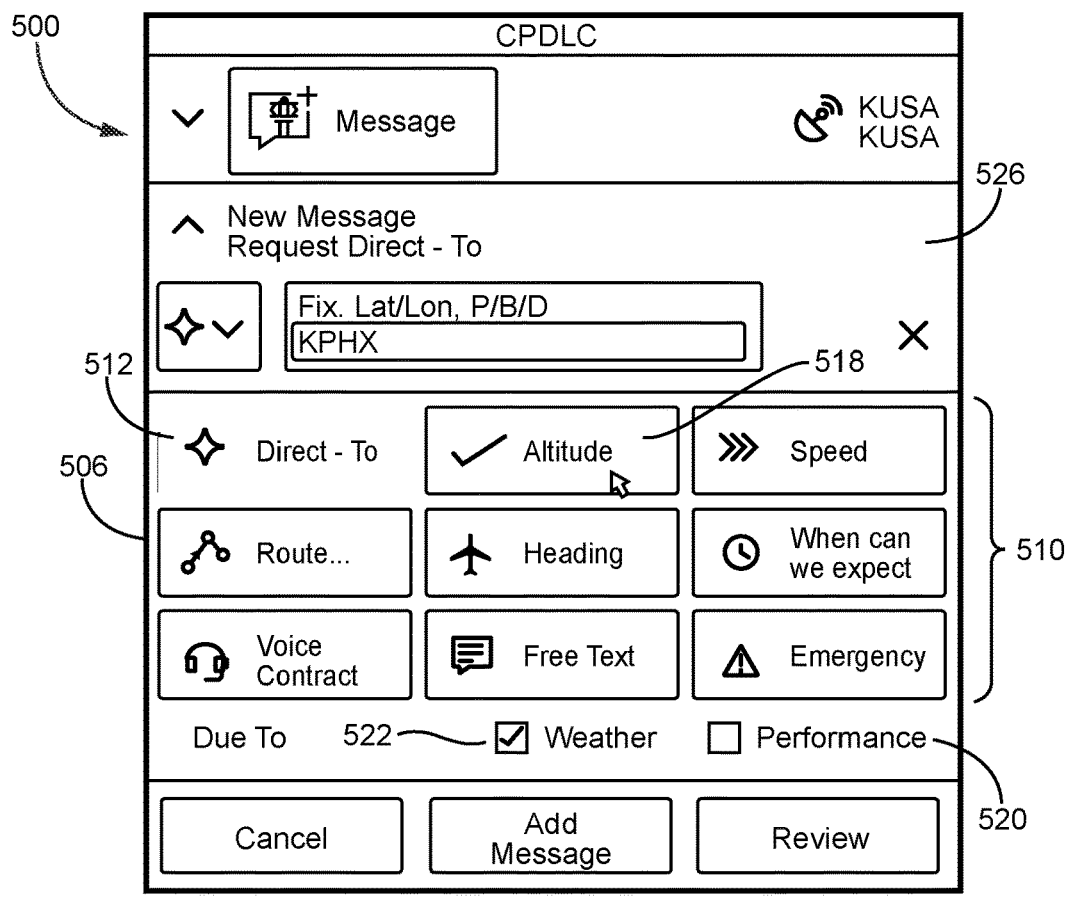
Figure 19:
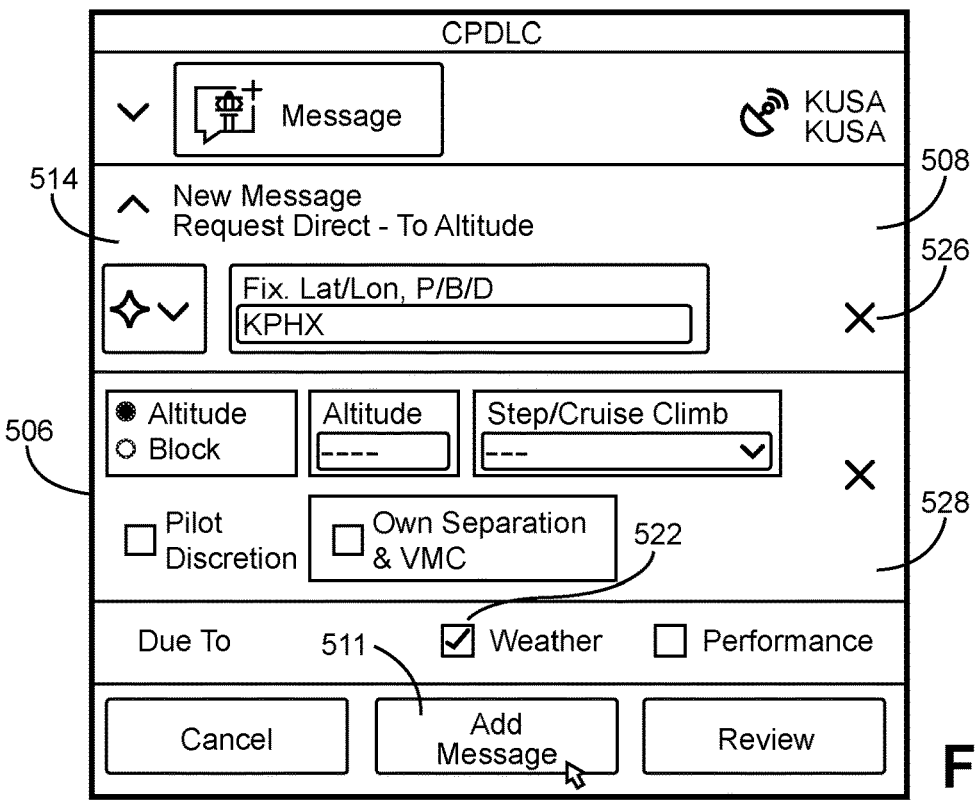

Process 1600 begins at block 1602 where a CPDLC message is created in panel body 506 as described above, for example, with respect to FIG. 8. As shown in FIG. 17, the header 508 of the panel body 506 includes text 514 that indicates the type of CPDLC message that has been created ("Request Direct-To"). Further, panel body 506 also shows the data that has been collected for the CPDLC message as discussed above. In this case, the first CPDLC message is a "Request direct-to." Because all of the data has been gathered for this request, at block 1604, process 1600 activates an "add message" button 511 to enable a user to create a multi-part CPDLC message by enabling the creation of another CPDLC message in panel body 506. As shown in FIG. 17, add message button 511 is activated which is indicated by add message button 511 no longer being grayed out in menu 507. At block 1606, process 1600 monitors for the add message button 511 to be touched or selected by a user. When the add message button 511 is selected, process 1600 returns to block 1602 to create another CPDLC message. As shown in FIG. 18, panel body 506 retains a row 526 that displays the first CPDLC message of the multi-part CPDLC message. Also, panel body 506 displays the menu 510 for selection of a CPDLC message type. In this case, the button for "Direct-to" messages has been greyed out due to the fact that this message type has already been used in this multi-part CPDLC message. In the example of FIG. 18, the altitude button 518 of menu 510 has been selected. As shown in FIG. 19, row 528 of panel body 506 has been added to enable gathering data for the altitude message. Additionally, the add message button 511 is again activated. Further the header 508 of panel body 506 has been modified so that the text 514 of the header reads "Request direct-to, Altitude" to indicate a multipart CPDLC message and the types of CPDLC messages included. Further, the check box 522 retains the indication that the request is due to weather. This indication applies to both the "Request Direct-To" and the "Request Altitude" CPDLC messages being combined.

Figure 20:
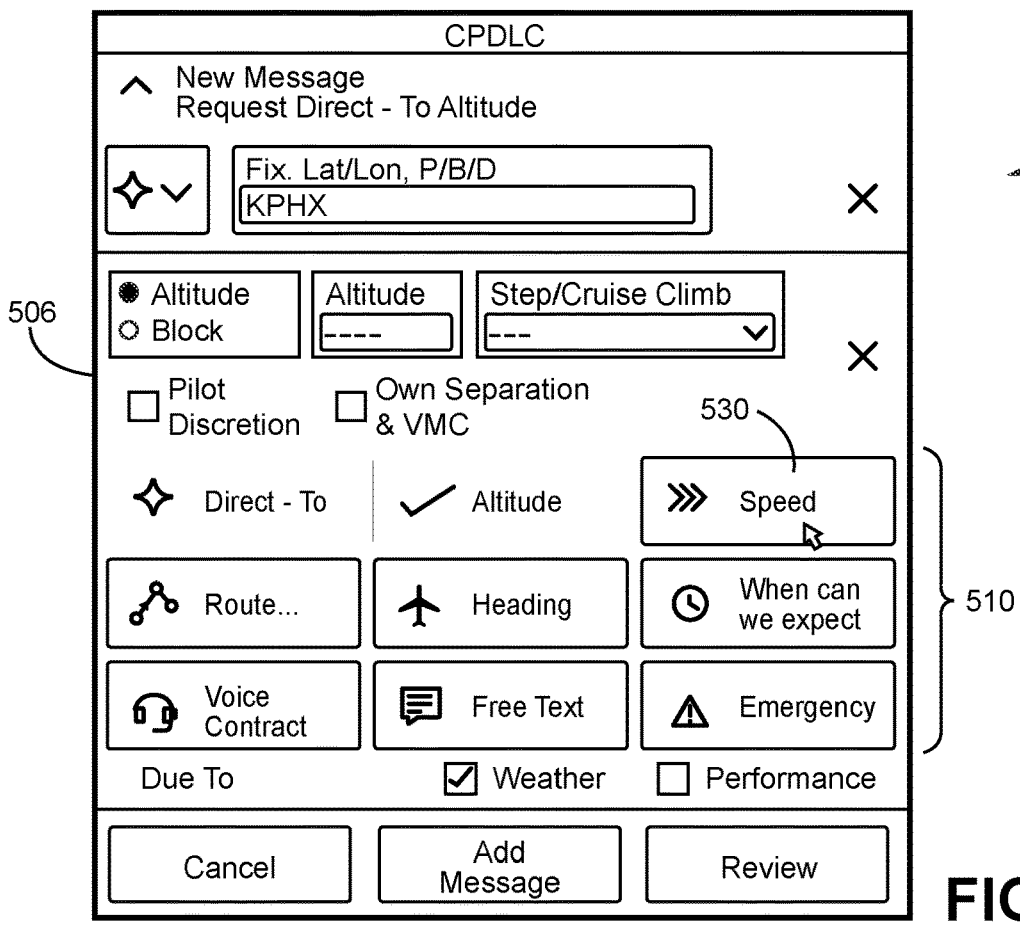
Figure 21:
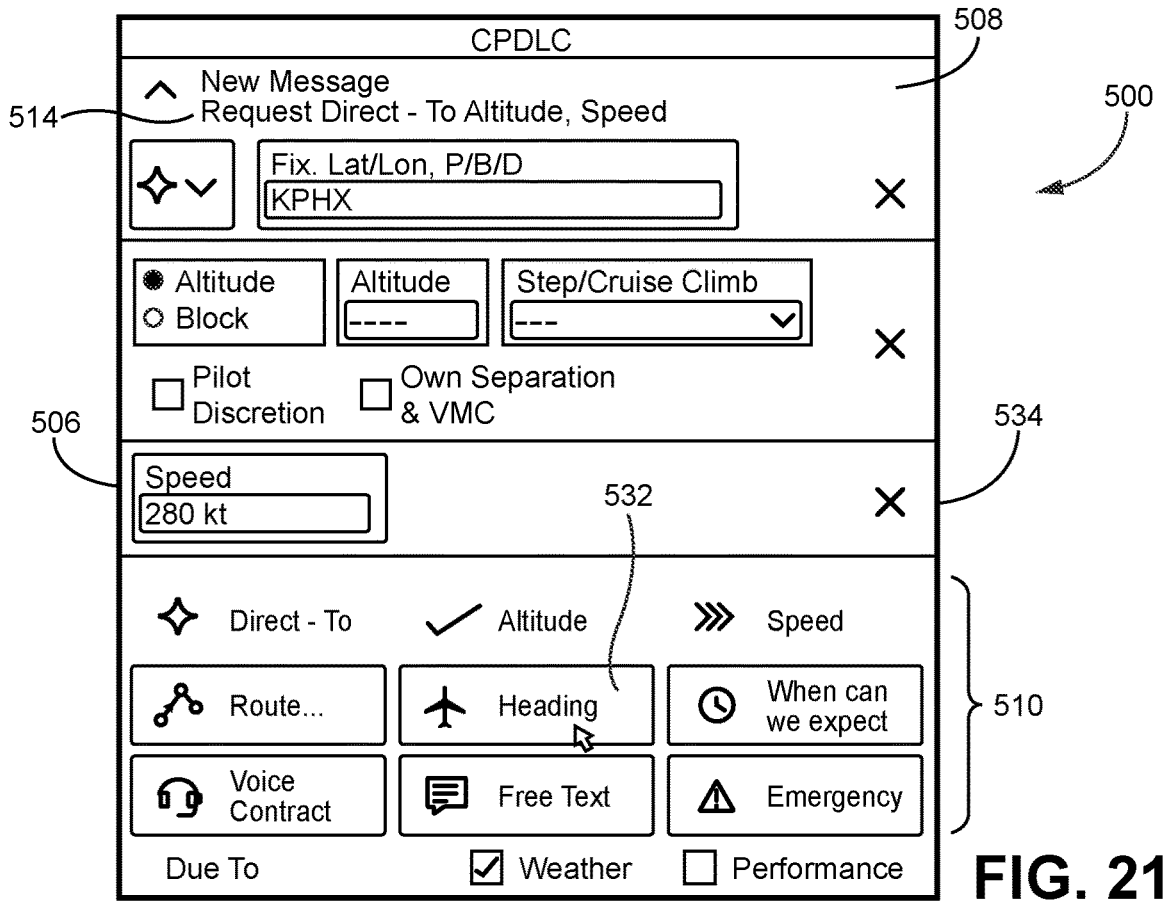
Figure 22:
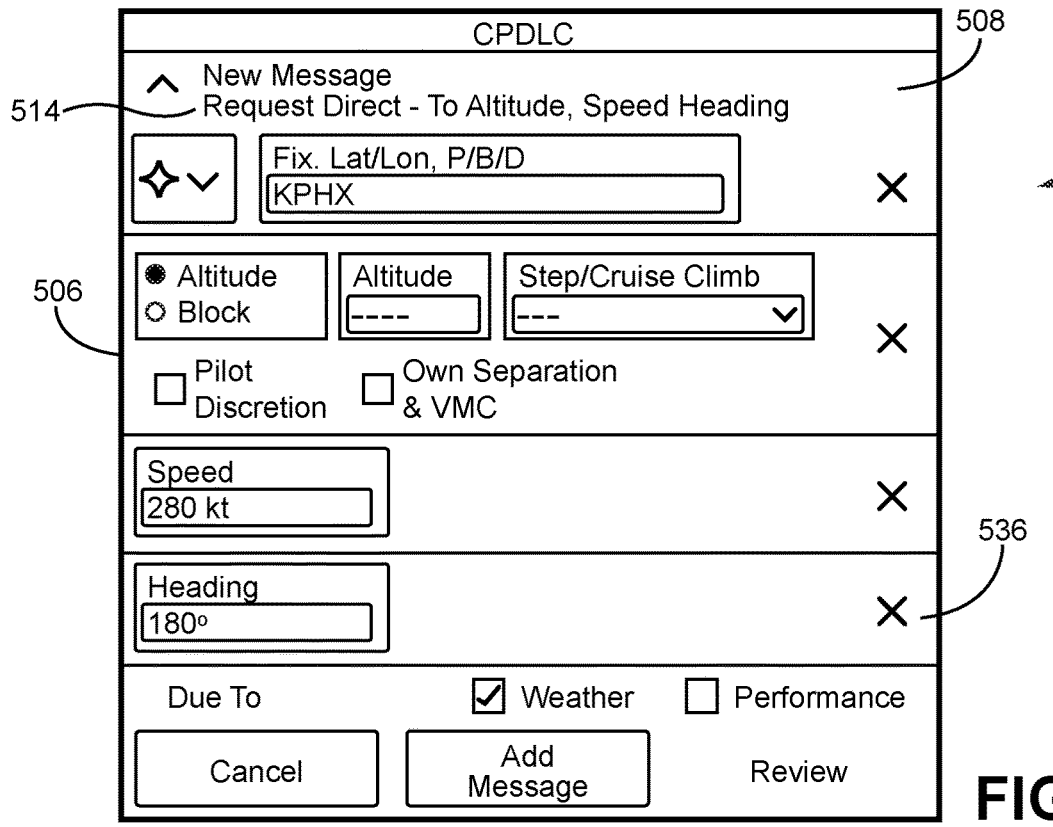

When process 1600 determines at block 1606 that the add message button has been selected, the process returns to block 1602 for another message to be created. In this example, this process is repeated to add CPDLC messages for speed, as shown in FIGS. 20 and 21 with the selection of speed button 530 in menu 510 and the addition of row 534 in panel body 506, and for heading, as shown in FIGS. 21 and 22 with the selection of heading button 532 in menu 510 and the addition of row 536. It is noted that text 514 in header 508 is updated when each additional message for the multi-part message is created.

When no further messages are to be added, process 1600 proceeds to display the CPDLC message and a send button in the panel body 506 as shown in FIG. 22 at block 1608. At block 1610, process 1600 monitors for selection of the send button. If the send button is not selected, process 1600 returns to block 1610 to wait for selection of the send button. When the send button is selected at block 1610, process 1600 proceeds to block 1612 and sends the CPDLC message.

D. Respond to CPDLC Message

Figure 23:
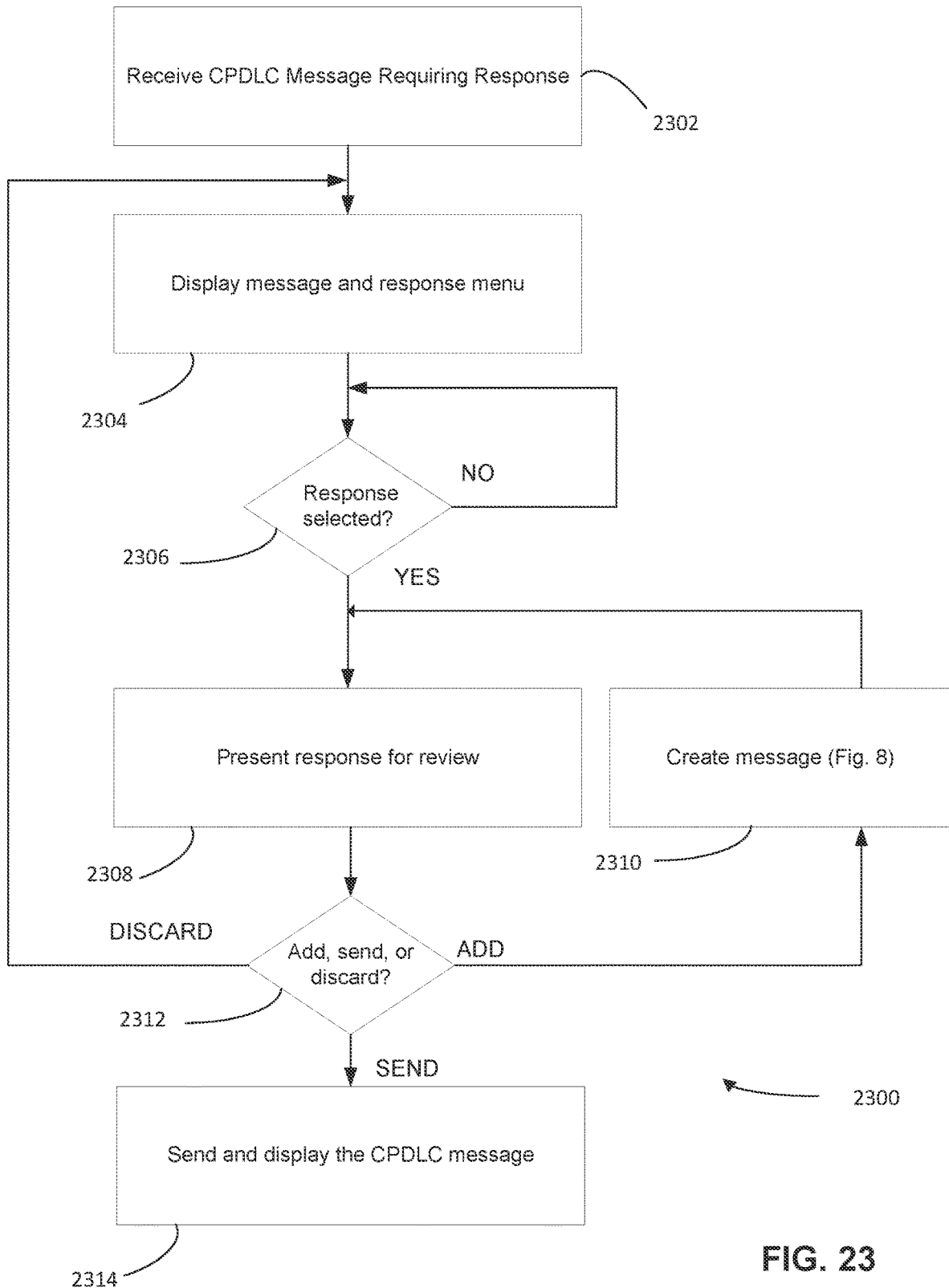
FIG. 23 is a flow chart of one embodiment of a process for creating a response to a CPDLC message.

FIG. 23 is a flow chart of one embodiment of a process indicated generally at 2300 for creating a response to a CPDLC message. In one embodiment, process 2300 forms part of the CPDLC interface application 110 of FIG. 1 and includes program code stored in memory 112 for execution by processor 108 to implement the functions described below with respect to process 2300. For pedagogical purposes, process 2300 is described in conjunction with screen shots of a user interface illustrated in FIGS. 24-29. It is understood that the screen shots of the user interface in FIGS. 24-29 are provided by way of example, and that process 2300 may be implemented in a user interface with other graphical elements, menu structures, and designs.

Process 2300 begins at block 2302 where a CPDLC message is received that requires a response from the flight crew of the aircraft. In the example shown in FIG. 24, a CPDLC message 539 is received from a ground station. At block 2304, the message is displayed in panel body 506 in a column of uplink messages of a threaded message display. The message here is "climb to FL380." This message requires a response from the flight crew as indicated by the text 548 ("NEEDS RESPONSE") presented in header 508 of panel body 506. In other embodiments, other mechanisms could be used to alert the flight crew to the need to respond to the message such as alternative text ("RESPOND NOW," "RESPONSE REQUIRED," or other appropriate verbiage). Further, the color of the text, or the panel body can be modified to a different color to call attention to the fact that a response is required. Also, other indicators such as a countdown timer or the like could be used as well. Additionally, a time indicator 541 is also included in panel body 506 indicating the amount of time that has passed since the message 529 was received. Further, at block 2304, a menu 540 is also displayed in panel body 506. Menu 540 includes options for the flight crew to choose in response to the receipt of message 539. The options in this embodiment are presented as three buttons in menu 540: unable (546), standby (544), and wilco (542).

Figure 25:
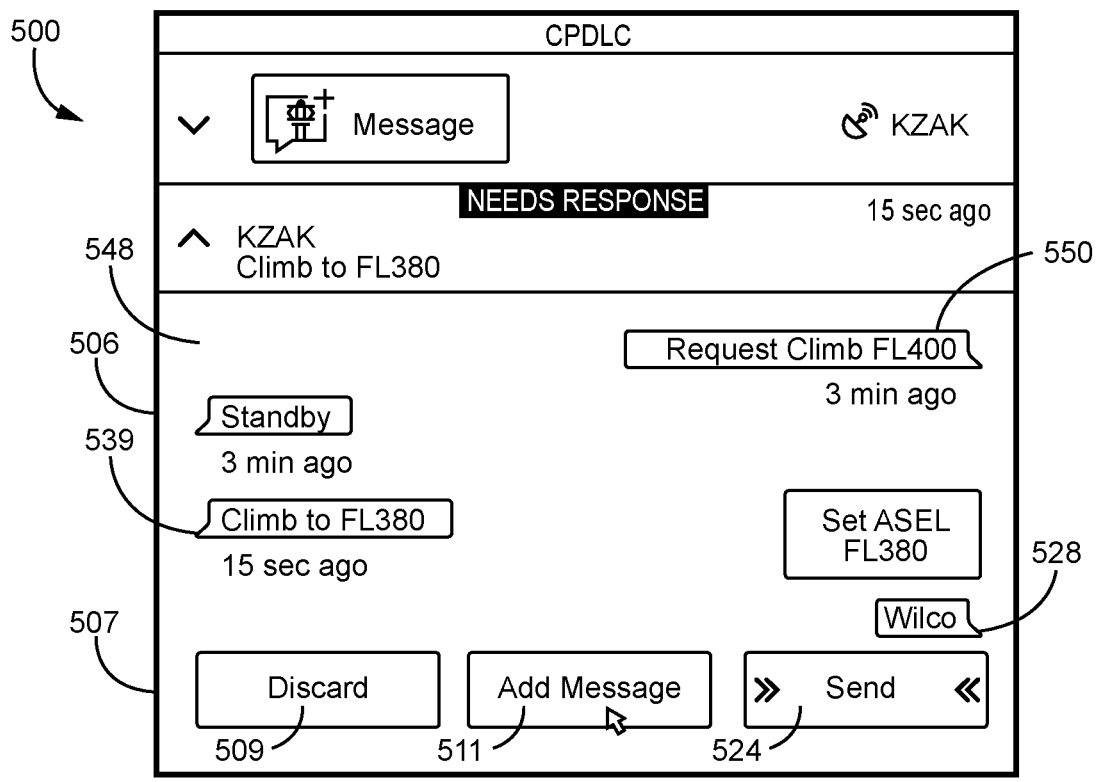

At block 2306, process 2300 monitors for a response to be selected at menu 540. If no response is received, process 2300 continues to monitor for a response at block 2306 until a response is received. When a response is received, process 2300 presents the response for review in panel body 506 at block 2308. As shown in FIG. 25, the wilco button 542 was selected from menu 540. So, the message "wilco" is presented in an outline of a bubble, for example, in downlink message column 550 of the threaded message display area of panel body 506 to indicate that the message is ready for review. In other embodiments, the preview status of a message may be indicated in any other appropriate way using text, graphical elements or color to identify the message as in a preview status. Message 539 from the ground station is displayed above and to the left of message 528 in the uplink column 548 of the panel body 506. By displaying CPDLC messages in this threaded format, messages that are related to each other are presented together in a way such that it is easy to identify the source of each message and how it relates to the other messages in the panel body 506. Additionally, panel body 506 also displays menu 507 that includes buttons for sending the message (524), adding a message (511), and discarding the message (509).

Figure 26:
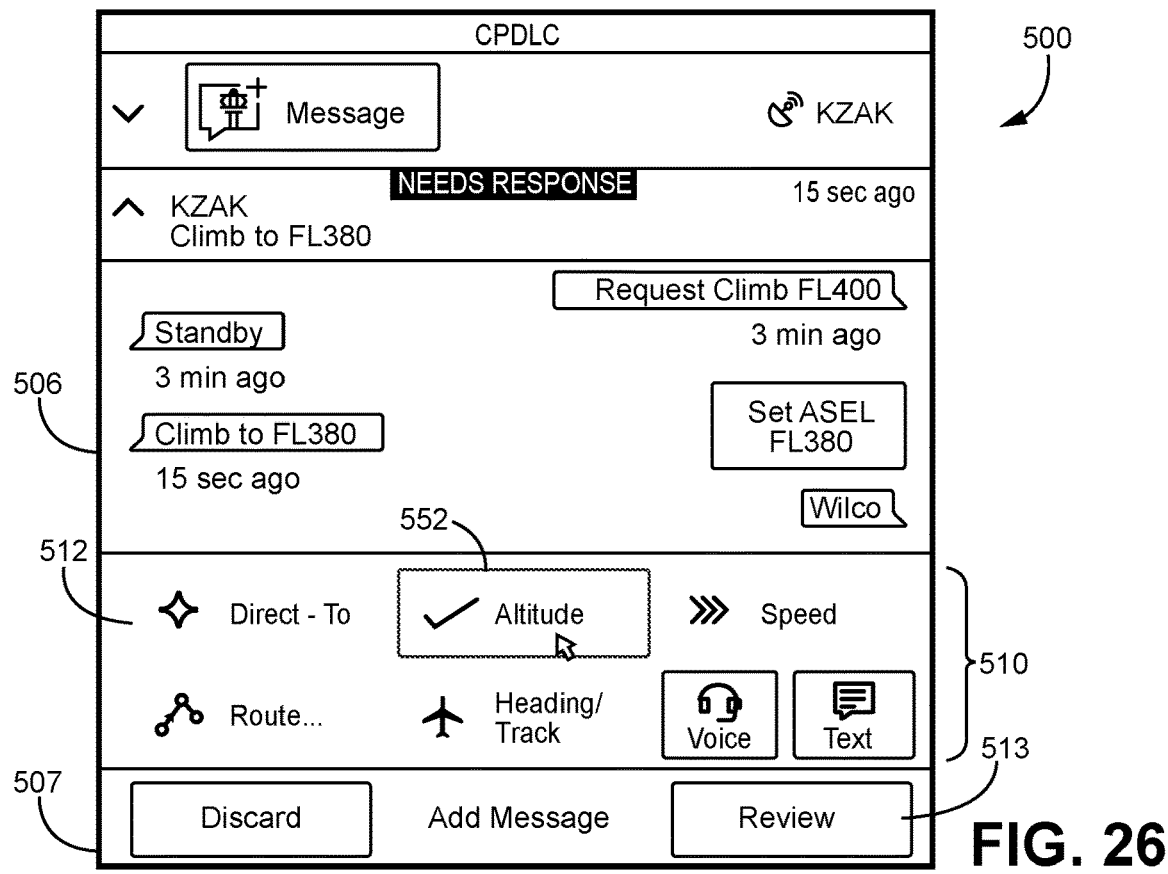
Figure 27:
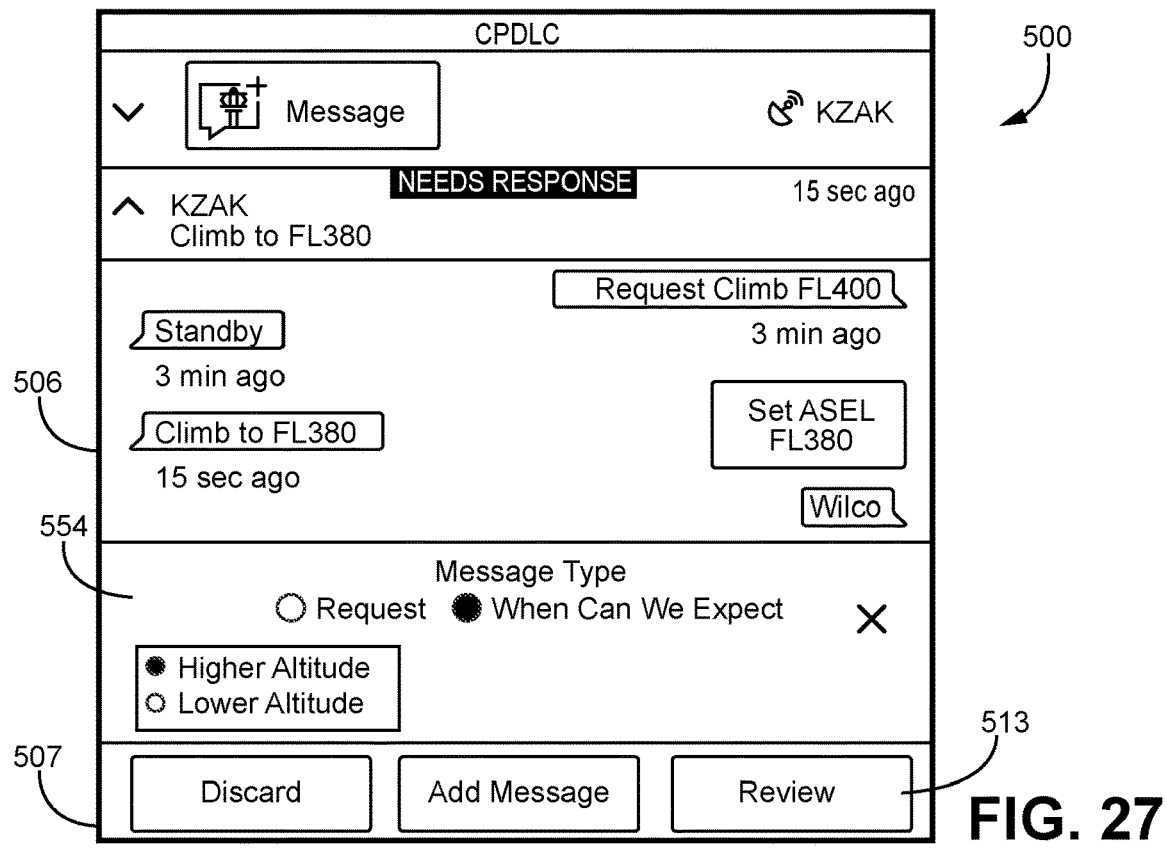
Figure 28:
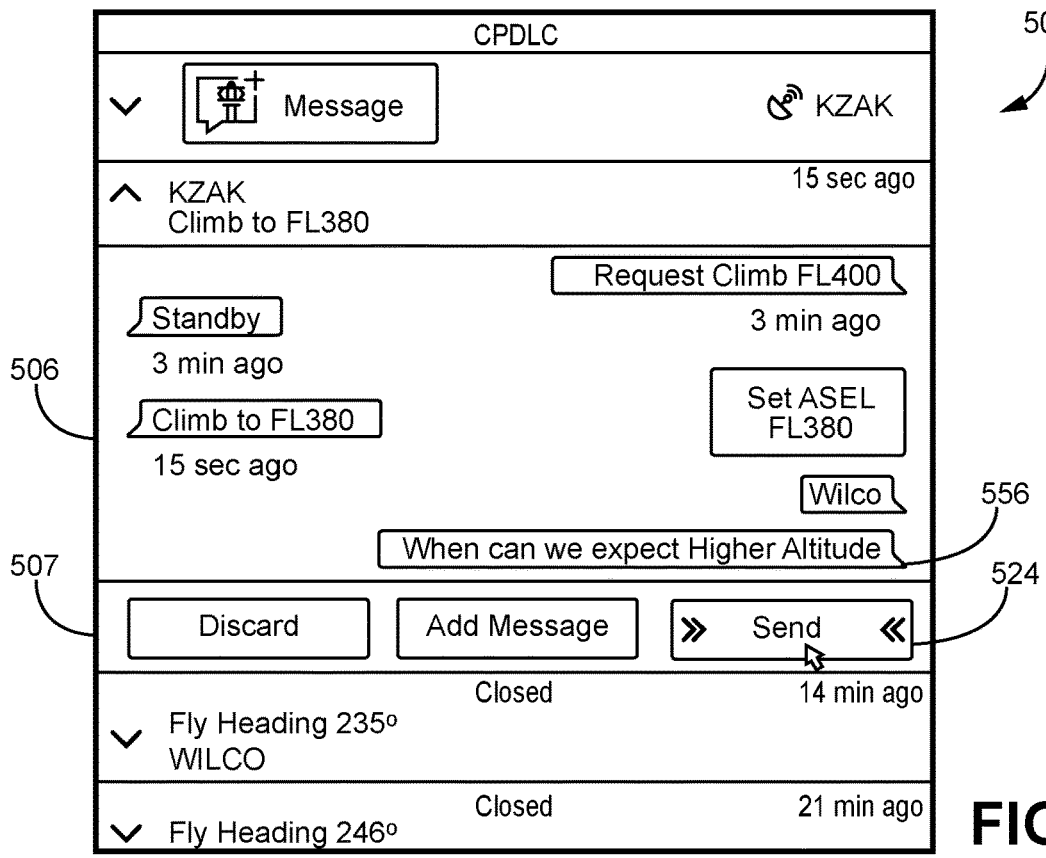
Figure 29:
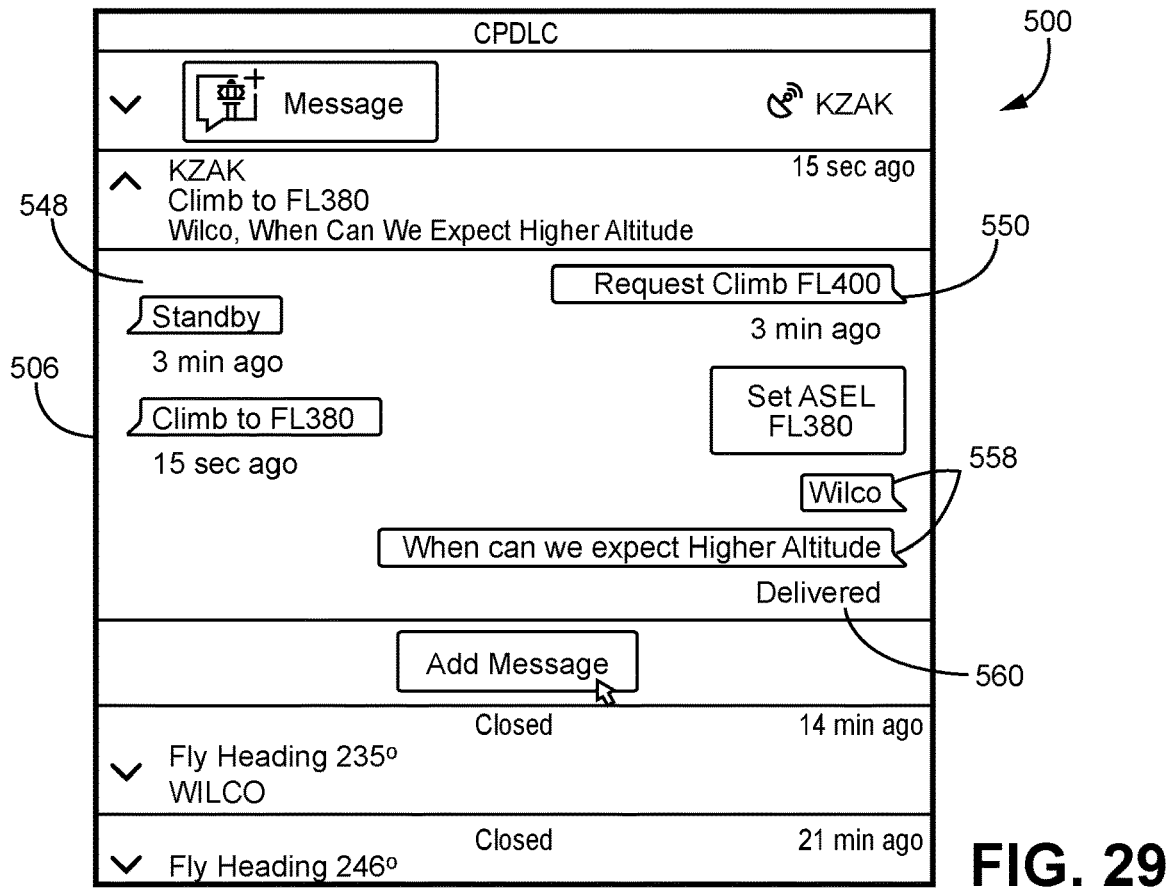

At block 2312, process 2300 monitors for a selection from menu 507 to discard, add a message, or to send the message. If button 511 is selected, process 2300 creates an additional CPDLC message at block 2310. In one embodiment, this process follows the procedure outlined above with respect to FIG. 8. For example, as shown in FIG. 26, menu 510 is displayed in panel body 506. Menu 510 includes buttons 512 that display a variety of types of CPDLC messages that could be sent. Based on the context of the CPDLC message being responded to, various of buttons 512 will be active and others will be inactive. Because this request relates to altitude, contextually appropriate CPDLC message types are active including: altitude, voice and text. Additionally, menu 507 is updated to replace the send button 524 with a review button 513. In this example, the altitude button 552 is selected, and as shown in FIG. 27, fields are presented in message creation area 554 to gather the data necessary to create the CPDLC message. When the data fields are filled in, process 2300 returns to block 2308 and presents the updated message for review. Specifically, review button 513 is pressed and the altitude message 556 is added to the threaded message display of panel body 506 and the send button 524 replaces the review button 513 in menu 507 as shown in FIG. 28.

At block 2312, process 2300 again monitors for an input from menu 507. When send button 524 is selected or touched, process 2300 sends the CPDLC message and updates the panel body 506 by showing the CPDLC message in a bubble 558 along with a time indicator 560 that shows when the message was sent. Over time, indicator 560 is updated at block 2314.

Figure 24:
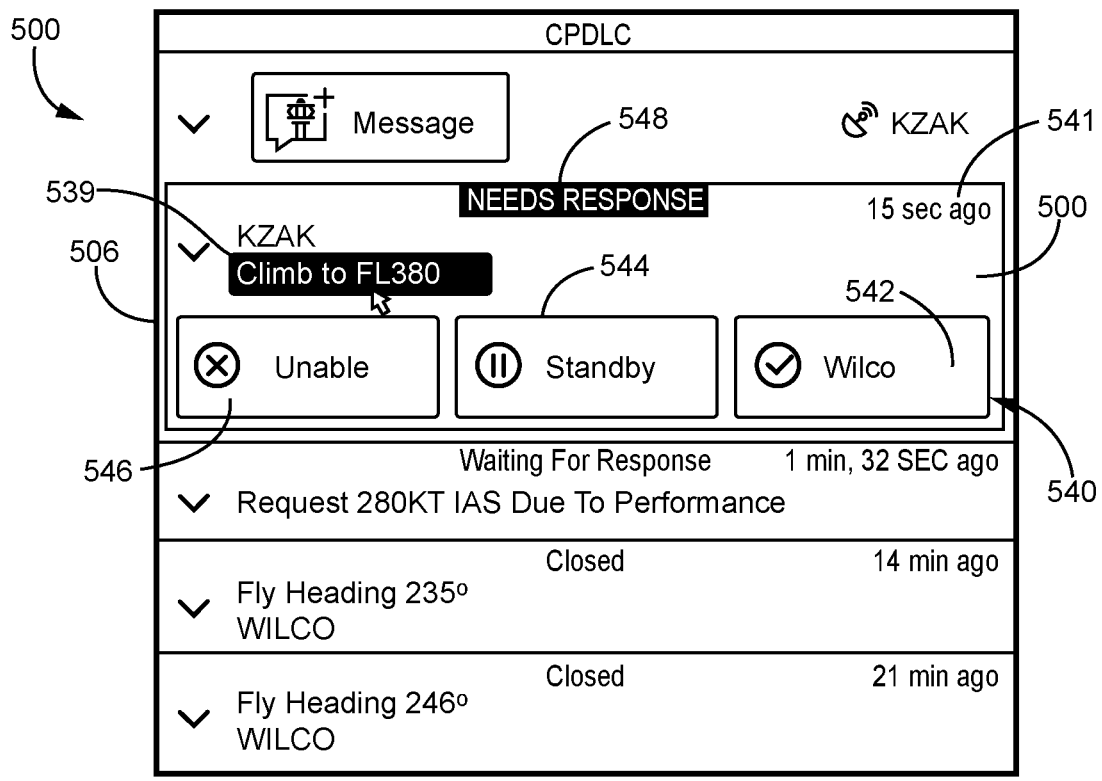
FIGS. 24 to 29 are screen shots of one embodiment of a user interface with a panel body that illustrates creating a response to a CPDLC message according to the process of FIG. 23.

If at block 2312, the discard button had been detected, the text of the draft response would be removed from the panel body 506 and would return to the state shown in FIG. 24 indicating that a response is required.

E. Another Embodiment of a Process for Creating a CPDLC Message

Figure 30:
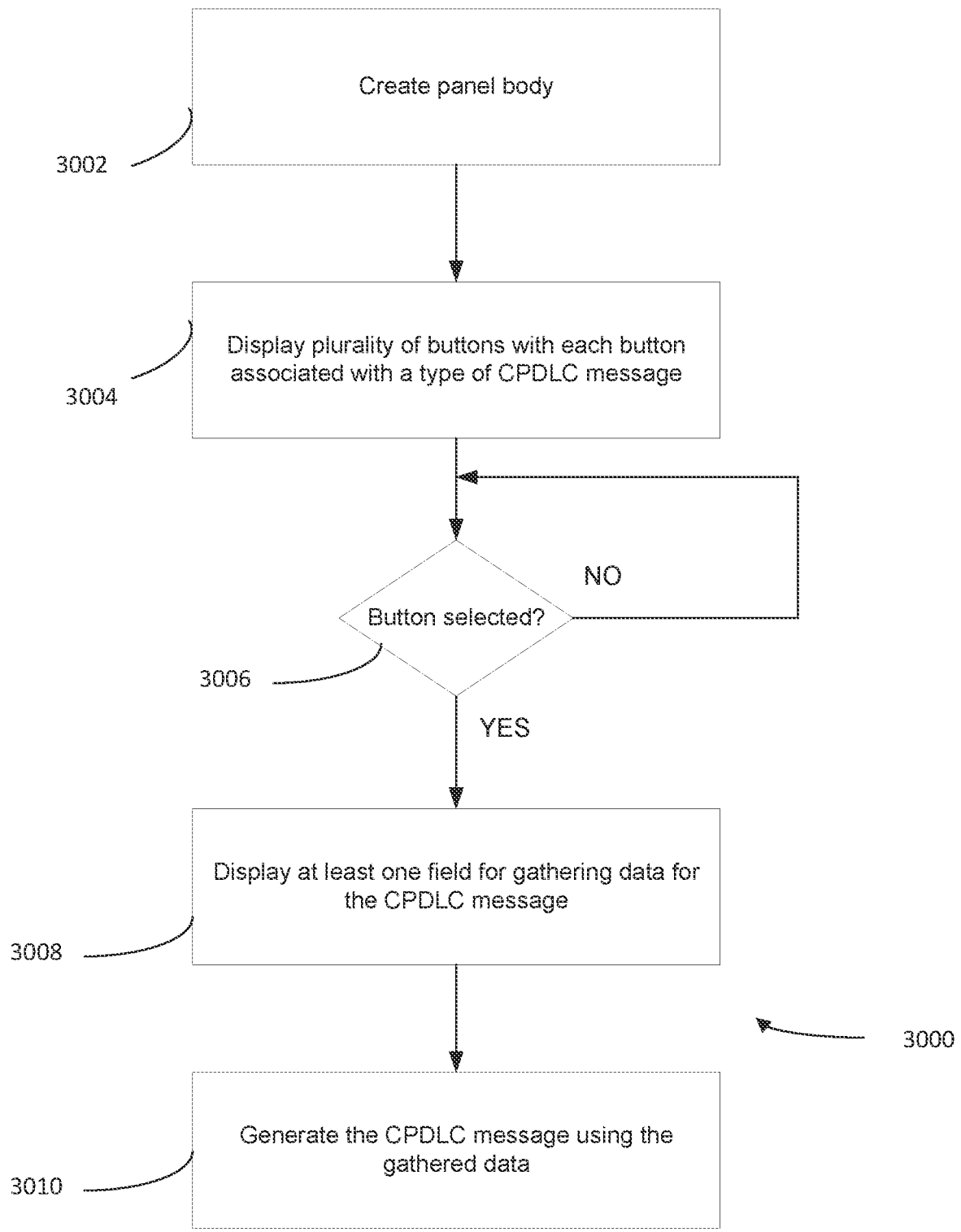
FIG. 30 is a flow chart of another embodiment of a process for creating a CPDLC message.

FIG. 30 is a flow chart of another embodiment of a process, indicated generally at 3000, for creating a CPDLC message. In one embodiment, process 3000 forms part of the CPDLC interface application 110 of FIG. 1 and includes program code stored in memory 112 for execution by processor 108 to implement the functions described below with respect to process 3000. For pedagogical purposes, process 3000 is described in conjunction with screen shots of a user interface illustrated in FIGS. 10 and 12. It is understood that the screen shots of the user interface in FIGS. 10 and 12 are provided by way of example, and that process 3000 may be implemented in a user interface with other graphical elements, menu structures, and designs.

At block 3002, process 3000 creates a panel body 506 on a user interface of an avionics device. Within the panel body 506, process 3000 provides the elements used to create the CPDLC message. At block 3004, process 3000 displays a plurality of buttons 512 in the panel body 506 with each button associated with a type of CPDLC message. At block 3006, process 3000 monitors for selection one of the buttons 512 from the plurality of buttons in the panel body 506. When a button is selected, process 3000 proceeds to block 3008 and displays at least one field for gathering data for the CPDLC message. As shown in FIG. 12, drop down menu 516, data field 518 and check boxes 522 are provided to gather data for the CPDLC message. When the fields are filled in, process 3000 creates the CPDLC message (see, e.g., message 528 in FIG. 15) at block 3010.

V. Displaying CPDLC Messages in a Threaded Format

Conventionally, Controller-Pilot Data Link Communications (CPDLC) messages are presented in a line-item configuration on a display in the cockpit of an aircraft. Each uplink and downlink message is represented by an individual line-item. Thus, flight crews spend time during flights with their heads down sorting through message logs and reports looking for messages. This wastes time and increases risk in the operation of the aircraft.

Embodiments of the present invention reduces wasted time and risks posed by conventional CPDLC applications by grouping related messages together in a single panel and presenting the messages in a threaded format. In one embodiment, the threaded format means that downlink messages from the flight crew are presented on one side of the panel while upstream messages in the conversation are presented on the opposite side of the same panel. In some embodiments, each message is displayed on a separate line of the panel, with the most recent message located, in one embodiment, at the bottom of the panel.

Referring to FIG. 1, CPDLC interface application 110 includes program instructions, that, when executed by processor 108, causes messages to be displayed in a threaded format on human-machine interface 106. In one embodiment, the human-machine interface 106 includes a display, such as a touchscreen display. The human-machine interface 106 presents each message in a row of a selected column of a panel body of a user interface. The term panel body is as defined above.

Figure 31:
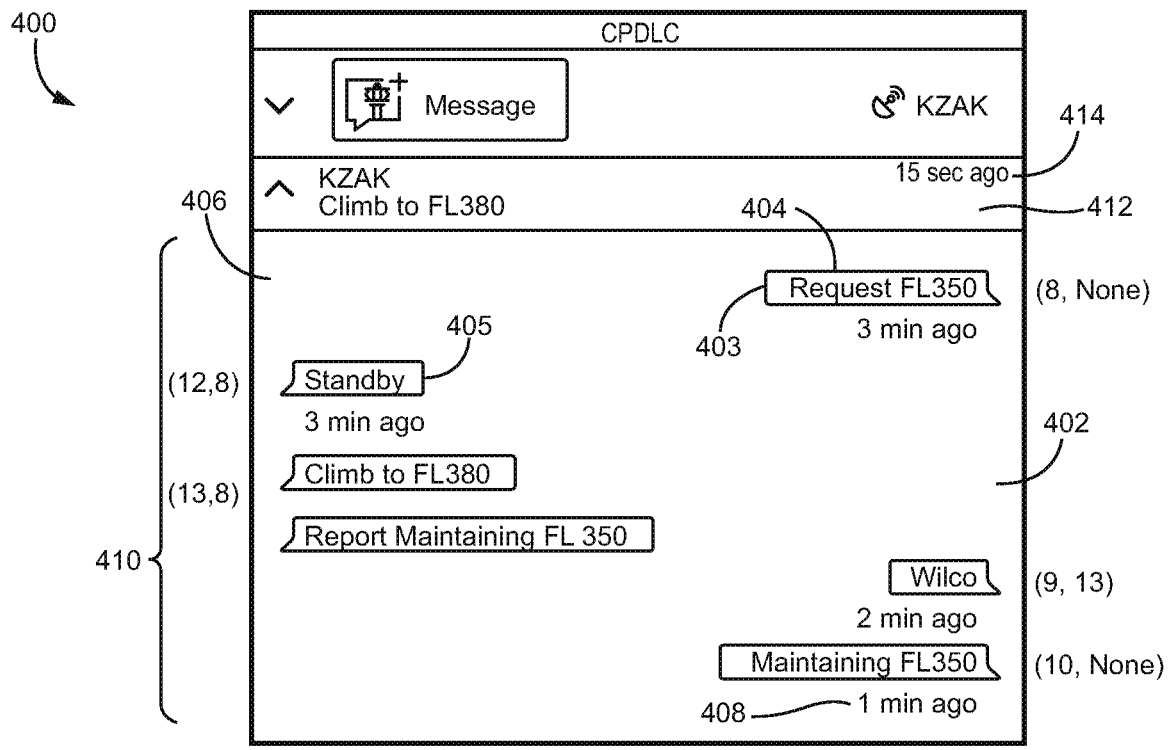
FIGS. 31 and 32 are screen shots of an embodiment of a user interface having a panel body that displays CPDLC messages in a threaded format.
Figure 32:
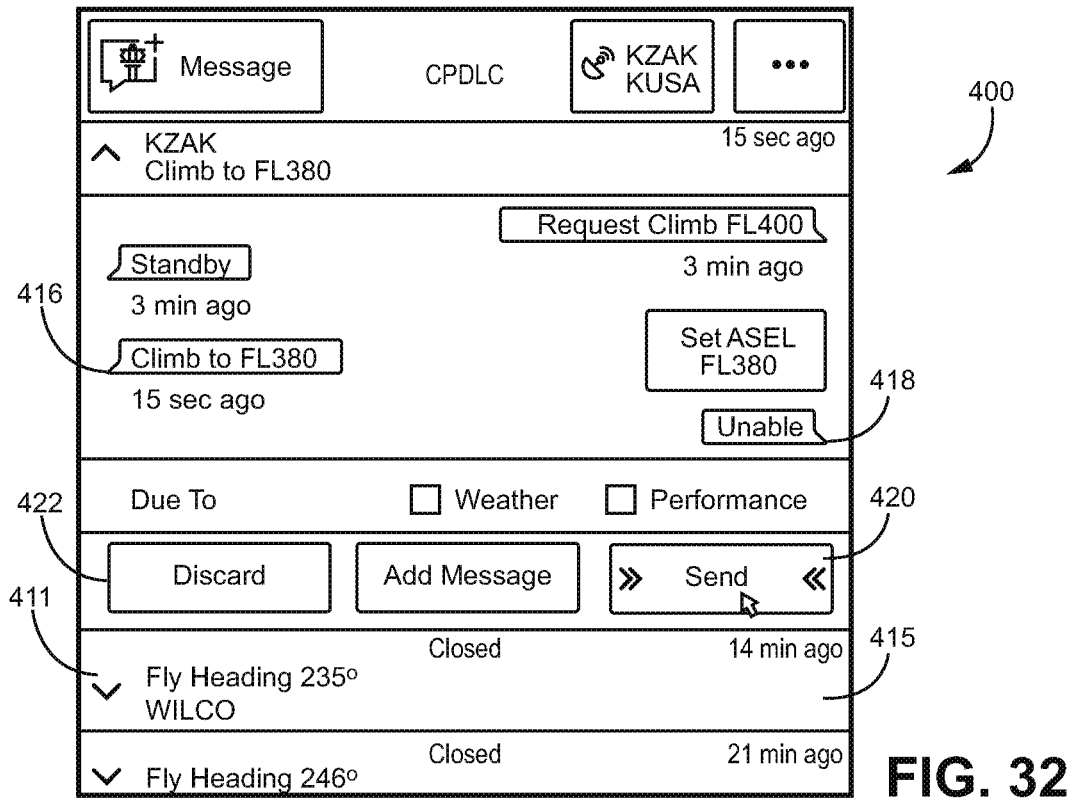

FIGS. 31 and 32 are screenshots of an embodiment of a user interface 400 having a panel body 402 for displaying CPDLC messages in a threaded format using, for example, an embodiment of the program instructions of CPDLC interface application 110 of FIG. 1. Within panel body 402, downlink messages 403 are displayed on the right-hand column 404 while uplink messages 405 are displayed in left-hand column 406. Messages are displayed with a time indicator 408 that indicates the relative timing of the message, e.g., the number of minutes since the message was received or sent. In other embodiments, time indicator 408 includes a time stamp (time a message is sent or received), an elapsed time for the current conversation, or any other appropriate indication of a time for the message. Time indicator 408 is periodically updated. In this embodiment, the most recent message is displayed in a row at the bottom of panel body 402 with each new message being added sequentially at the bottom of the panel body 402. In some embodiments, each message is displayed within a bubble shape with color coding to indicate messages that require an action or response.

Panel body 402 groups related messages into a conversation. For example, panel body 402 shows one conversation in an expanded view in which the separate messages are displayed together in the threaded format as indicated at 410. When a conversation is complete or no longer needed to be viewed, the user can click on the message to collapse the message into a single row. For example, a second conversation labelled "Fly Heading 235°" is shown in collapsed mode at 411. The collapsed view also includes a time indicator 415. In this case, conversation 411 is closed and took place 14 minutes ago. By clicking on the row of the collapsed message 411, panel body 402 would revert back to displaying the full conversation for collapsed message 411. It is noted that panel body 402 includes a header 412 for a conversation that is displayed in an expended mode with all of the text of the messages presented in the threaded message format. Header 412 includes an indication of the content of the conversation (e.g., "Climb to FL380" as shown in FIG. 31). Also, header 412 includes time indicator 414 that indicates the time of the most recent message in the conversation.

As shown in FIG. 32, panel body 402 also enables creation of messages, described in more detail above, within the confines of the same panel used to display the related messages. For example, as shown in FIG. 32, when an uplink message 416 is received from a ground station with an instruction to "climb to FL380," panel body 402 shows a message 418 being created for the downlink to indicate that the aircraft is unable to climb to the indicated level. To differentiate the draft message from the sent and received messages, message 418 is shown, by way of example and not by way of limitation, with just an outline. In other embodiments, other appropriate visual indicia may be used to indicate to the user that the message is a draft message. Further, panel body 402 include a button 420 to select to send the message and a button 422 to select to discard the draft message. More details on message creation are provided above.

Figure 33:
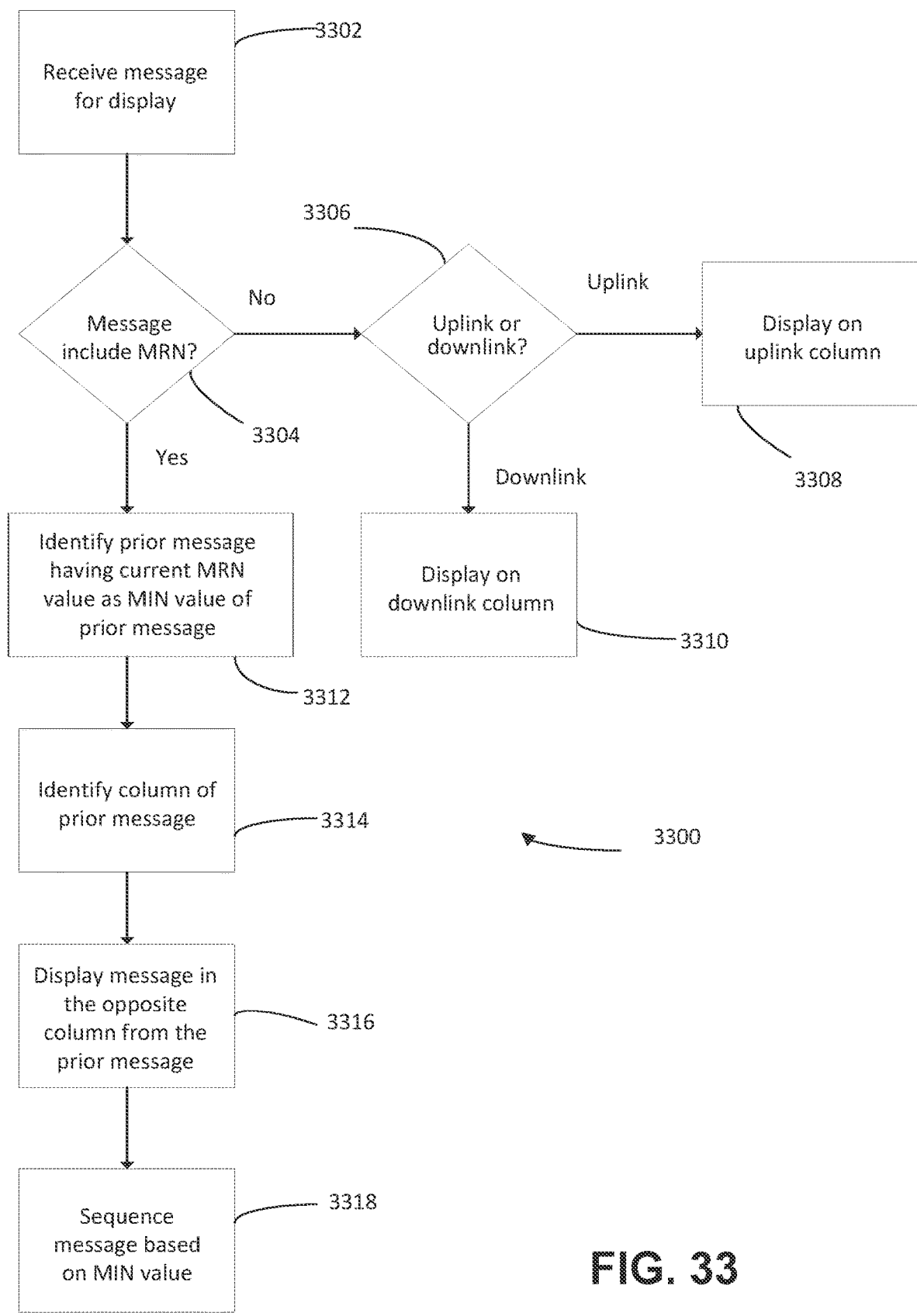
FIG. 33 is a flow chart of one embodiment of a process for displaying CPDLC messages in a threaded format on a panel body of a display area of a user interface.

One embodiment of a process 3300 for displaying messages in a threaded format in a panel body, that forms part of the CPDLC interface application 110 of FIG. 1, is shown and described with respect to FIG. 33. The process of FIG. 33 leverages off from the message identification number (MIN) and the message reference number (MRN) used in conventional CPDLC messages to create the threaded presentation of messages on the human-machine interface 106, e.g., to display messages in panel body 402, on, for example, human machine interface 106 of FIG. 1. Process 3300 is described in conjunction with the example screen shot of FIG. 31 and Table 1 below. It is understood that the output of process 3300 is not limited to the user interface shown in FIGS. 31 and 32. Use of process 3300 with other user interfaces is contemplated so long as the user interface displays CPDLC messages in a threaded format in a panel body.

Process 3300 begins at block 3302 where a message to be displayed is received. For example, downlink message 403 shown in FIG. 31 is created onboard the aircraft to be sent to a ground station requesting to climb to FL350 and is received by process 3300 at block 3302. At block 3304, process 3300 determines if the received message includes an MRN. In FIG. 31, next to each message in the screen shot of the user interface, there is an ordered pair of numbers presented within a pair of parentheses. This ordered pair is not part of the user interface but is provided for explication of process 3300 only. The first number in the ordered pair is the MIN for the message, and the second number, if any, is the MRN. Message 403 is also described in the first row of Table 1. In both instances, Table 1 and FIG. 31 indicate that message 403 does not include an MRN. Thus, method 3300 proceeds to block 3306 and determines if the message is a downlink message or an uplink message. In this case, message 403 is a downlink message (message originating at the aircraft) so process 3300 displays message 403 with the text of the message, "Request FL350," placed within a bubble in downlink column 404 on the right-hand side of panel body 402 at block 3310 (if process 3300 determined that the message was an uplink message originating at the ground station, process 3300 would display the message in the left-hand column). Message 3203 also includes an MIN of 8 and is displayed in the first row as it is the first message in the conversation.

The next message shown in panel body 402 is uplink message 405. Process 3300 receives uplink message 405 for display at block 3302. At block 3304, process 3300 determines that message 405 includes an MRN with the value of 8 as shown in the margin of FIG. 31 and in the second row of Table 1. Because the message includes an MRN, process 3300 moves to block 3312 because this message is part of an ongoing conversation. At block 3312, process 3300 identifies the message with an MIN value that is the same as the MRN value of the current message (message 405). In this case, message 403 has a MIN of 8 that matches message 405's MRN. At block 314, process 3300 determines that the prior message (403) was a downlink message displayed in the downlink column. Thus, process 3316 displays message 405 in the opposite column, namely, the uplink column at block 3316. At block 3318, process 3300 determines the row for displaying message 405 based on the MIN of message 405. Message 405 is the first uplink message in this conversation so it is placed in the row immediately following downlink message 403.

Process 3300 is repeated for each message received for display in panel body 402.

reversed with downlink messages on the left and uplink messages on the right. Further, in other embodiments, the order of the messages could also be reversed with the newest message being placed at the top.

VI. Automatic Generation and Arming of Requested Reports

Standard CPDLC applications treat messaging and reporting as two separate functions. When an aircraft operator receives a CPDLC message from a ground system, it may be presented on one of many different display panels of multiple avionics devices. The aircraft operator must then review the message on one display and determine from the message whether its contents require a report to be sent back to the ground system. For example, a report may describe the status of the aircraft and may include data on one or more navigation parameters of the aircraft. To generate the report, the operator must then review multiple screens with data gathered from one or more systems on the aircraft that address the requested parameters. When the report message is fully generated, e.g., because the requested parameters have been completed based on data gathered from the aircraft, and entered and approved by the operator, the report message is then sent as a separate message to the ground system. In gathering data for the report, generating the report message, and approving the message to be sent, the operator browses and switches between multiple screens other than the screen(s) used to review messages from the ground system (including the original message that requested the report). This process is time consuming and may pose safety risks if the operator is buried in screens trying to report back to the ground system while operating the aircraft.

Embodiments of the present invention ease the reporting burden to the operator by integrating automatically generated report messages with other CPDLC messages in a

TABLE 1

| CPDLC message | MIN | MRN | Comment |
|---|---|---|---|
| LVLD-1 REQUEST FL350 | 8 | | The aircraft system assigns a MIN of 8 to this message. The downlink request is open. |
| RSPU-2 STANDBY | 12 | 8 | The ground system assigns a MIN of 12 to this uplink. Because this uplink is a response to the downlink, the ground system assigns the MRN equal to the MIN of the downlink request (i.e. MRN = 8). RSPU-2 STANDBY is not a closure message. The status of the downlink request is open. |
| LVLU-6 CLIMB TO FL350 LVLU-24 REPORT MAINTAINING FL350 | 13 | 8 | The ground system assigns a MIN of 13 to this uplink (i.e. the ground system increments the MIN of the previous uplink message by one). Because this uplink is a response to the downlink, the ground system assigns the MRN equal to the MIN of the downlink request (i.e. MRN = 8). |
| RSPD-1 WILCO | 9 | 13 | The aircraft system assigns a MIN of 9 to this downlink (i.e. the aircraft system increments the MIN of the previous downlink message by one). Because this downlink is a response to the uplink. the aircraft system assigns the MRN equal to the MIN of the uplink (i.e. MRN = 13). RSPD-1 WILCO is a closure message. The status of the uplink message is closed. |
| LVLD-9 MAINTAINING FL350 | 10 | | The aircraft system assigns a MIN of 10 to this downlink (i.e. the aircraft system increments the MIN of the previous downlink message by one). The aircraft system does not assign an MRN because the associated uplink message has already been closed with the WILCO response. The ground system does not respond to this downlink message because it does not require a response. | https://store.icao.int/en/global-operational-data-link-gold-manual-doc-10037

Although the screen shots show panel body 402 with uplink messages on the left side and downlink messages on the right side, in other embodiments, the columns are threaded format (discussed in more detail with respect to FIGS. 31 to 33) in a single display. When a ground system requests a report from the aircraft, the report message is automatically generated and displayed in a threaded message sequence with other CPDLC messages exchanged between the ground system and the aircraft. The report message is displayed both near the original report request from the ground system (e.g., on the opposite side of the message panel) and near the response CPDLC message with the report to the ground system (e.g., on the same side of the message panel immediately preceding or subsequent to the response CPDLC message). In some examples, the operator can select the report in the message panel and display the report on the same screen.

Figure 34:
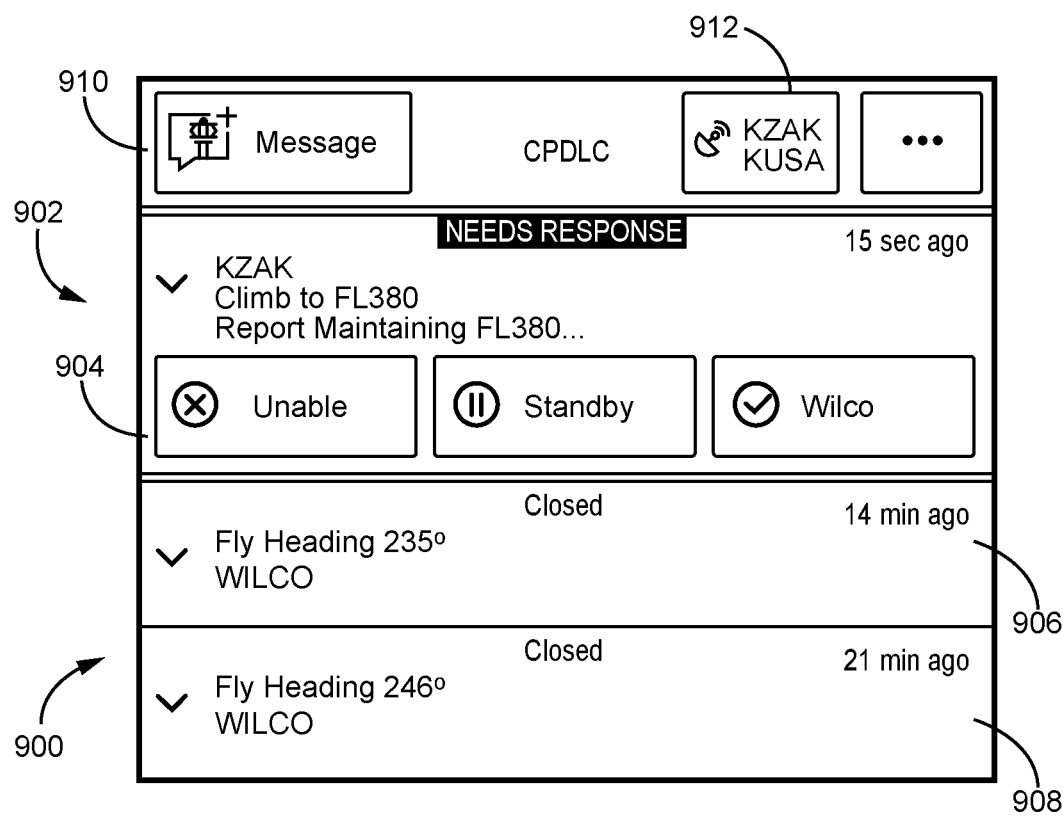
FIG. 34 depicts a screenshot of one embodiment of a user interface on a display illustrating an exemplary panel body that displays CPDLC messages between a ground system and a vehicle in a threaded format.

FIG. 34 depicts a screenshot of a display illustrating an exemplary message panel that displays threaded messages between a ground system (identified as KZAK in the screenshot) and a vehicle. Specifically, the panel body 902 depicted in the example screenshot of FIG. 34 shows a first sequence of message from a ground system directed to the aircraft as displayed on the avionics device 102. The screenshot depicted in FIG. 34 is an example of what could be displayed on the HMI 106 of avionics device 102 implementing the functionality of CPDLC interface application 110. For example, the uplink CPDLC messages displayed on the left side of panel body 902 that correspond to the KZAK ground system would initially be processed by CMS 104 implementing CPDLC application 120 and transmitted to the avionics device 102 as the intended recipient of the uplink message.

The uplink messages initially received and displayed on the panel body 902 are instructions from the ground system to the aircraft, namely a "Climb to FL 380" message (an example of a request for the aircraft to navigate at an altitude level of 380) and a "Report Maintaining FL 380" message (an example of a request by the ground system for the aircraft to report on its status once it reaches an altitude level of 38,000 feet). The panel body 902 displays the messages between the ground system and the aircraft (not explicitly shown in FIG. 34) that correspond to a particular topic of conversation, and, particularly for panel body 902, displays a pending conversation with the ground system that still requires a response from the aircraft. A menu of buttons 904 is displayed below the threaded messages of the panel body 902 (although buttons 904 can be presented in other places on the screen or on separate panels near the panel body 902) that, when selected by the operator, enables a downlink CPDLC message to be sent back to the ground system. In the example shown in FIG. 34, the menu of buttons 904 include an "Unable" button, a "Standby" button, and a "Wilco" button, although other buttons can be included and/or the combination of buttons displayed on the screen can be switched.

When the operator selects the "Unable" button (that is, HMI 106 receives input from an input device that corresponds to the selection of the "Unable" button), a CPDLC message is created indicating that the aircraft cannot follow the directed course of action from the ground system and/or, in the case of a report request, that the aircraft cannot submit a report as requested by the ground system. When the operator selects the "Standby" button (HMI 106 receives input from an input device that corresponds to the selection of the "Standby" button), a CPDLC message is created indicating that the ground system will receive a future reply from the aircraft regarding the directions given by the uplink message. If the uplink message includes a request for a report, as will be subsequently described, the CPDLC message may indicate that the report will be sent in due course as the aircraft gathers data for the report and/or attempts to comply with the parameters specified by the ground system.

When the operator selects the "Wilco" button (HMI 106 receives input from an input device that corresponds to the selection of the "Wilco" button), a CPDLC message is created indicating that the aircraft accepts the parameters specified in the uplink message, and, when a report is requested, a report will be sent with the response message or subsequently thereafter. As previously described, once the CPDLC message is created, the operator can preview and approve the message (and report) whereupon the CPDLC message is transmitted and displayed in the threaded messages on the HMI 106 in the panel body 902.

Along with the panel body 902 that corresponds to the current conversation between the aircraft and the ground system, one or more additional panels can be displayed below that correspond to previous conversation topics either from the same ground system or from a different ground system. As shown in FIG. 34, first closed message panel 906 corresponds to a previous message from a ground system requesting that the aircraft achieve a heading parameter of 235 degrees, which was responded by the aircraft as a "Wilco". Additionally, a second closed message panel 908 corresponds to a previous message from a ground system requesting that the aircraft achieve a heading parameter of 246 degrees, which was also responded with a "Wilco" from the aircraft. In some examples, if the operator selects one of the first closed message panel 906 or the second closed message panel 908, the selected closed message panel expands on the screen to reveal the messages exchanged between the ground system and the aircraft within the topic of conversation covered by that closed message panel.

Additionally, an operator can create a new message to send to the ground system by selecting button 910, as described with respect to FIGS. 8 through 30. Additionally, the connection status between the ground system and the aircraft can be displayed at button 912, as described with respect to FIGS. 2A through 2J. As illustrated in FIG. 34, the display may include other panels and/or buttons that, when selected by the operator, result in additional CPDLC functions supported by CPDLC interface application 110. In the interest of clarity and brevity, these panels and buttons are not described specifically in the context of FIG. 34 but may be present along with the panel body 902.

FIG. 35 depicts a screenshot of a display illustrating an exemplary panel body that automatically displays report messages requested by the ground system in a threaded format. When the operator selects panel body 902 in FIG. 35, the panel body 902 expands as shown in FIG. 35 showing any messages 911, 912 exchanged by the ground system and the aircraft for the selected conversation. In some examples, the aircraft receives a message from the ground system requesting a report on one or more navigation parameters of the vehicle, which is shown in FIG. 35 by the message 912 "Report Maintaining FL 380", with the navigation parameter being the FL 380 (the altitude of the aircraft). Reports can be requested for any appropriate navigation parameter of the aircraft, including a report that specifies a selected value of a navigation status of the aircraft. Other examples of navigation parameters include aircraft heading, position, velocity, communication status, operational status of one or more systems on the aircraft, aircraft identification, and flight path such as the origin and/or destination of the aircraft. Upon receiving the uplink message, processor 108 is configured to determine whether to generate a report based on the contents of the uplink message. In one example, the uplink message contains an indicator that is identified by the processor 108 as corresponding to a request for a report. When the uplink message contains trigger word(s) such as the word "Report", or an equivalent word or words in the message, processor 108 determines that a report is needed and begins generating the report based on the specified navigation parameters in the uplink message.

When processor 108 determines that a report is needed, it causes HMI 106 to display a report message label 914 in the panel body 902, which as shown in FIG. 35, is displayed on the right side of the panel body 902 that corresponds to a column of CPDLC messages sent, or to be sent, to the ground system. Even before a response message is sent by the aircraft, the panel body 902 can display a preview of a CPDLC message on the right side column of the panel body, including a report message label 914 that is linked to a CPDLC message containing the report. However, before the report is complete (that is, when the report is not "armed"), the report message label 914 may indicate to the operator that the report is not yet ready for review or transmission. In one example, the report message label 914 will be grayed out or faded in the panel body 902. The report message label 914 is, in some examples, not interactable during the process of creating the report. Alternatively stated, an operator attempting to select the report message label 914 when it is grayed out or otherwise displayed in a way indicating the report is not yet armed will not respond to the selection of the report message label 914.

Processor 108 is configured to gather data relevant to the report (which can be done in conjunction with displaying the report message label 914 in the panel body 902). The data is gathered from one or more systems on the vehicle, such as from navigation systems (e.g., GNSS positioning systems and/or inertial navigation system (INS) comprising inertial sensors such as accelerometers, gyroscopes, and magnetometers), air data systems (e.g., air data systems that measure air data parameters such as angle of attack, angle of sideslip, Mach number, etc.), flight control systems, guidance systems, flight management systems, and other systems coupled to the aircraft. Although not explicitly shown, such systems can be coupled to avionics device 102 through appropriate circuitry or, in the case of offboard avionics devices, can be communicatively coupled to avionics device 102 through a wireless connection. In some embodiments, processor 108 may gather data from other sources, e.g., from data external to the aircraft stored in one or more databases.

Once the data for the report is gathered, processor 108 is configured to generate a report message that includes the gathered data. In the example shown in FIG. 35, processor 108 retrieves data from one or more sensors on the aircraft configured to determine the altitude, and once the sensor data indicates that the aircraft has reached an altitude that satisfies the FL380 parameter requested in the uplink message, processor 108 generates the report message including the altitude and any other data needed in the report. When the report is ready to be sent to the ground system (referred to as "arming" the report), processor 108 directs the HMI 106 to change an image characteristic of the report message label 914 in response to arming the report. For example, the HMI 106 can adjust the color, brightness, sharpness, contrast, or other image characteristic of the report message label 914 (such as by adding more color dynamic to "ungray" the grayed-out text in the label) to indicate to the operator that the report has now been armed and is ready to be sent. For example, referring to FIG. 35A, in response to receiving a message 946 from a ground system requesting a position report, a report message label 942 includes certain distinctive features that indicate that the report has been armed and is now selectable. In an example, the "paper-like" icon displayed in the report message label 942 may change color from gray to white. As shown in FIG. 35A, the report message label 942 is displayed next to a "Position Report" message 940 that is sent as a response to message 946 and the arming of the report.

Upon receiving a selection of the report message label by the operator, HMI 106 is configured to display the report in one or more panels on the display. Referring to FIGS. 35, 35A, and 35B, when the HMI 106 receives a selection of report message label 914 or 942, the report message 944 is displayed in a panel that overlaps the panel body 902. In some examples, the report message can be displayed by expanding out the report message label 914 in the panel body 902 (which expands the panel body 902 accordingly), which displays the relevant data in the report. Alternatively, selecting the report message label 914 causes the HMI 106 to display the report on another panel in the display, for example, a new panel directly below panel body 902. In doing so, the report message can be linked to the report message label 914 automatically when generated along with any CPDLC messages associated with the report message that are created.

At this stage, the report and any associated response messages have not yet been sent by the operator, despite being displayed on the right side of panel body 902. It is when selection is received by one of the buttons 904 that the draft message and report message would be (or at least instructed or selected to be) sent to the ground system. Once the report message is successfully transmitted to the ground system, the operator can retrieve the report. If a further uplink CPDLC message is received from the ground system in response to the report, the panel body 902 can be kept "alive" in the same position on the display. Conversely, the panel body 902 can be closed and displayed similarly to first closed message panel 906 and second closed message panel 908.

FIG. 36 depicts a flow diagram illustrating an exemplary method for responding to a Controller-Pilot Data Link Communications (CPDLC) message requesting a report. Method 3600 may be implemented via the user interface and techniques described above with respect to FIGS. 34 and 35, but may be implemented via other user interfaces and techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 3600 includes receiving a CPDLC message originating from a ground system at block 3602. Once the CPDLC message is received, method 3600 proceeds to block 3604 and determines whether the CPDLC message includes an indicator that indicates a request for a report from the aircraft. If the CPDLC message does not include such an indicator, then method 3600 reverts back to block 3602 and awaits a new CPDLC message. If the CPDLC message does include an indicator, then method 3600 proceeds from block 3604 to block 3606 and generates a report message label to be displayed on the HMI of the intended avionics device. In some examples, the report message label is displayed on a column of a panel body, namely, the column that corresponds to messages communicated (or draft messages to be communicated by) the aircraft to the ground station.

Proceeding to block 3608, method 3600 displays the report message label in a threaded format. When the report message has not been fully completed, method 3600 optionally displays the report message label having image characteristics that indicate to the operator that the report message has not yet been completed. Once the report message has been completed, method 3600 optionally adjusts the image characteristics of the report message label to indicate to the operator that the report message is complete. When the report message is completed, method 3600 can then enable the report message label to be selected. In response to receiving input corresponding to a selection of the report message label, method 3600 displays the report message in one or more panels on the same display screen that displays the message panel containing the threaded CPDLC messages between the ground system and the aircraft. For example, the report message can be displayed in the message panel containing the threaded message (by expanding the report message label to show the report message in the panel body), or by displaying the report message in a separate panel without altering the report message label.

FIG. 37 depicts a flow diagram illustrating an exemplary method for responding to a CPDLC message that requests a report. Method 3700 can be implemented in conjunction with method 3700 and/or in combination with the other Figures.

Method 3700 includes identifying an indicator of an uplink CPDLC message that indicates a request for a report at block 3702. In some examples, the request specifies a report on one or more navigation parameters of the aircraft, such as a report for "Maintaining FL380." Method 3700 then proceeds to block 3704 and gathers data on the one or more navigation parameters from one or more systems coupled to the vehicle, such systems comprising sensors configured to determine the navigation parameters specified in the report request. Proceeding to block 3706, method 3700 determines from the gathered data whether the parameters specified in the report request are met; that is, the gathered data includes the status update requested by the ground system. If method 3700 determines from the gathered data that the navigation parameter(s) are not met, then method 3700 can revert back to block 3704 and continue gathering data from the systems on the aircraft until the navigation parameter(s) specified in the report are met.

Optionally, method 3700 proceeds to block 3714 and sends a CPDLC message to the ground station and displays the sent CPDLC message in panel body 902 without the report. In some examples, method 3700 receives a selection to send a CPDLC message without the report, e.g., by receiving a selection of an "Unable" button. Method 3700 then displays a CPDLC message in the column corresponding to messages communicated by the aircraft indicating that a report will not be provided. In response, a report message label previously displayed on the message panel can be removed from the panel body once the CPDLC message from the aircraft is sent.

If method 3700 determines that the report conditions have been met (e.g., the aircraft has achieved an altitude of FL380), method 3700 generates a report message based on the gathered data at block 3708. Method 3700 then activates the report message label to enable selection of the report message label by the operator at block 3710. In response to receiving input corresponding to the selection of the activated report message label, the report message can be displayed on a portion of the display screen, e.g., on the panel body. Method 3700 then proceeds to block 3712 and receives user input from the operator, such as by receiving a selection of one or the buttons 904 in FIG. 35. If the user input indicates disapproval, then method 3700 proceeds to block 3714 and displays a CPDLC message without the report. For example, if method 3700 receives a selection of an "Unable" button or a "Standby" button, then method 3700 can send a CPDLC message to the ground system without the report message (even if the report has been completed) and display the CPDLC message in the appropriate column of the panel body. Alternatively, if the user input indicates approval to send the report message, then method 3700 proceeds to block 3716 and sends a CPDLC message to the ground station with the report and displays the CPDLC message that was sent to the ground system in the panel body. Additionally, the report message label is displayed next to the threaded CPDLC message, e.g., above or below the CPDLC message in the same column of the panel body.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs.

EXAMPLE EMBODIMENTS

Example 1 includes an avionics device configured to be coupled to a vehicle, the avionics device comprising: at least one processor configured to receive a first Controller-Pilot DataLink Communications (CPDLC) message from a ground system; a memory coupled to the at least one processor and configured to store a CPDLC interface application, wherein when executed by the at least one processor, the CPDLC interface application causes the at least one processor to: identify an indicator in the first CPDLC message that indicates a request for a report on at least one navigation parameter of the vehicle, and generate a report message label in response to identifying the indicator in the first CPDLC message; and a human-machine interface comprising a display screen coupled to the at least one processor, wherein the human-machine interface is configured to: display, on a first column of the display screen, the first CPDLC message received from the at least one processor in a threaded format; and display, on a second column correlated with the first column of the display screen, the report message label generated from the at least one processor in a threaded format.

Example 2 includes the avionics device of Example 1, wherein the at least one processor is configured to, in response to generate the report message label: to gather data corresponding to the at least one navigation parameter; and to generate a report message based on the gathered data.

Example 3 includes the avionics device of Example 2, wherein in response to generate the report message, the at least one processor is configured to adjust an image characteristic of the report message label displayed on the second column, wherein the image characteristic includes a color of the report message label.

Example 4 includes the avionics device of any of Examples 2-3, wherein the at least one processor is configured to display a plurality of buttons below the first column and the second column, and to receive input corresponding to a selection of one of the buttons, wherein the plurality of buttons includes an acceptance button, a standby button, and a rejection button, wherein, when the at least one processor receives input corresponding to a selection of the rejection button: the at least one processor is configured to transmit a second CPDLC message indicating that the report message cannot be transmitted; and the human-machine interface is configured to display the second CPDLC message in the second column in a threaded format; wherein, when the at least one processor receives input corresponding to a selection of the standby button: the at least one processor is configured to transmit a third CPDLC message indicating that the report message is not ready to be transmitted; and the human-machine interface is configured to display the third CPDLC message in the second column in a threaded format; wherein, when the at least one processor receives input corresponding to a selection of the acceptance indicator: the at least one processor is configured to transmit a fourth CPDLC message including the report message; and the human-machine interface is configured to display the fourth CPDLC message in a threaded format, and the report message label associated with the generated report message in the second column.

Example 5 includes the avionics device of any of Examples 2-4, wherein the navigation parameter includes a selected value of a navigation status of the vehicle, wherein the at least one processor is configured to generate the report message when the selected value is determined, and configured to adjust an image characteristic of the report message label displayed on the second column when the selected value is determined.

Example 6 includes the avionics device of any of Examples 1-5, wherein the first column of the display screen corresponds to threaded representations of messages transmitted by the ground system, wherein the second column of the display screen corresponds to at least one of: threaded representations of messages transmitted by the at least one processor, threaded representations of messages pending approval, or report message labels associated with report messages.

Example 7 includes the avionics device of any of Examples 2-6, wherein the at least one processor is configured: in response to generate the report message, to enable selection of the report message label; and in response to receiving input corresponding to the selection of the report message label, to display the report message on a portion of the display screen.

Example 8 includes the avionics device of any of Examples 1-7, wherein the first column includes messages from the ground system displayed on a first side of a panel body, wherein the second column includes report message labels displayed on a second side of a panel body, the second side opposite to the first side.

Example 9 includes a method for responding to a Controller-Pilot Data Link Communications (CPDLC) message requesting a report, the method comprising: receiving a first CPDLC message from a ground system; identifying an indicator in the first CPDLC message that indicates a request for a report on at least one navigation parameter of the vehicle; generating a report message label in response to identifying the indicator in the first CPDLC message; displaying, on a first column of a display screen in a panel body, the first CPDLC message in a threaded format; displaying, on a second column correlated with the first column of the panel body, the generated report message label in a threaded format.

Example 10 includes the method of Example 9, and further comprising: gathering data corresponding to the at least one navigation parameter; and generating a report message based on the gathered data.

Example 11 includes the method of Example 10, and further comprising: adjusting an image characteristic of the report message label, wherein the image characteristic includes a color of the report message label.

Example 12 includes the method of any of Examples 10-11, and further comprising: displaying a plurality of buttons below the first column and the second column and to receive a selection of one of the plurality of buttons, wherein the plurality of buttons includes an acceptance button, a standby button, and a rejection button; and receiving at least one of: a selection of the acceptance button, the standby button, or the rejection button; (1) upon receiving the selection of the acceptance button: transmitting a second CPDLC message indicating that the report message cannot be transmitted; and displaying the second CPDLC message in the second column, the second CPDLC message displayed in a threaded format; (2) upon receiving the selection of the standby button: transmitting a third CPDLC message indicating that the report message is not ready to be transmitted; and displaying the third CPDLC message in the second column, the third CPDLC message displayed in a threaded format; (3) upon receiving the selection of the acceptance button, transmitting a fourth CPDLC message including the report message; and displaying the fourth CPDLC message in a threaded format, and the report message label associated with the report message in the second column.

Example 13 includes the method of any of Examples 10-12, wherein the navigation parameter includes a selected value of a navigation status of the vehicle, and further comprising: generating the report message when the selected value is determined; and adjusting an image characteristic of the report message label displayed on the second column when the selected value is determined.

Example 14 includes the method of any of Examples 9-13, wherein the first column of the display screen corresponds to threaded representations of messages transmitted by the ground system, wherein the second column of the display screen corresponds to at least one of: threaded representations of messages transmitted from the vehicle, threaded representations of messages to be transmitted from the vehicle pending approval, or report message labels associated with the report messages.

Example 15 includes the method of any of Examples 10-14, and further comprising: enabling selection of the report message label in response to generating the report message; and displaying the report message on a portion of the display screen in response to receiving the selection of the report message label.

Example 16 includes a program product comprising a non-transitory processor-readable medium on which program instructions configured to be executed by at least one processor are embodied, wherein when executed by the at least one processor, the program instructions cause the at least one processor to: receive a first Controller-Pilot Data-Link Communications (CPDLC) message from a ground system; identify an indicator in the first CPDLC message that indicates a request for a report on at least one navigation parameter of the vehicle; generate a report message label in response to identify the indicator in the first CPDLC message; display, on a first column of a display screen in a panel body, the first CPDLC message in a threaded format; and display, on a second column correlated with the first column of the panel body, the generated report message label in a threaded format.

Example 17 includes the program product of Example 16, wherein the program instructions cause the at least one processor to, in response to generate the report message indicator: to gather data corresponding to the at least one navigation parameter; and to generate a report message based on the gathered data.

Example 18 includes the program product of Example 17, wherein the navigation parameter includes a selected value of a navigation status of the vehicle, wherein the instructions cause the at least one processor to: generate the report message when the selected value is determined; and adjust an image characteristic of the report message label displayed on the second column when the selected value is determined.

Example 19 includes the program product of any of Examples 17-18, wherein the first column of the display screen corresponds to threaded representations of messages transmitted by the ground system, wherein the second column of the display screen corresponds to at least one of: threaded representations of messages transmitted by the at least one processor, threaded representations of messages to be transmitted from the vehicle pending approval, or report message labels associated with report messages.

Example 20 includes the program product of any of Examples 17-19, wherein in response to generate the report message, the program instructions cause the at least one processor to: enable selection of the report message label in the panel body; and in response to receiving the selection of the report message indicator, to display the report message on a portion of the display screen.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof

What is claimed is:

1. An avionics device configured to be coupled to a vehicle, the avionics device comprising:
   at least one processor configured to receive a first Controller-Pilot DataLink Communications (CPDLC) message from a ground system;
   a memory coupled to the at least one processor and configured to store a CPDLC interface application, wherein when executed by the at least one processor, the CPDLC interface application causes the at least one processor to:
      identify an indicator in the first CPDLC message that indicates a request for a report on at least one navigation parameter of the vehicle, and
      generate a report message label in response to identifying the indicator in the first CPDLC message; and
   a human-machine interface comprising a display screen coupled to the at least one processor, wherein the human-machine interface is configured to:
      display, on a first column of the display screen, the first CPDLC message received from the at least one processor in a threaded format; and
      display, on a second column correlated with the first column of the display screen, the report message label generated from the at least one processor in a threaded format.

2. The avionics device of claim 1, wherein the at least one processor is configured to, in response to generate the report message label:
   to gather data corresponding to the at least one navigation parameter; and
   to generate a report message based on the gathered data.

3. The avionics device of claim 2, wherein in response to generate the report message, the at least one processor is configured to adjust an image characteristic of the report message label displayed on the second column, wherein the image characteristic includes a color of the report message label.

4. The avionics device of claim 2, wherein the at least one processor is configured to display a plurality of buttons below the first column and the second column, and to receive input corresponding to a selection of one of the buttons, wherein the plurality of buttons includes an acceptance button, a standby button, and a rejection button,
   wherein, when the at least one processor receives input corresponding to a selection of the rejection button:
      the at least one processor is configured to transmit a second CPDLC message indicating that the report message cannot be transmitted; and the human-machine interface is configured to display the second CPDLC message in the second column in a threaded format;
   wherein, when the at least one processor receives input corresponding to a selection of the standby button:
      the at least one processor is configured to transmit a third CPDLC message indicating that the report message is not ready to be transmitted; and the human-machine interface is configured to display the third CPDLC message in the second column in a threaded format;
   wherein, when the at least one processor receives input corresponding to a selection of the acceptance indicator:
      the at least one processor is configured to transmit a fourth CPDLC message including the report message; and the human-machine interface is configured to display the fourth CPDLC message in a threaded format, and the report message label associated with the generated report message in the second column.

5. The avionics device of claim 2, wherein the navigation parameter includes a selected value of a navigation status of the vehicle, wherein the at least one processor is configured to generate the report message when the selected value is determined, and configured to adjust an image characteristic of the report message label displayed on the second column when the selected value is determined.

6. The avionics device of claim 1, wherein the first column of the display screen corresponds to threaded representations of messages transmitted by the ground system, wherein the second column of the display screen corresponds to at least one of: threaded representations of messages transmitted by the at least one processor, threaded representations of messages pending approval, or report message labels associated with report messages.

7. The avionics device of claim 2, wherein the at least one processor is configured:
in response to generate the report message, to enable selection of the report message label; and
in response to receiving input corresponding to the selection of the report message label, to display the report message on a portion of the display screen.

8. The avionics device of claim 1, wherein the first column includes messages from the ground system displayed on a first side of a panel body, wherein the second column includes report message labels displayed on a second side of a panel body, the second side opposite to the first side.

9. A method for responding to a Controller-Pilot Data Link Communications (CPDLC) message requesting a report, the method comprising:
receiving a first CPDLC message from a ground system;
identifying an indicator in the first CPDLC message that indicates a request for a report on at least one navigation parameter of the vehicle;
generating a report message label in response to identifying the indicator in the first CPDLC message;
displaying, on a first column of a display screen in a panel body, the first CPDLC message in a threaded format;
displaying, on a second column correlated with the first column of the panel body, the generated report message label in a threaded format.

10. The method of claim 9, and further comprising:
gathering data corresponding to the at least one navigation parameter; and
generating a report message based on the gathered data.

11. The method of claim 10, and further comprising:
adjusting an image characteristic of the report message label, wherein the image characteristic includes a color of the report message label.

12. The method of claim 10, and further comprising:
displaying a plurality of buttons below the first column and the second column and to receive a selection of one of the plurality of buttons, wherein the plurality of buttons includes an acceptance button, a standby button, and a rejection button; and
receiving at least one of: a selection of the acceptance button, the standby button, or the rejection button;
(1) upon receiving the selection of the rejection button:
transmitting a second CPDLC message indicating that the report message cannot be transmitted; and
displaying the second CPDLC message in the second column, the second CPDLC message displayed in a threaded format;
(2) upon receiving the selection of the standby button:
transmitting a third CPDLC message indicating that the report message is not ready to be transmitted; and
displaying the third CPDLC message in the second column, the third CPDLC message displayed in a threaded format;
(3) upon receiving the selection of the acceptance button, transmitting a fourth CPDLC message including the report message; and
displaying the fourth CPDLC message in a threaded format, and the report message label associated with the report message in the second column.

13. The method of claim 10, wherein the navigation parameter includes a selected value of a navigation status of the vehicle, and further comprising:
generating the report message when the selected value is determined; and
adjusting an image characteristic of the report message label displayed on the second column when the selected value is determined.

14. The method of claim 9, wherein the first column of the display screen corresponds to threaded representations of messages transmitted by the ground system, wherein the second column of the display screen corresponds to at least one of: threaded representations of messages transmitted from the vehicle, threaded representations of messages to be transmitted from the vehicle pending approval, or report message labels associated with the report messages.

15. The method of claim 10, and further comprising:
enabling selection of the report message label in response to generating the report message; and
displaying the report message on a portion of the display screen in response to receiving the selection of the report message label.

16. A program product comprising a non-transitory processor-readable medium on which program instructions configured to be executed by at least one processor are embodied, wherein when executed by the at least one processor, the program instructions cause the at least one processor to:
receive a first Controller-Pilot DataLink Communications (CPDLC) message from a ground system;
identify an indicator in the first CPDLC message that indicates a request for a report on at least one navigation parameter of the vehicle;
generate a report message label in response to identify the indicator in the first CPDLC message;
display, on a first column of a display screen in a panel body, the first CPDLC message in a threaded format; and
display, on a second column correlated with the first column of the panel body, the generated report message label in a threaded format.

17. The program product of claim 16, wherein the program instructions cause the at least one processor to, in response to generate the report message indicator:
to gather data corresponding to the at least one navigation parameter; and
to generate a report message based on the gathered data.

18. The program product of claim 17, wherein the navigation parameter includes a selected value of a navigation status of the vehicle, wherein the instructions cause the at least one processor to:
generate the report message when the selected value is determined; and
adjust an image characteristic of the report message label displayed on the second column when the selected value is determined.

19. The program product of claim 17, wherein the first column of the display screen corresponds to threaded representations of messages transmitted by the ground system, wherein the second column of the display screen corresponds to at least one of: threaded representations of messages transmitted by the at least one processor, threaded representations of messages to be transmitted from the vehicle pending approval, or report message labels associated with report messages.

20. The program product of claim 17, wherein in response to generate the report message, the program instructions cause the at least one processor to:

enable selection of the report message label in the panel body; and in response to receiving the selection of the report message indicator, to display the report message on a portion of the display screen.

\* \* \* \* \*